United States Patent
Yeung et al.

(10) Patent No.: US 7,171,468 B2
(45) Date of Patent: Jan. 30, 2007

(54) SYSTEM AND METHOD FOR ACCESSING A DOCUMENT MANAGEMENT REPOSITORY

(75) Inventors: Michael Yeung, Mission Viejo, CA (US); George Koppich, Palos Verdes Estates, CA (US); Ashutosh Gijare, Lake Forest, CA (US); Manoj Verma, Lake Forest, CA (US); Vikas Dogra, Lake Forest, CA (US); Sanjay Wangoo, Lake Forest, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 563 days.

(21) Appl. No.: 10/052,847

(22) Filed: Nov. 10, 2001

(65) Prior Publication Data

US 2003/0093525 A1    May 15, 2003

(51) Int. Cl.
G06F 15/16    (2006.01)

(52) U.S. Cl. .................. 709/225; 709/217; 709/226; 709/232

(58) Field of Classification Search ........ 709/200–207, 709/217–238, 246; 715/700, 733; 707/10
See application file for complete search history.

(56) References Cited

U.S. PATENT DOCUMENTS

| | | |
|---|---|---|
| 5,181,162 A | 1/1993 | Smith et al. |
| 5,202,828 A | 4/1993 | Vertelney et al. |
| 5,497,484 A | 3/1996 | Potter et al. |
| 5,596,694 A | 1/1997 | Capps |
| 5,675,520 A | 10/1997 | Pitt, III et al. |
| 5,689,626 A | 11/1997 | Conley |
| 5,731,813 A | 3/1998 | O'Rourke et al. |
| 5,765,176 A | 6/1998 | Bloomberg |
| 5,812,130 A | 9/1998 | Van Huben et al. |
| 5,923,328 A | 7/1999 | Griesmer |
| 5,969,720 A | 10/1999 | Lisle et al. |
| 6,067,554 A | 5/2000 | Hohensee et al. |
| 6,092,090 A | 7/2000 | Payne et al. |
| 6,105,028 A | 8/2000 | Sullivan et al. |
| 6,121,970 A | 9/2000 | Guedalia |
| 6,147,687 A * | 11/2000 | Wanderski ................ 715/853 |
| 6,222,638 B1 | 4/2001 | Otala |
| 6,226,654 B1 | 5/2001 | Van Hoff |
| 6,226,655 B1 | 5/2001 | Borman et al. |
| 6,237,011 B1 | 5/2001 | Ferguson et al. |
| 6,247,020 B1 | 6/2001 | Minard |
| 6,266,058 B1 | 7/2001 | Meyer |
| 6,266,682 B1 | 7/2001 | LaMarca et al. |
| 6,268,924 B1 | 7/2001 | Koppolu et al. |
| 6,370,538 B1 * | 4/2002 | Lamping et al. ............ 707/102 |
| 6,466,238 B1 * | 10/2002 | Berry et al. ................ 715/847 |
| 6,496,837 B1 * | 12/2002 | Howard et al. ............. 707/200 |

(Continued)

Primary Examiner—Saleh Najjar
Assistant Examiner—Asad Muhammad Nawaz
(74) Attorney, Agent, or Firm—Tucker Ellis & West LLP

(57) ABSTRACT

A method and system for accessing a network-based document server application from a client. An access point is defined within a local file system of the client. A local file navigation interface allows a user of the client to interface to the access point such that the network-based document management system is accessed via the local file system of the client.

32 Claims, 69 Drawing Sheets

U.S. PATENT DOCUMENTS

| | | | |
|---|---|---|---|
| 6,519,612 B1 * | 2/2003 | Howard et al. | 707/200 |
| 6,553,368 B2 * | 4/2003 | Martin et al. | 707/3 |
| 6,571,245 B2 * | 5/2003 | Huang et al. | 707/10 |
| 6,633,923 B1 * | 10/2003 | Kukura et al. | 719/316 |
| 6,636,250 B1 * | 10/2003 | Gasser | 715/853 |
| 6,778,972 B2 * | 8/2004 | Leonardos | 707/1 |
| 6,782,387 B1 * | 8/2004 | Kumashio | 707/10 |
| 6,810,404 B1 * | 10/2004 | Ferguson et al. | 707/200 |
| 6,820,094 B1 * | 11/2004 | Ferguson et al. | 707/200 |
| 6,965,892 B1 * | 11/2005 | Uceda-Sosa et al. | 707/8 |
| 2002/0169667 A1 * | 11/2002 | Marotta et al. | 705/14 |
| 2003/0020530 A1 * | 1/2003 | Lee et al. | 327/379 |
| 2003/0110188 A1 * | 6/2003 | Howard et al. | 707/200 |
| 2004/0163020 A1 * | 8/2004 | Sidman | 714/100 |

* cited by examiner

Fig. 23

Fax Addresses

| ▽ Name | Fax |
|---|---|
| George K | (949)929-0000 |
| Henry Brady | (949)888-0000 |
| Jack Johnson | (949)888-0000 |
| Louis McDonald | (949)666-0000 |
| TABS | |
| DSE | |
| YNG | |
| ISP | |

OK    Cancel

*Fig. 32*

Fax Addresses

☑ ▽ Contact Name          Email Address

☐ George K               george@email.com
☐ Henry Brady            HBrady@aol.com
☐ Jack Johnson           JJ@msn.com
☐ Louis McDonald         louis.mcdonald@aol.com
☐ TABS
☐ DSE
☐ YNG
☐ ISP

[ OK ]   [ Cancel ]

Fig. 50

Fax Addresses

| ▽ Contact Name | Fax |
|---|---|
| ☑ | |
| ☐ George K | (949)929-0000 |
| ☐ Henry Brady | (949)888-0000 |
| ☐ Jack Johnson | (949)888-0000 |
| ☐ Louis McDonald | (949)666-0000 |
| ☐ TABS | |
| ☐ DSE | |
| ☐ YNG | |
| ☐ ISP | |

[ OK ]   [ Cancel ]

*Fig. 52*

GL 1010 Device Queue

| ▽ Document Name | Status | Owner | Size | Submitted |
|---|---|---|---|---|
| ISP UI spec | Printing | Mkodimer | 3MB | 0-00-00 |
| ISP UI spec | Waiting | Mkodimer | 3MB | 0-00-00 |
| ISP UI spec | Waiting | Mkodimer | 3MB | 0-00-00 |

OK

Done

*Fig. 55*

Contact Properties

Contact Name: silvy Wilson

Email Address: swilson@aol.com

Fax Number: (   )    -

OK    Cancel

Done

*Fig. 58*

User Account Properties

Account Name: SSmith

First Name: Sam

Last Name: Smith

Password: ****

Confirm Password: ****

Folder: SSmith

Posting: \\Nexus\ssmith\

[ OK ]  [ Cancel ]

Done

*Fig. 62*

SYSTEM AND METHOD FOR ACCESSING A DOCUMENT MANAGEMENT REPOSITORY

BACKGROUND OF THE INVENTION

This invention is related to document management systems, and more particularly, to providing seamless access to an independent document management system via an operating system file manager.

Document management systems are third-party applications that offer users the capability to store documents in a user definable hierarchical structure of containers such as file folders. These document systems enhance user experience by providing easy-to-use tools for locating, manipulating, and editing documents by one or multiple users. In one of the more popular operating system platforms (e.g., Microsoft Windows®), the user navigates the local file system using the Windows Explorer® tool, a file management system integrated into the operating system. Documents can be manipulated in a number of ways, e.g., moved, copied, and deleted by using Explorer. Thus a user is reluctant to switch to a different file management tool to perform these operations. This presents a major barrier to third-party vendors who choose to compete in the marketplace by providing enhanced file management systems.

What is needed is a convenient method of accessing the third-party document management system from within the existing operating system file manager such that a user is not required to navigate another interface to access such third-party implementation.

SUMMARY OF THE INVENTION

The present invention disclosed and claimed herein, in one aspect thereof, comprises a method and system for accessing a network-based document server application from a client. An access point is defined within a local file system of the client. A local file navigation interface allows a user of the client to interface to the access point such that the network-based document management system is accessed via the local file system of the client.

BRIEF DESCRIPTION OF THE DRAWINGS

For a more complete understanding of the present invention and the advantages thereof, reference is now made to the following description taken in conjunction with the accompanying drawings in which:

FIGS. 20–30 illustrate the user interface to the disclosed appliance system for the thick client;

FIG. 32 illustrates a popup window;

FIG. 50 illustrates a screenshot of a popup window that allows the user to select the destinations for the document when e-mailing is the mode of transmission;

FIG. 52 illustrates a screenshot of a fax popup window that allows the user to more conveniently select fax recipients already entered into the system;

FIG. 55 illustrates a screenshot of a popup window that allows the user view all jobs sent to a particular destination device listed in FIG. 54;

FIG. 58 illustrates a screenshot of a window that allows the user to edit properties of a user contact;

FIG. 62 illustrates a screenshot of a window that allows the Administrative user to add multiple new user accounts;

DETAILED DESCRIPTION OF THE INVENTION

The disclosed appliance system includes a document management system that overcomes a conventional barrier of requiring navigation through a third-party interface to access appliance system documents by providing access to the document management repository via a folder incorporated into the existing operating system file structure.

When utilizing a Microsoft Windows® operating system, the disclosed Document Server Application (DSA) provides access to network-based documents via Windows Explorer®. Although this feature represents a only a subset of the operations available to a user who uses the DSA browser-based client, it provides ease-of-use to a user who is accustomed to using the Windows tools and environment, and provides sufficient functionality for the user who simply needs to perform basic DSA functionality.

When a user invokes the Windows Explorer file manager, a document repository managed by the DSA is represented as another folder within the Explorer folder pane. A user can perform the following operations on the repository folder insofar as he or she has the appropriate access rights (these operations may be challenged via an account username/password request): expand the folder tree structure, view folder properties, delete a folder, rename the folder, copy the folder, move the folder, drag-and-drop a document, delete the document, rename the document, copy the document, move the document, view document properties, and view the document content as read-only. When the document is moved or copied within the DSA repository file structure, the document, as well as its meta data, are "moved" or "copied". When the document is moved or copied to a folder that is located outside the DSA repository, only the document content is moved or copied (this operation is equivalent to a download operation).

Context Overview

Figure 1:
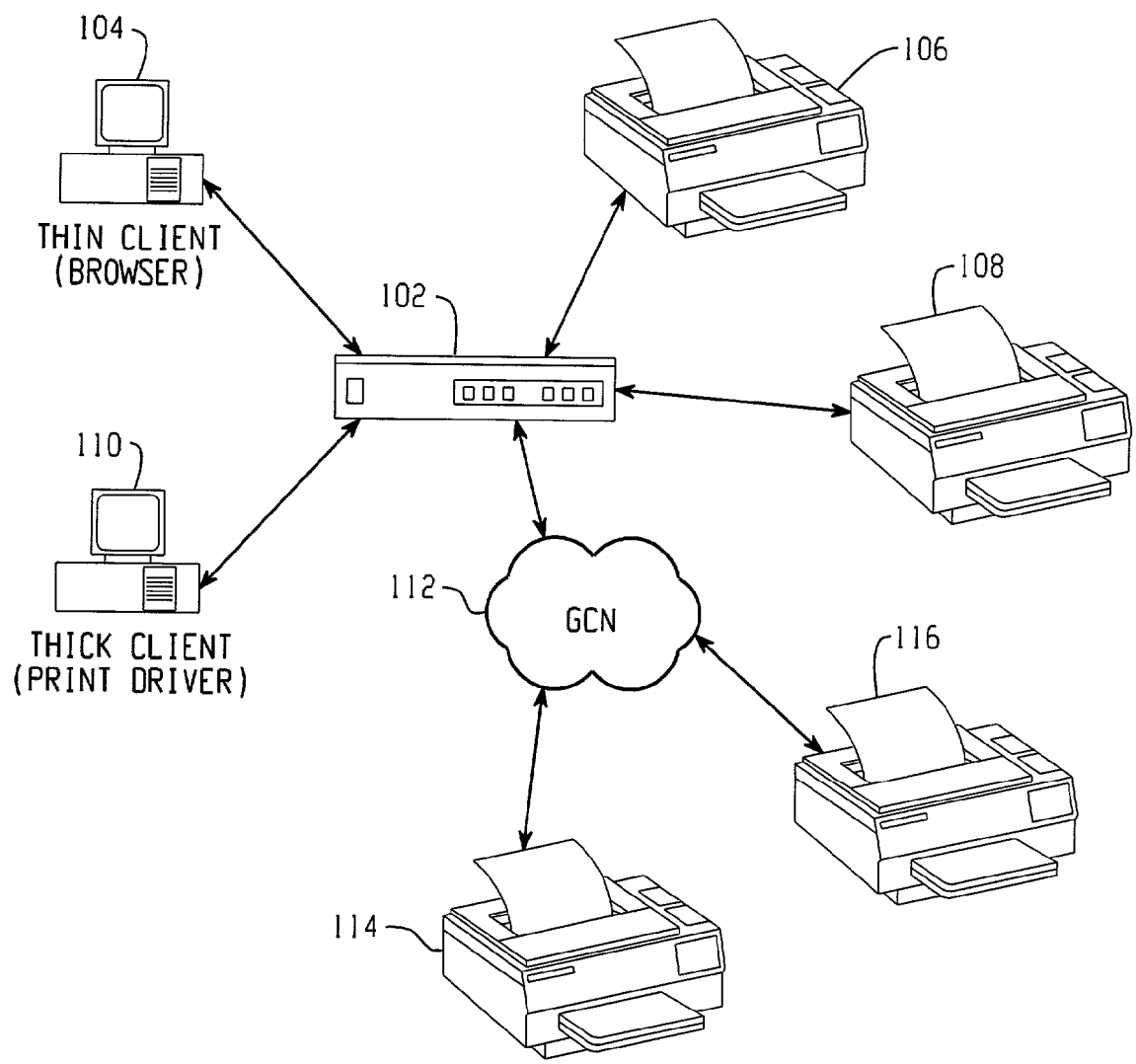
FIG. 1 illustrates a block diagram of a conceptual overview of a system incorporating the disclosed document management architecture.

Referring now to FIG. 1, there is illustrated a block diagram of a conceptual overview of a system 100 incorporating the disclosed document management architecture. The system 100 includes a network-based document service appliance 102 (hereinafter also denoted as iSP appliance for image Service Platform appliance) that is a document distribution solution with document management capabilities and device management support. The document management component enables users to quickly store and retrieve documents from a central repository. Device management is used to discover devices, monitor device availability and provide device status to the user and Administrator (also denoted Admin).

The appliance 102 replaces or supplements existing fax, print and e-mail servers, and offers a more efficient method of transmitting, tracking and storing business-to-business documents. The appliance 102 is a client/server system suitably implemented in single and collaborative corporate workgroups (although not limited to such environments) designed to increase productivity and reduce costs by making document communications simple to perform and more reliable. Users can share documents and conduct collaborative work between various workgroups. For example, collaboration between sales and accounting can occur when issuing customer quotes, generating offers or approving a credit line, tracking job costs, and charging back users.

A typical application consists of transmitting critical documents that impact the operations of a business. These critical documents can be from, but are not limited to, the following functional areas of a business: Sales, Accounting, Purchasing, Engineering, Warehouse, and Human Resources. All of these documents are representative of a critical business process. A job routing component allows a user to direct jobs to one or more Multifunction Peripheral devices (MFPs) and other LPD-compliant devices, to faxes, e-mail and web servers. An LPD-compliant device is a Network Print Server (i.e., Line Printer Daemon (or spool area handler)) that allows access to printers from a local computer across a TCP/IP network, e.g., the Internet.

Like many conventional appliances, the iSP appliance 102 is a plug-n-play device having a hardware component consisting of a closed-box server that is easy to install, configure and support, and the software component is the iSP software, both of which will be described in greater detail hereinbelow. The appliance 102 provides routing services, document management services, and device management services on behalf of one or more iSP clients. For example, in a local area network (LAN) environment, the appliance 102 provides services from a first "thin" browser-based client 104 to one or more local network peripherals (106 and 108) disposed on the LAN. The disclosed appliance architecture is suitably accommodating for a "thick" driver-based client 110 also disposed on the LAN, such that the thick client 110 can access the services provided by the appliance 102 in the LAN environment.

The disclosed appliance architecture is suitably operable to provide services to the thin client 104 and the thick client 110 over a packet-switched TCP/IP-based global communication network (GCN) 112 to one or more remote peripherals (114 and 116) disposed thereon. Such remote devices (114 and 116) comprise the same types of network peripheral devices (106 and 108) disposed on the LAN, e.g., printers, faxes, copiers, multifunction peripherals, scanners, etc.

Figure 2:
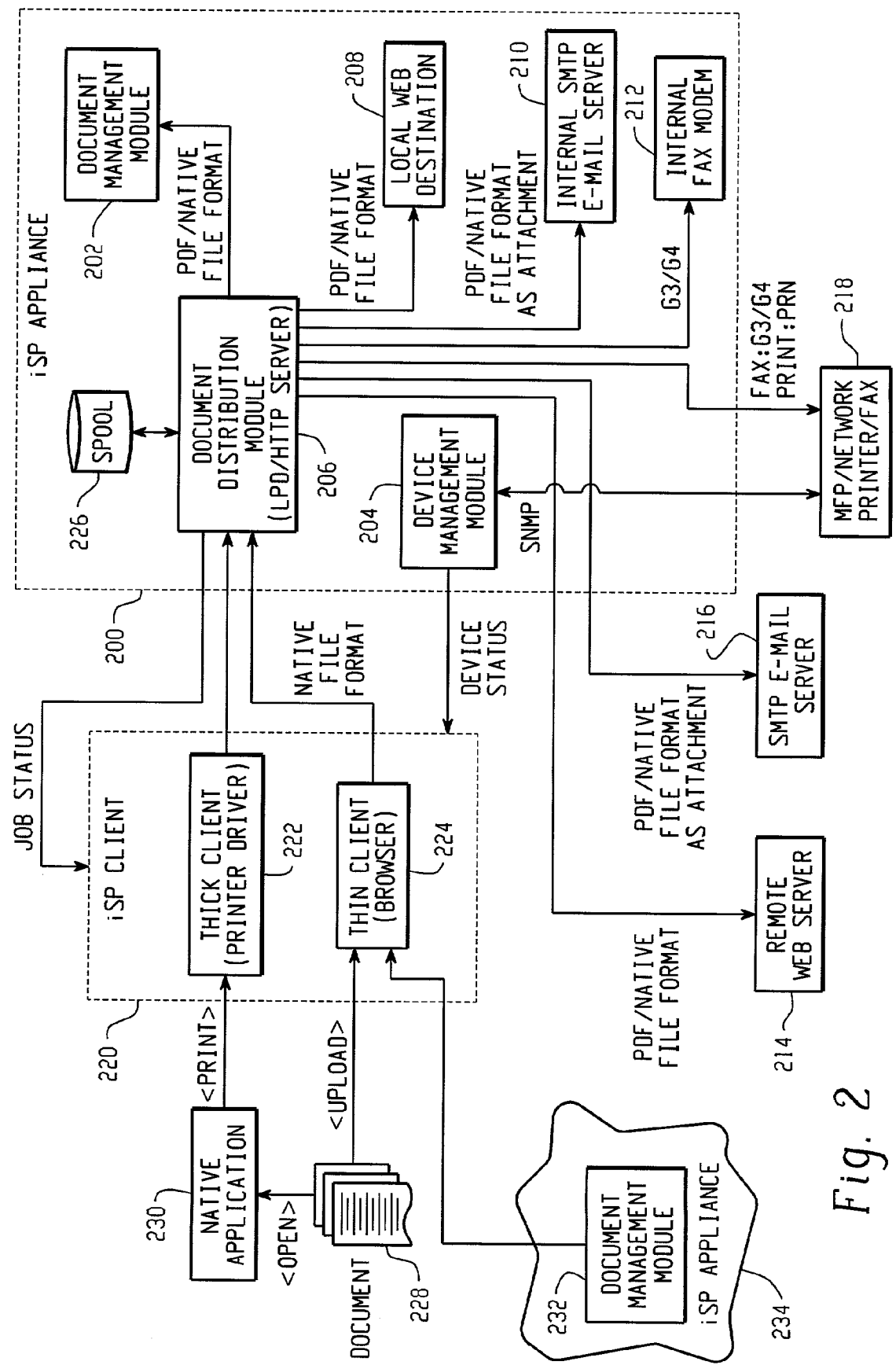
FIG. 2 illustrates a block diagram of a client/server topology, in accordance with a disclosed embodiment.

Referring now to FIG. 2, there is illustrated a block diagram of a client/server topology, in accordance with a disclosed embodiment. From an architectural standpoint, an appliance 200 (similar to appliance 102) is a client/server system comprising a document distribution solution with document management capabilities and device management support. In support of such capabilities, the appliance 200 comprises the following three modules: a Document Management Module (DMM) 202; a Device Management Module (DVMM) 204; and a Document Distribution Module (DDM) 206. Note that the disclosed appliance architecture is not limited to these three modules, but is suitably extensible to include other modules that facilitate document and device management. The main function of the DMM module 202 is to store documents in a central document repository and to facilitate user capability to modify documents, collaborate during document editing, and search and locate stored documents. The main function of the DDM module 206 is to route jobs to destinations such as printers, faxes, e-mail servers, the DMM repository, and web servers. The main function of the DVMM module 204 is to provide a centralized facility for discovering, examining, and controlling networked output devices.

The DDM 206 interfaces to the DMM 202 to distribute documents to the DMM 202 in native file formats, and PDF (Portable Document Format). The DDM 206 interfaces to both internal and external servers to distribute files thereto. For example, the DDM 206 distributes files to one or more local web servers 208 in both PDF and native file formats; one or more internal SMTP e-mail servers 210 in PDF and native file formats, as attachments; and one or more internal fax modems 212 in G3/G4 fax file formats. Where such devices are remote from the appliance 200, the DDM 206 interfaces to one or more of the following devices for the transmission of files thereto: a remote web server 214 in PDF and native file formats; a remote SMTP (Simple Mail Transfer Protocol) e-mail server in PDF and native file formats, as attachments; and a remote MFP/network printer/fax modem 218 in G3/G4 fax file formats.

A client block 220 represents both a thick client type 222 (similar to thick client 110) and a thin client type 224 (similar to thin client 104) with general interfaces to the appliance block 200. The DVMM 204 of the appliance 200 reports device status signals to the client block 220, indicating that such status signals are transmitted to the thick client types 222 and the thin client types 224. Both the thick client 222 and the thin client 224 interface to the DDM 206 for document distribution to selected internal and external devices. The DDM 26 also reports back to the client block 220 the job status of the documents forwarded to the DDM 206 for distribution. Documents received into the DDM 206 are spooled to a spool device 226 internal to the appliance 200.

Documents 228 input to the thick client 222 are opened within a native application 230, and sent to the thick client 222 in response to a print command of the native application 230. Since the thin client 224 is browser-based for selecting documents from a server, the documents 228 are uploaded to the thin client 228. Additionally, the thin client 224 suitably communicates with a remote DMM 232 of a second appliance 234.

Functional Components

Document Distribution Module (DDM) and Clients

The DDM 206 has a client-server architecture, where the appliance 200 is the server component and all the user machines (thin and thick types) are the clients. The primary function of the DDM 206 is to route jobs to various types of destinations from virtually any type of client operating system (OS) (e.g., Windows, Unix, Mac, etc.) without requiring a user to have special skills in managing output devices. As described hereinabove, there are two types of clients available: the thick client 222 (i.e., operating through a printer driver), and the thin client 224 (i.e., operating through a browser). (Note that the thick client 222 is only available on supported Windows platforms.) In the embodiment of FIG. 2, the appliance 200 runs a Linux OS. The DDM 206, in turn, routes the job to its final destination (either internal or external). Thus the appliance 200 becomes the focal point for monitoring and controlling delivery of these jobs to the respective destinations. The clients (222 and 224) offer the capability of saving a particular set of routing options as a profile, and by doing so, simplifies user tasks when submitting jobs with the same options, and to the same destination. The destination types include a network printer (of MFP 218), e-mail servers (210 and 214), web servers (208 and 214), and fax modem (212, and of MFP 218).

Thick Client Distribution

The number and nature of the screens presented to a user by the thick client 222 depends on the type and number of selected destinations. To route a document via the thick client 222, a user opens a document 228 in its native application 230, and selects the File/Print menu. To use the thick client 222 for routing, the native application 230 must support the print functionality of the Windows OS. As a next step, the user needs to select a destination. If the user intends to send the job to only one destination, then the subsequent sequence of steps is similar to any other Windows print operation. However, if the user intends to send the job to multiple destinations, then the user selects the following options: Print Driver, in the Printer dialog box (some applications may have a different way of selecting the destination printer), destination-type(s), specific destination(s), properties of the specific destination, or alternatively, to avoid navigating the property screens, select and load a previously-stored job delivery profile. The user can also store the current job profile.

When the user is in the Print Driver option and further selects the Properties button, a common, generic set of properties (these properties may be overridden by the application's page setup values) can be applied to the routed document, for example, Page Size, Orientation, Color/B&W, and number of Copies.

When in the user is in the destination-types option, the user can select Network Printer, E-Mail, Web post, Fax modem, and DMM. The specific destination can then be selected, and the corresponding properties of the specific destination, for example, E-mail properties, Web-post properties, Fax modem properties, Network printer properties, and DMM properties.

Under the E-mail properties (when this destination type is configured the iSP Admin has to provide the host name of the respective SMTP server), the following options are provided: "To" E-mail address, "CC/BCC" E-mail address, "Subject", "Message", "From User" will be the Windows login username, and Address book with MAPI support. Under the Web-post properties (an iSP web-service needs to be installed on the posting web server), the Document Title and Comment may be viewed. With the Fax Modem properties, the user can select one or more available fax devices and the corresponding vendor specific properties. The Network Printer properties allow the user to select one or more available print devices and the corresponding vendor specific properties. The user can also check the status of the appliance queue associated with the selected device. The DMM properties (the document is routed to a user inbox) allow the Document Title and Comments to be viewed. Alternatively, to avoid navigating the property screens, the user has the option to select and load a previously stored job delivery profile. The user can also store the current job profile.

Thin Client Distribution

The thin client 224 can send documents to all destinations that can be reached via the thick client 222 with one important distinction—no format conversions are applied to these documents. These documents are delivered to the final destination in the original (i.e., "native") format.

The browser interface featured by the thin client 224 provides a user the capability to browse for the document that needs to be distributed to one or more destination devices, select one or more destination types, select one or more specific destinations, and select the properties of the specific destination. When selecting the destination-types, and in the case of a printer or fax destination, the document 228 should be in the specific format supported by the respective printer or fax, as the document will be routed as is. The thin client 224 supports the following destination types: network printer, e-mail, web server post, fax modem, and DMM. The specific destinations can then be selected, and the corresponding properties of the specific destination, for example, e-mail properties, web-post properties, fax modem properties, network printer properties, and DMM properties.

Under the E-mail properties (when this destination type is configured the iSP Admin has to provide the hostname of the respective SMTP server), the following options are provided: "To" E-mail address, "CC/BCC" E-mail address, "Subject", "Message", "From User" will be the Windows login username, and Address book with MAPI support.

Under The Web-post properties (a web-service needs to be installed on the posting web server), the Document Title and Comment may be viewed. With the Fax Modem properties, the user can select one or more available fax devices and the corresponding vendor specific properties. The Network Printer properties allows the user to select one or more available print devices, however, no vendor-specific properties are selectable. The user can also check the status of the appliance queue associated with the selected device. The DMM properties (the document is routed to a user inbox) allow the Document Title and Comments to be viewed.

The client installation is performed according to the type of client and user platform. For Windows platforms, the thick client 222 is installed via a point-and-print capability. The thick client 222 can also be installed by pointing the browser to the URL (Uniform Resource Locator) path of the appliance 200. The thin client 224 does not require any special installation, as this functionality is made available by pointing the browser to the URL of the appliance 200. For Unix platforms, the thin client 224 does not require any special installation, as this functionality is made available by pointing the browser to the URL of the appliance 200.

Document Distribution Module (DDM)

Figure 3:
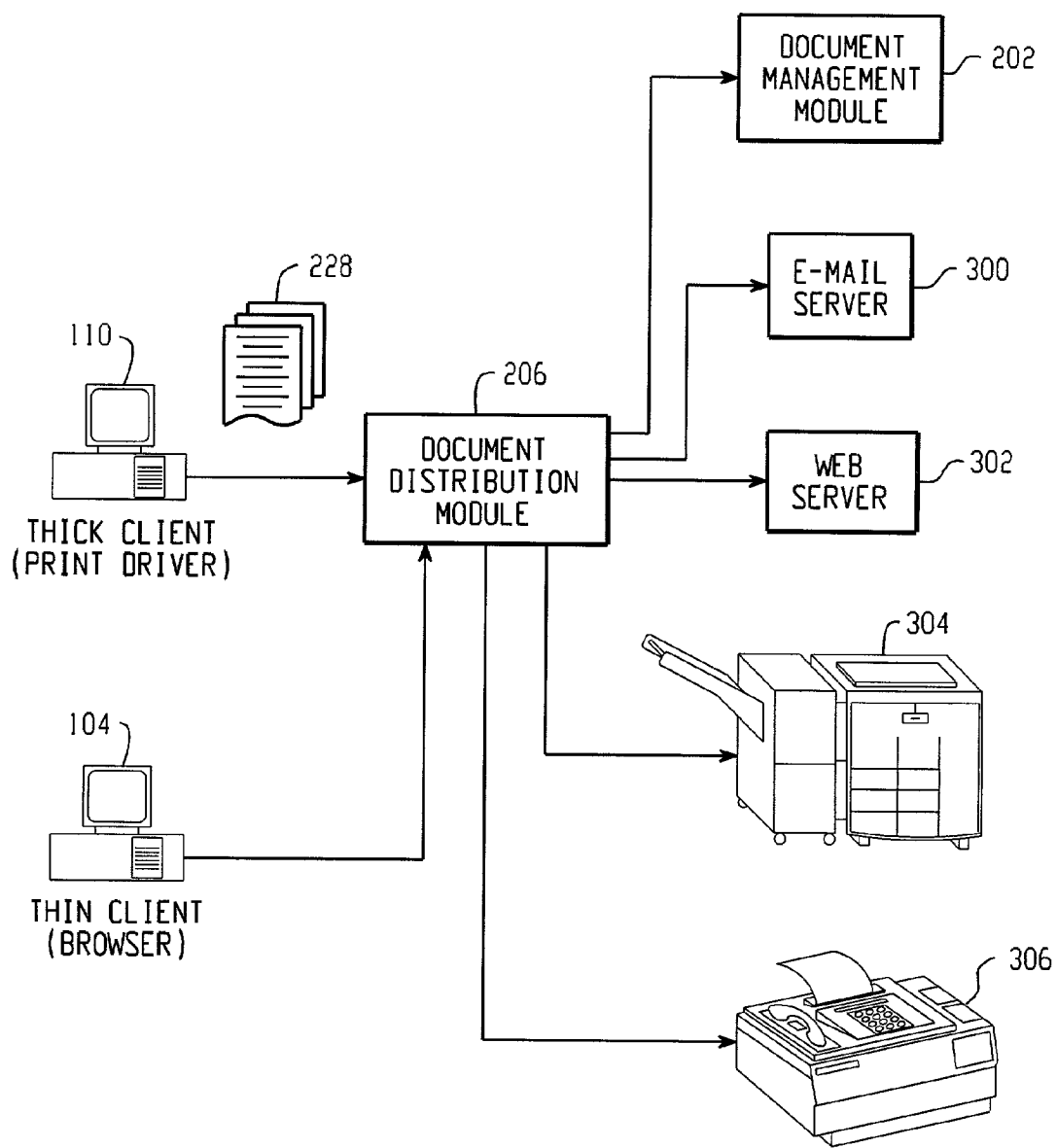
FIG. 3 illustrates a general block diagram of client interaction with the document distribution module and destination devices.

Referring now to FIG. 3, there is illustrated a general block diagram of client interaction with the document distribution module and destination devices. As indicated in FIG. 2, the thin and thick clients (104 and 110) communicate documents and files through the DDM 206 to several destination devices. The thick client 110 transmits documents 228 via the native application 230 (of FIG. 2) to the DDM 206 to any of the DMM 202, an e-mail server 300 (similar to internal e-mail server 210 and/or external e-mail server 216), a web server 302 (similar to local web destination server 208 and/or remote web server 214), printer 304 (which may be either local or remote), and fax 306 (which is similar to internal fax 212 or the fax incorporated as part of the MFP 128).

Figure 4:
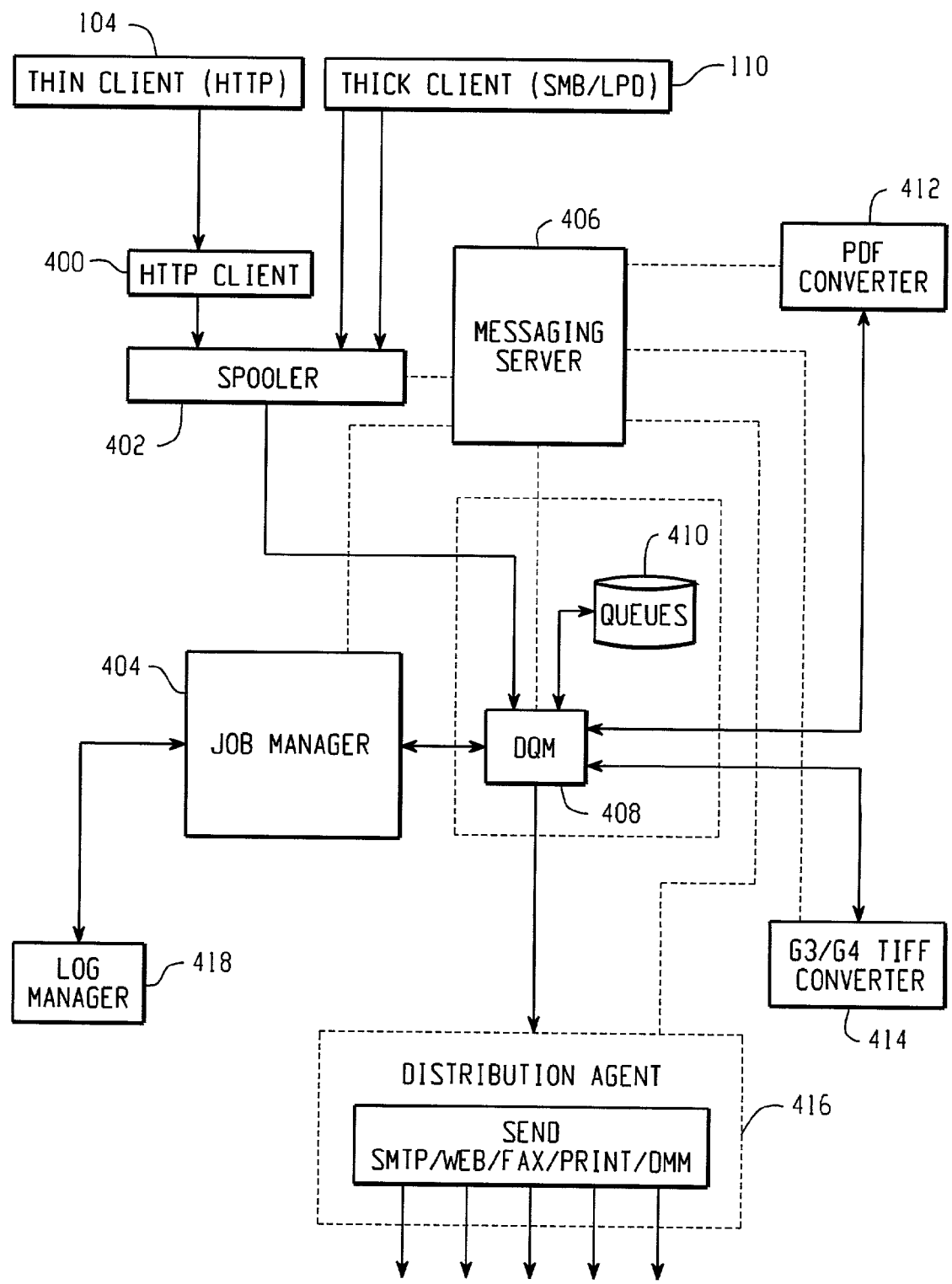
FIG. 4 illustrates a block diagram of the document distribution module (or server)

Referring now to FIG. 4, there is illustrated a block diagram of the document distribution module (or server). The primary function of the DDM 206 is to send a document from the appliance 200 to a specified destination, which is accomplished in a succession of major functional steps. A document from a client (either the thin client 104 or the thick client 110) is received into the DDM 206. As mentioned hereinabove, the thin client 104 is browser-based, thus the document is selected via the browser and transmitted to the DDM206 via a browser client 400 (e.g., HTTP client software) to a spooler 402 (similar to the spooler 226). The thick client is also suitably operable to send documents to the spooler 402 utilizing conventional printer daemons, e.g., LPD for Unix, and SMB for Windows. The spooler 402, in turn, sends a message to a Job Manager 404 to create a new job. A Messaging Server 406 provides messaging services between all of the DDM components. The Job Manager 404 creates a job by passing a request to a Document Queue Manager (DQM) 408. The DQM 408 creates a job record, and returns a job-ID to the Job Manager 404 and further, back to the Spooler 402. The Spooler 402 passes the document to queues 410 maintained by DQM 408. Once the Spooler 402 finishes spooling the job, it sends a message via the Messaging Server 406 to the Job Manager 404.

If the job type is a "print" function, the Job Manager 404 notifies a corresponding converter of the arrival of a new job. A PDF/TIFF converter 412 retrieves the document from the queue 410, notifies the Job Manager 404, and performs the corresponding conversion. Once the conversion is completed, the PDF/TIFF converter 412 places the document back in the queues 410, and a notification is sent to the Job Manager 404. Similarly, if the print job requires G3/G4 conversion, the job is sent to a G3/G4/TIFF converter 414. Once converted, the G3/G4/TIFF converter 414 places the document back in the queues 410, and a notification is sent to the Job Manager 404.

If the job is ready (i.e., spooled and/or converted), the Job Manager 404 sends a message to a Distribution Agent 416. The Distribution Agent 416 retrieves the job from the queues 410, and sends it to the respective destination (e.g., Web, fax, printer, DMM, e-mail server, etc.). Once the Job Manager 404 completes processing a job, the event is logged by a Log Manager 418 component.

Job Management

An Administrator, or the owner of the job, can use a browser-based interface to monitor and manipulate jobs sent to the appliance 200. The Job Manager 404 maintains job information in the job record, which job record consists of the following fields: Job Name, Job Id, Job Owner, Department Name, Job State, Destination, Submission time, Start processing time, Completion time, Page count, Size. A user can initiate a job search by providing job properties such as Owner name (Admin only) and Destination name. If no value is specified, all jobs are searched. As a result of a successful job search, the following job details are provided to the user: Name, Status, Destination, and Submission time. The Administrator, or the owner of a job, can perform the following job operations: Pause, Resume, Resubmit, Restart, Delete, Promote (Admin only), and Demote (Admin only).

The Job Manager 404 does not send the job to the physical destination if the destination is not ready. For each destination type there is an agent program that is responsible for routing the job to its final destination. These individual agents are responsible for notifying the Job Manager 404 if the job was successfully delivered. As a result, the Job Manager 404 can provide a user with job status information, and notify the user if the job was successfully delivered or if error conditions were encountered. If errors are encountered, the respective Distribution Agent 416 retries to deliver the job. The job is discarded after a predetermined number of retries is exceeded. The Job Manager 404 saves the jobs received by the appliance 200 for a predetermined period of time that configured by the Administrator.

Configuration Management

Figure 5:
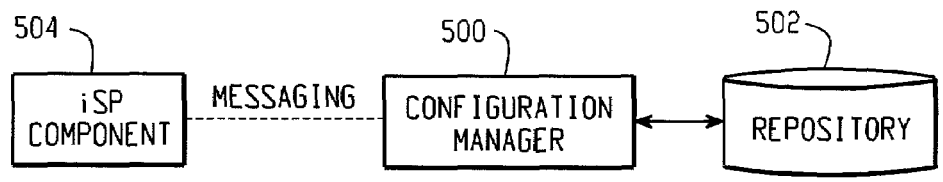
FIG. 5 illustrates a general block diagram of the messaging exchange between an appliance component and a Configuration Manager.

Referring now to FIG. 5, there is illustrated a general block diagram of the messaging exchange between an appliance component and a Configuration Manager. The Configuration Manager 500 maintains a tree-like structure (based on the Windows Registry) in a common repository 502. The tree structure stored in the repository 502 represents the respective configuration information of a component 504. The iSP component 504 accesses the repository 502 by providing a key, whose value can be changed via a "set" method, or retrieved via a "get" method. The Configuration Manager 500, which hides the storage/retrieval details, communicates with the iSP component 504 via messaging provided by the Messaging Server 406.

Distribution Print Agent

Figure 6:
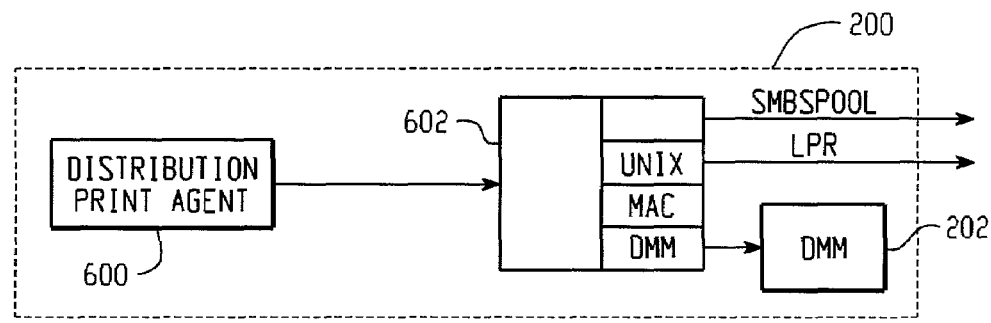
FIG. 6 illustrates a flow diagram of a document from a Distribution Print Agent of the appliance to the desired destination devices.

Referring now to FIG. 6, there is illustrated a flow diagram of a document from a Distribution Print Agent 600 of the appliance 200 to the desired destination devices. The Distribution Print Agent 600 is the extension of the Distribution Agent 416 responsible for delivering a document to a print destination or to the DMM 202. This is accomplished by examining the respective job record and identifying the destination name, destination type and user name (this information is provided by the client). If the destination type is for printing the job (i.e., in response to a "print" function), the Distribution Print Agent 600 communicates with the Configuration Manager 500 to determine other details, such as queue name, and printer hostname/IP. If the destination type is stipulated as "DMM", the only information that needs to be provided by the client is the username. When a print destination is created, the attributes of the newly created destination are stored in the repository 502 managed by the Configuration Manager 500. Once the destination attributes are resolved, a destination router 602 routes the respective job to its destination (e.g., "LPR"—an off-line print command that associates a printer in the Unix OS, "smbspool" for SMB, DMM for the DMM 202, MAC for an Apple output device, etc.).

Distribution Mail Agent

Figure 7:
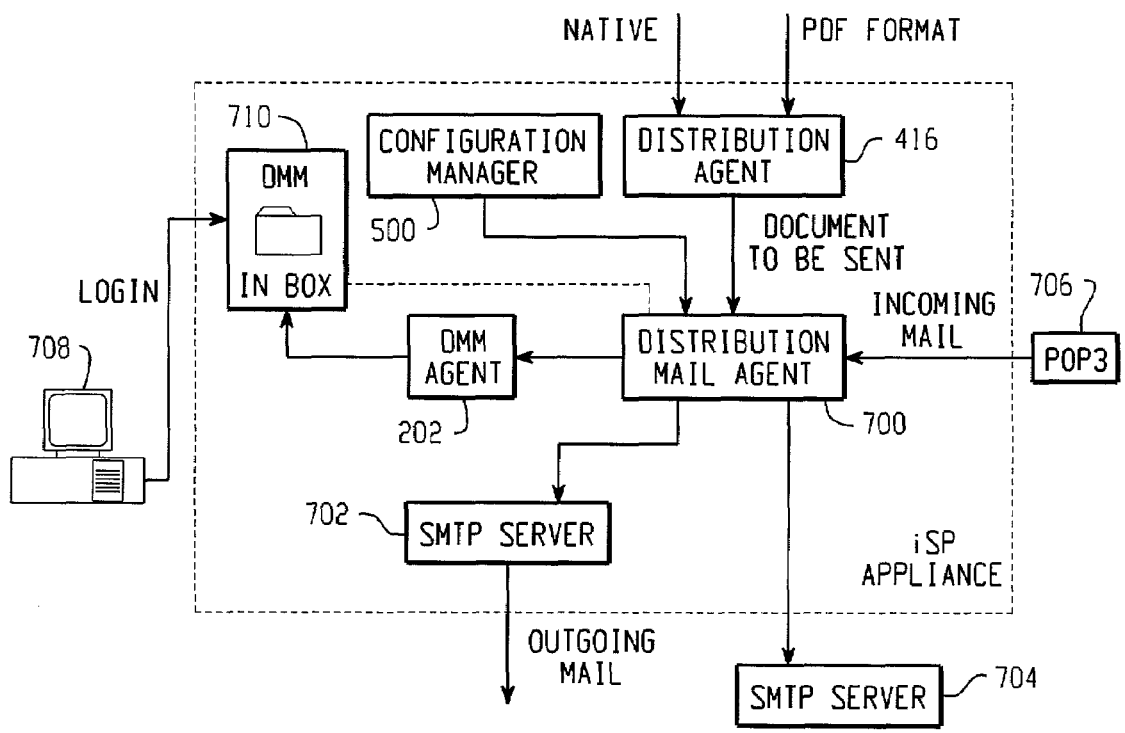
FIG. 7 illustrates a flow diagram of a document to and from a Distribution Mail Agent and other components of the appliance, in accordance with a disclosed embodiment.

Referring now to FIG. 7, there is illustrated a flow diagram of a document to and from a Distribution Mail Agent 700 and other components of the appliance 200, in accordance with a disclosed embodiment. The Distribution Mail Agent 700 is the extension of the Distribution Agent 416 responsible for mailing a document (in either native or PDF format) received from the Distribution Agent 416 via an on-board send mail server 702 (similar to internal SMTP server 210) or an externally configured SMTP mail server 704. The Distribution Mail Agent 700 is also responsible for fetching incoming mail from an external POP3 (Point-of-Presence version 3) mail server 706. As soon as a user 708 logs in to the network, the DMM module (or agent) 202 sends a message to the Distribution Mail Agent 700 via the Messaging Server 406 (not shown here) to register the respective user 708 as a logged-in user, and to fetch any newly arrived mail. Newly retrieved mail is stored in a user DMM inbox 710 via the DMM agent 202. When the user 708 logs out, the DMM module 202 sends a message to the Distribution Mail Agent 700 via the Messaging Server 406 to de-register the respective user 708. The Configuration Manager 500 maintains configuration information about the POP3 server 706, internal SMTP outgoing mail server 702, and external SMTP outgoing mail server 704.

Distribution Fax Agent

Figure 8:
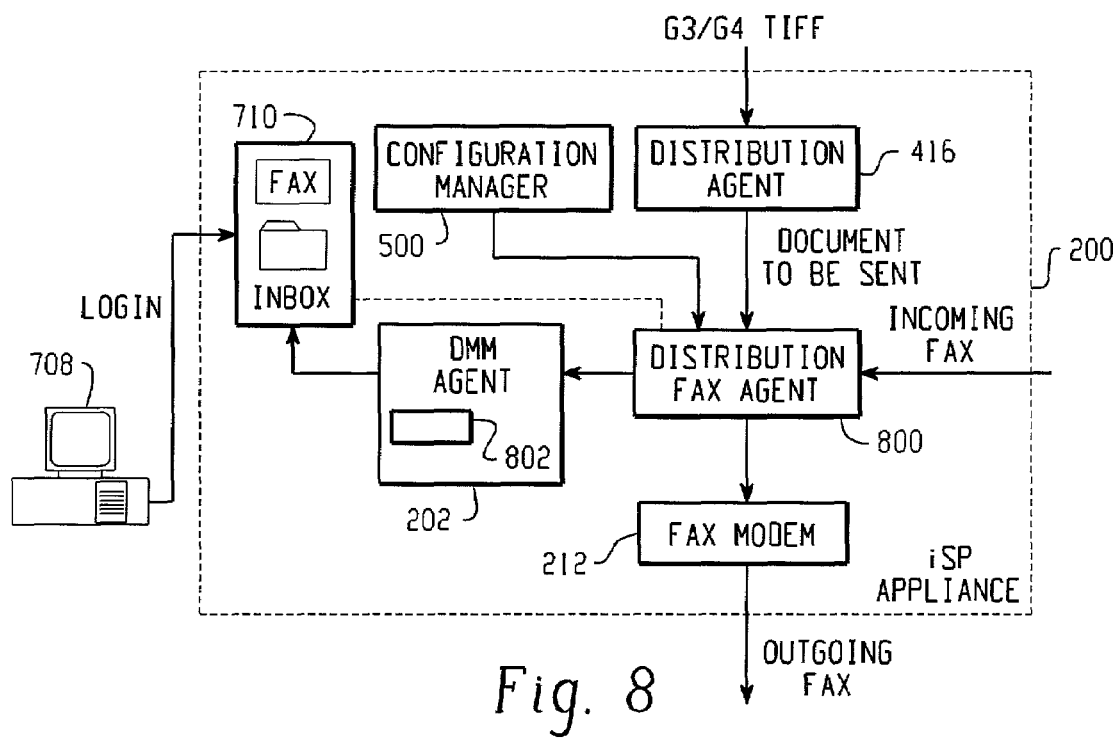
FIG. 8 illustrates a flow diagram of a document to and from a Distribution Fax Agent and other components of the appliance, in accordance with a disclosed embodiment.

Referring now to FIG. 8, there is illustrated a flow diagram of a document to and from a Distribution Fax Agent 800 and other components of the appliance 200, in accordance with a disclosed embodiment. The Distribution Fax Agent 800 is the extension of the Distribution Agent 416 responsible for faxing a document via the internal fax modem 212 or via an external fax server (illustrated in FIG. 2 as a part of the MFP server 218). Incoming faxes are sent from the Distribution Fax Agent 800 to the DMM agent 202. All incoming faxes are distributed to a common fax inbox 802, from where the fax documents can be automatically or manually moved to the user inbox 710 of the user 708 (of FIG. 7). Support for incoming faxes is provided for various vendor MFP devices 218 (with fax unit installed) and for the on-board fax modem 212. Outgoing faxes are sent from the Distribution Fax Agent 800 to the internal fax modem 212 for transmission therefrom. Support for the external fax server 218 (not shown) is achieved via the vendor provided fax driver.

Distribution Web Post Agent

Figure 9:
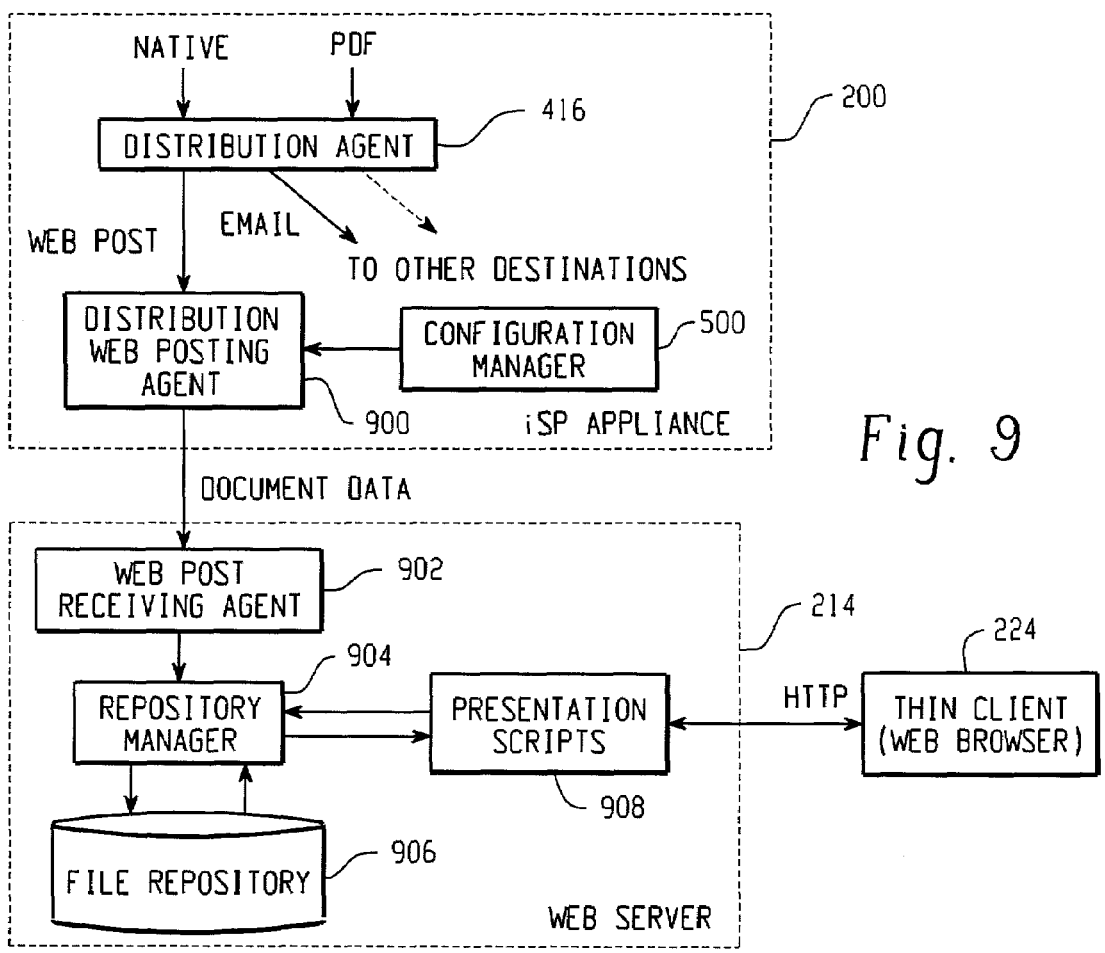
FIG. 9 illustrates the block interfaces between a Distribution Web Posting Agent of the appliance and the remote web server.

Referring now to FIG. 9, there is illustrated the block interfaces between a Distribution Web Posting Agent 900 of the appliance 200 and the remote web server 214. The Distribution Web Post Agent 900 is an extension of the Distribution Agent 416 responsible for posting a document to a Web site. When the Distribution Agent 416 identifies the job type as "Web Post", it sends the document to the Web Posting Agent 900. The Web Posting Agent 900 gets the address of the Web destination from the Configuration Manager 500 and consequently, sends the document, along with the document meta data, to the identified Web destination. The following components are installed on the website hosting the Web postings: Web Server software, a Web Post Receiving Agent 902, a Repository Manager 904 connected to a file repository 906 for storing website information, and Presentation Scripts 908.

The Web Post Receiving Agent 902, at the posting destination, receives the document sent by the Distribution Web Posting Agent 900 and stores it in the file repository using the Repository Manager 904. The Repository Manager 904 maintains the posted documents, as well as the corresponding meta data, in the file repository 906. The user posts a document by using either the thick client 222 or the thin client 224. If documents are submitted for posting via the thick client 222, the documents are converted to PDF format. On the other hand, if the documents are submitted via the browser-based thin client 224, the documents are posted in the source format. The Presentation Scripts 908, via the Repository Manager 904, provides the user with access to the posted documents.

The DMM module 202 creates a posting container (also denoted a "Posting Box"), for each user. The Posting Box is automatically created when a user web-posts a document for the first time. The user who accesses the Posting Box via the thin client 224 is able to perform a number of operations. The user can view either the list of all posted documents or a list of documents posted on the current day, current week, or current month. The user can also delete documents contained in the respective Posting Box. The user can also view attributes of a posted document. The following attributes are visible: Publishing Date, Expiration Date, Title and Description. The document is deleted once the expiration date is reached. The user can modify the Title and Description of the posted document. Only Administrators can view and delete user Posting Boxes.

MFP Scan Agent

Figure 10:
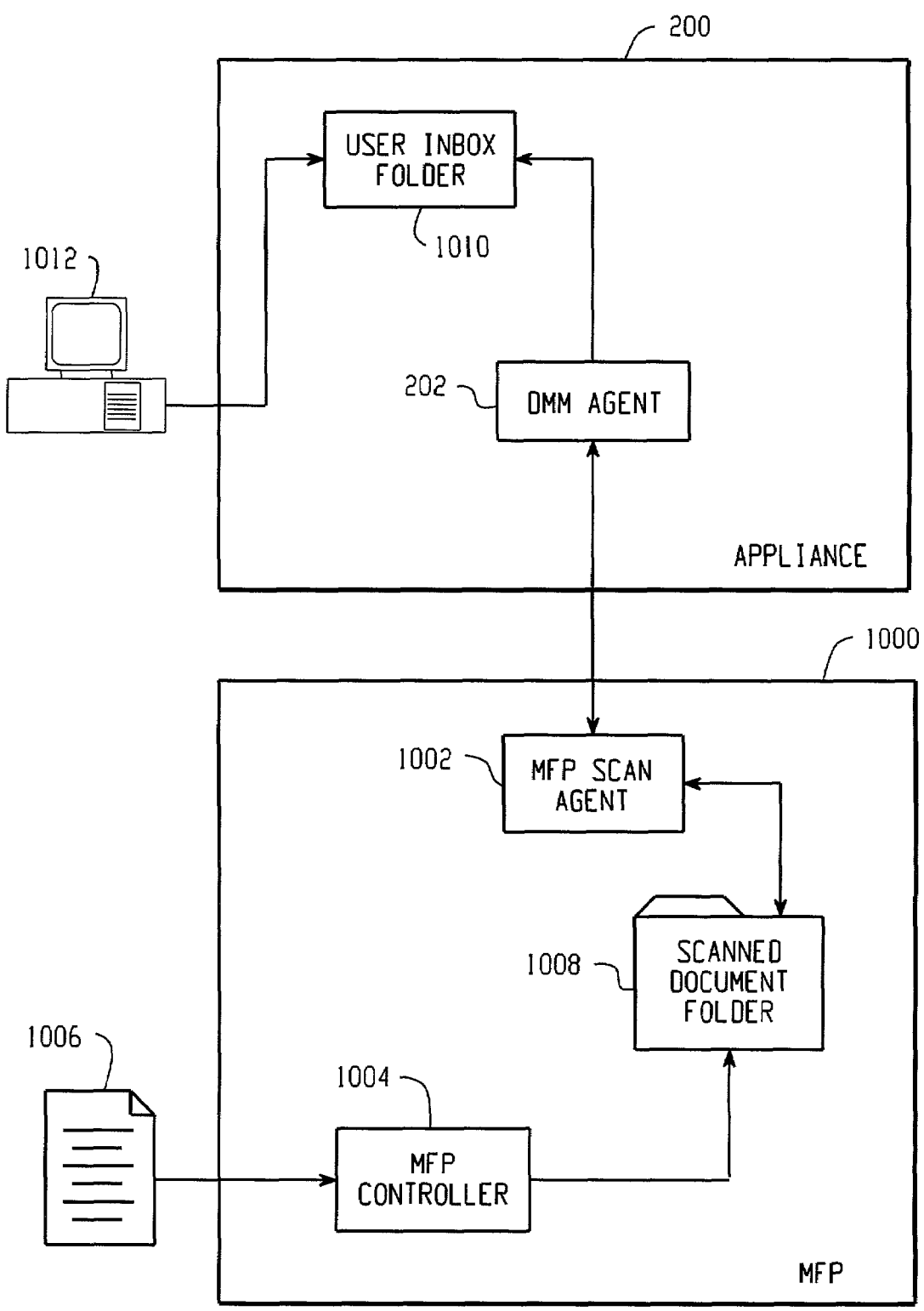
FIG. 10 illustrates a block diagram of a MFP device having a scan function, and the associated document flow to the appliance.

Referring now to FIG. 10, there is illustrated a block diagram of a MFP device 1000 having a scan function, and the associated document flow to the appliance 200. The MFP scan device 1000 includes an MFP Scan Agent 1002 that is a separate application that runs on a supported MFP device 1000. An MFP controller 1004 controls onboard functions of the MFP device 1000 including processing of a document 1006 into an image. The image file is then stored in a scanned document folder 1008 by the MFP controller 1004. The MFP Scan Agent 1002 monitors the document image folder 1008 and, as soon as the image file is placed in the image folder 1008, the MFP Agent 1002 initiates a document transfer to the appliance 200. The MFP Agent 1002 identifies the appliance 200 by its hostname/IP address, and sends the document image file to the DMM Agent 202 of the appliance 200. Based on the username provided by the MFP Scan Agent 1002, the DMM Agent 202 stores the document in a user inbox folder 1010, from which a user 1012 can then retrieve the document image for processing.

DDM Configuration, Setup and Maintenance

The Administrator is the only user who can perform configuration and set up procedures. After logging into the appliance200, these operations become available via a browser-based interface. The iSP Configuration Manager 500 maintains the configuration information. The browser-based interface offers the capability of performing a series of configuration operations. The iSP Administrator can perform the following general maintenance type operations: change iSP Admin password, change system date, shutdown the appliance 200, initiate backup procedures, i.e., backup of all the DDM configuration data, and define the period of time after submission that jobs are saved on the appliance server before being discarded.

A user can query and list the destinations made available by the appliance 200. By default, if no value is specified, all configured destinations are listed. Providing additional information, such as Destination name and Destination type, can narrow the search results. The following destination attributes are displayed: Destination name, Description, Destination Type. The Administrator can manipulate the destinations utilizing the following operations: Pause destination, Resume destination, Delete destination, and Copy destination.

The Administrator creates a print destination by discovering available printers, specifying the name and description of the logical destination, and identifying the driver associated with the logical destination. Available printers are discovered on the network by using a DVMM discovery utility. If the user provides the IP address or the hostname of a specific printer, then only the respective printer will be discovered. Printer attributes such as its IP address (if not initially specified) and SNMP details will be displayed. Once the printer is discovered, the Administrator needs to specify the name and description of the respective logical destination. Finally, the user identifies the driver that will be associated with the logical destination by selecting a driver from a list of Windows print drivers (to support point-andprint) or Linux filters (to support LPR printing). If the required driver or filter is not available, the user has the option of associating "none" (default driver) driver/filter with the queue. The Administrator uploads and associates the Windows driver with the respective queue through the Windows Point-and-Print feature. This information is passed to the configuration manager 500 and to the Samba printing system to provide Point-and-Print support for clients.

The Administrator can group multiple individual logical print destinations into a logical group. The logical grouping is supported only for individual logical destinations that point to similar printers (e.g., same PDL). The Administrator creates a group destination by identifying individual Logical Print Destinations, a Group Name, and Group Description.

The Administrator creates a mail destination by providing the SMTP host name, POP3 host name, and Description.

The Administrator creates a Web destination by providing the Web server host name/IP Address, HTTP port, and Description.

The Administrator creates a Fax destination by providing similar fax-related information.

The Administrator selects via the browser interface the events that will generate notifications. Such events include job spooling, format conversion errors, etc.

The appliance server 200 maintains a database that records the attributes of all jobs submitted to the appliance 200. Once processing of a job is completed, job information becomes available via accounting reports. The job information includes User ID, Department ID, Printer ID, final job status, number of simplex printed pages, number of duplex printed pages, paper type, paper size, color versus black and white, finishing, amount of toner used, date and time of the creation of the accounting record, and processing time. The processing time includes the start of client transmission, end of client transmission, start of appliance transmission, end of appliance transmission, and total appliance CPU time.

The browser interface for the accounting component allows the Administrator to enable job accounting for a specific printer, enable job accounting for a specific user, define the unit cost for the following items: toner, paper (size), color versus black and white, finishing (finishing, binding, stapling), and processing time. The browser interface also provides for the export the accounting data in CSV (comma separated variable) format. The browser interface provides for generating accounting reports, and filters the accounting data according to User ID, Department ID, Printer ID, and amount of used toner.

The appliance 200 supports network protocols such as TCP/IP, Windows NT, etc. Whenever required, the browser-based interface allows the Administrator to enter TCP/IP and Windows NT network configuration data. The TCP/IP data includes automatic set up via DHCP server, and manual setup information including IP address, subnet mask, default gateway, DNS address, and domain name. The Windows NT network data includes hostname of appliance 200, WINs server address, domain or workgroup name, and option to allow NT domain authentication.

Device Management Module (DVMM)

Figure 11:
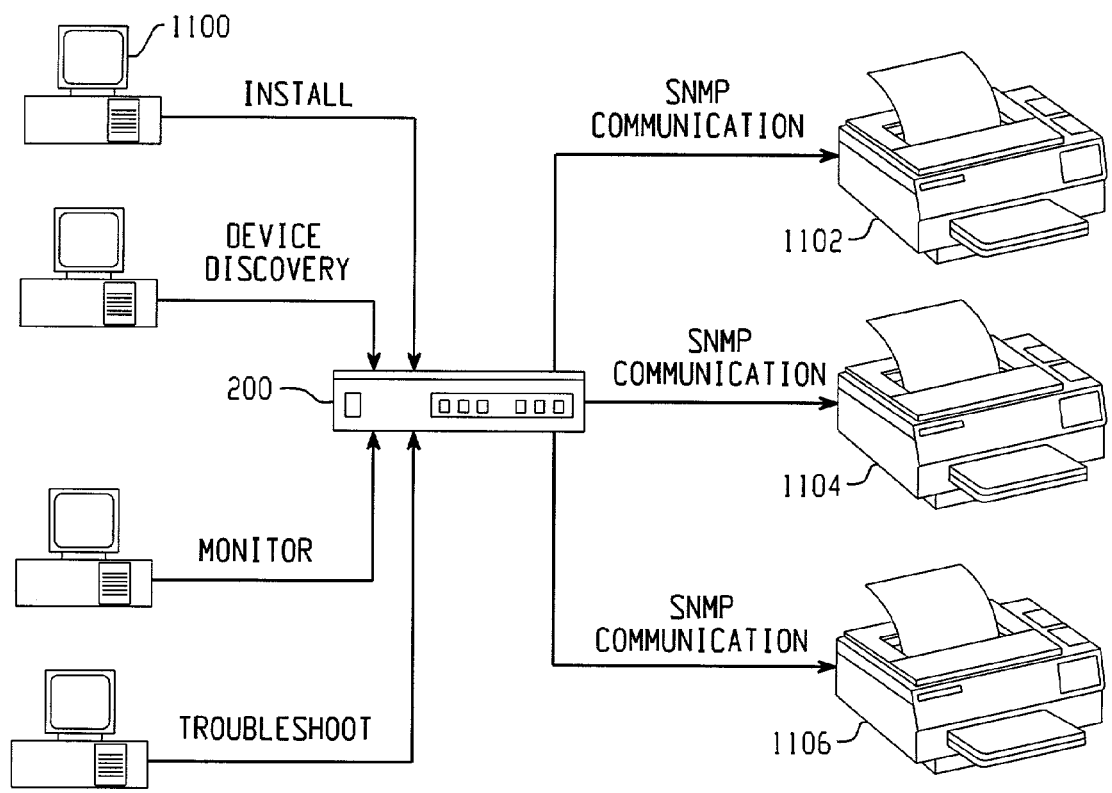
FIG. 11 illustrates a general block diagram of device management functions provided by the device management module of the appliance.

Referring now to FIG. 11, there is illustrated a general block diagram of device management functions provided by the device management module 204 of the appliance 200. The DVMM 204 provides a user 1100 with the capability to administer and manage networked devices (1102 and 1104) and other SNMP-compliant printers 1106. The user 1100 accesses the DVMM 204 functions via a browser interface.

Other appliance modules, such as DDM 206, can programmatically access the DVMM 204 functionality via a Java Beans interface.

Device discovery represents the process by which a user locates the available TCP/IP and IPX/SPX network devices, e.g., SNMP-compliant printers. Only authorized users have access to the DVMM 204 functionality and therefore, to initiate the device discovery process, the user 100 first has to login the appliance 200 by providing a valid login name and password.

Figure 12:
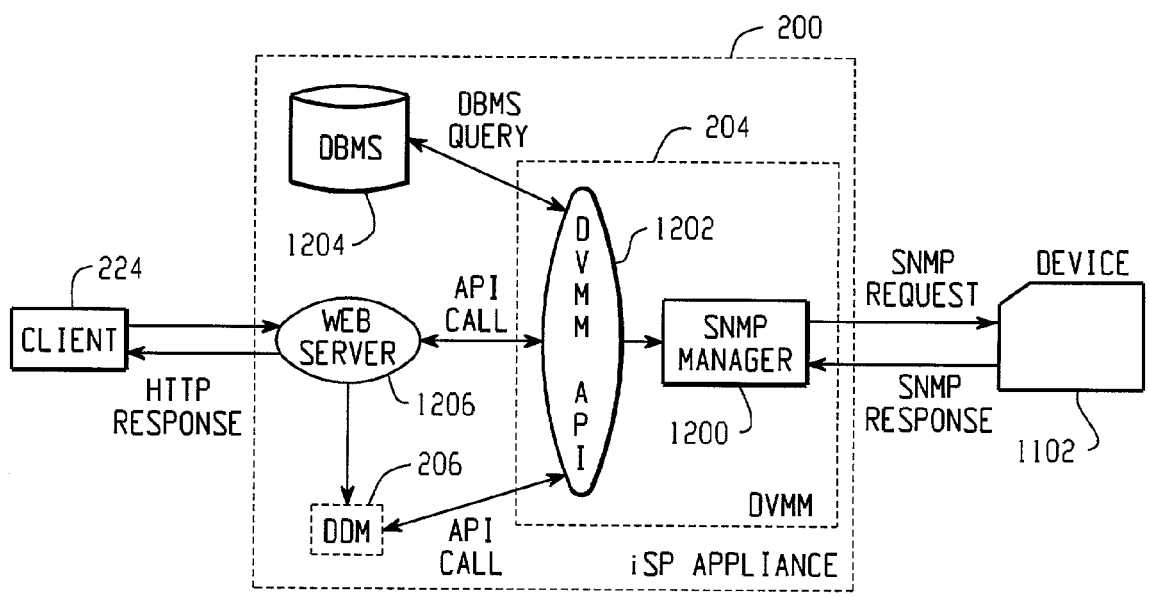
FIG. 12 illustrates a block diagram of the DVMM architecture.

Referring now to FIG. 12, there is illustrated a block diagram of the DVMM architecture. The DVMM 204 of the appliance 200 contains an SNMP Manager 1200 that communicates SNMP requests to SNMP-compliant output devices 1102, and receives SNMP responses therefrom. The SNMP Manager 1200 interfaces to a DVMM API (Application Programmable Interface) 1202 for interfacing to a DBMS (Database Management System) 1204 via DBMS queries, the DDM 206 via API calls, and an internal web server 1206 via suitable API calls. A client 1208 (similar to either the thin client 224 or thick client 222) communicates HTTP traffic to the internal web server 1206 for the configuration of the destination devices.

The user performs device discovery in one of several ways. Without specifying any criterion, a list of all discovered devices are shown to the user. By specifying a filtering criterion, device discovery is limited to devices that match the specified criterion. By providing any of the following filtering criterions, such as the ones listed below, the scope of the search can be narrowed: device description, device model, hardware address, IP address, IP host name, and type of print servers. The following attributes characterize the discovered devices: device icon, device model, hardware address, IP address, host name, IPX name, and IPX address. If so desired, users can drill down and examine additional device attributes such as description of the device, information regarding the person responsible for operating the device (e.g., name, telephone number, fax number, e-mail address), name of input trays and respective maximum capacity, type and color of medium (paper) associated with the respective tray, type of marking technology used for this device, PDL languages supported by the device, support for duplex printing, and if applicable, hyperlink to the device server. The DVMM module 204 gathers the above listed device information by using the SNMP protocol.

The Administrator can manually add a device to the list of discovered devices by providing any one of the IP address, IP host name, IPX address, and hardware address.

By grouping devices together, users can perform operations that address all members of the group. The user can create a device group and provide a unique device group name. Once the device group is created, the user can add devices to the group, or delete devices from the group. The user can perform device group operations, including creating a device group by providing a group name, deleting a device group, adding devices to the group by selecting the individual device from the list of devices identified during the discovery process, deleting devices from the device group, and examining the status of all devices that are part of a device group.

The DVMM 204 provides users with the capability to examine the status of discovered devices by employing the methods presented in device discovery. The user can request the status of discovered devices by selecting the respective device. To obtain this status, the DVMM 204 polls the device at time intervals that are pre-defined by the Administrator. The status of a selected device is provided by a hyperlink to the device application for a detailed device status, or for status information including ready, paper jam, input tray open, printing, and off-line.

Users are able to examine the job status of discovered devices. Note that this represents the job status at the device, and not at the appliance 200. By activating a hyperlink to an associated application running at the respective device, users can examine not only the status of their jobs, but have access to the entire set of features available in the application.

The Administrator can configure discovered devices from his or her computer desktop. Device configuration is available for devices that provide a device server, which can be accessed via its hyperlink.

Users can install device drivers by downloading the drivers from a staging area on the appliance 200. The Administrator primes this staging area with drivers via the device driver configuration process. The Administrator uploads device drivers to the staging area by navigating to the appliance 200 via the Windows Network Neighborhood and using Microsoft's Point-and-Print functionality, or via a web interface that facilitates the upload. The Administrator can delete the uploaded driver from the common area by navigating to the appliance 200 through Windows Network Neighborhood and then selecting the printer to delete, or via a web interface that facilitates the delete operation.

Users can download drivers to their workstations by navigating to the appliance 200 via the Windows Network Neighborhood and using Microsoft's Point-and-Print functionality, or via a web interface that facilitates the download. The appliance 200 can also provide a hyperlink to a driver page for the latest device drivers.

Figure 13:
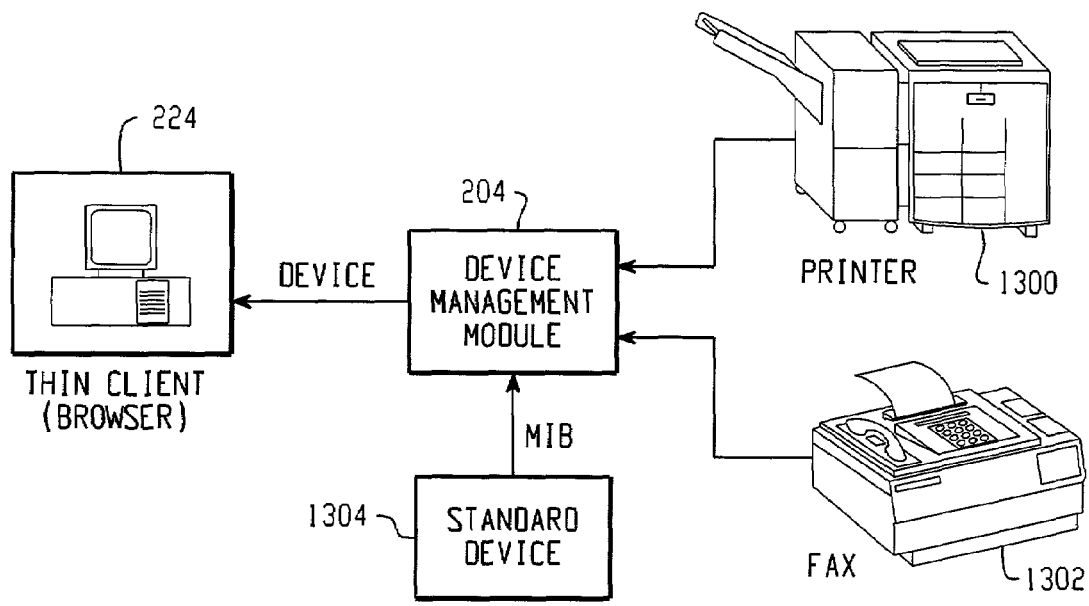
FIG. 13 illustrates a block diagram of the a thin client examining the status of peripheral devices utilizing the Device Management Module of the appliance.

Referring now to FIG. 13, there is illustrated a block diagram of the thin client examining the status of peripheral devices utilizing the Device Management Module 204 of the appliance 200. The thin client 224 utilizes the browser interface where the appliance 200 presents to the client user device information related to various network devices. For example, the client user can discover available TCP/IP and IPX/SPX devices such as a network printer 1300, network fax 1302, and an SNMP-compliant device 1304. The client 224 is the portal into which the user can group devices, check device status and job status and, configure the devices and corresponding device drivers.

Document Management Module (DMM)

Figure 14:
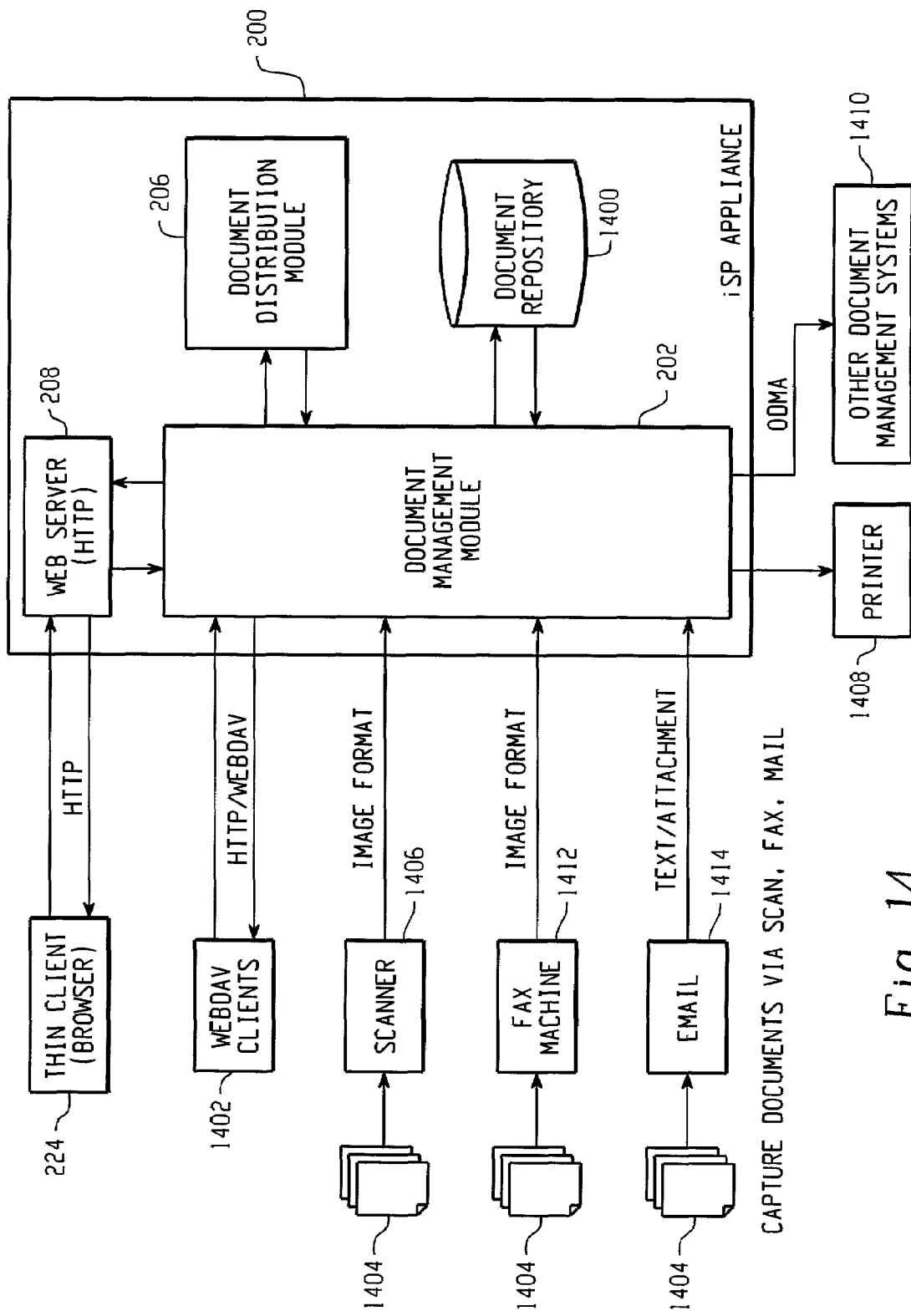
FIG. 14 illustrates the Document Management Module of the appliance, and general interfaces thereof.

Referring now to FIG. 14, here is illustrated the Document Management Module 202 of the appliance 200, and general interfaces thereof. The DMM component 202 enables users to quickly store and retrieve documents from a central repository 1400. The user can share the documents and conduct collaborative work between various workgroups. Users of the appliance 200 utilize a browser-based Graphical User Interface (GUI) to access documents stored in a DMM repository 1400. The DMM component 202 offers support for conventional browsers, e.g., Microsoft Internet Explorer and Netscape Navigator. The internal web server 208 is accessible by the thin client 224 via a browser using the HTTP protocol. A WebDAV (Web Distributed Authoring and Versioning) client 1402 communicates with the web server 208 utilizing HTTP and WebDAV protocols. WebDAV is a two-way protocol designed to support editing of Web sites and handling of meta data.

A document 1404 input via a scanner 1406 is transmitted to the DMM 202 in the form of an image. The DMM 202 then routes the image to the repository 1400 for storage. The image can also be forwarded to the DDM 206 for further routing to an output device, e.g., a printer 1408. The image file can also be routed to other document management systems (ODMS) 1410 of a remote appliance over the network, and preferably ODMA compliant. Similarly, the document 1404 input to a fax machine 1412 is converted to an image format and routed to the DMM 202. The document 1404 input to an e-mail device 1414 is processed as text or an attachment to a message and forwarded to the DMM 202. Both the fax image and processed e-mail document can be routed to the printer 1408, repository 1400, and ODMS 1410, and/or other output devices via the DDM 206. For security reasons, access to DMM objects is restricted to authorized users, who have to provide a login name and password when presented with the login screen.

The Administrator can view properties of the repository 1400 via an interface, including Name, Comment, Modified Date and Time, Created Date and Time, Accessed Date and Time, Last Backup Date and Time, Total Space Used, Space Available, Space Assigned, and Document Aging. The Administrator can change properties of the repository 1400 such as Name, Comment, Space Assigned, and Document Aging.

As mentioned hereinabove, the DMM 202 has the main task of storing and organizing user documents. A user can send/file documents to the DMM repository 1400 utilizing any of the following agents: for an incoming fax-DMM Fax Agent; for Print to DMM-DMM Print Agent; for an incoming e-mail-DMM Mail Agent; and for scanned documents-DMM Scan Agent. In the case of the Print and Scan operations, routing is performed based only on the username. In the case of the fax and e-mail operations, additional information is required. The E-mail Agent retrieves the mail from the POP3 server by using the E-mail ID and password of the POP3 Account. The Fax Agent utilizes a self-generating PIN (Personal Identification Number) for incoming faxes.

Figure 15:
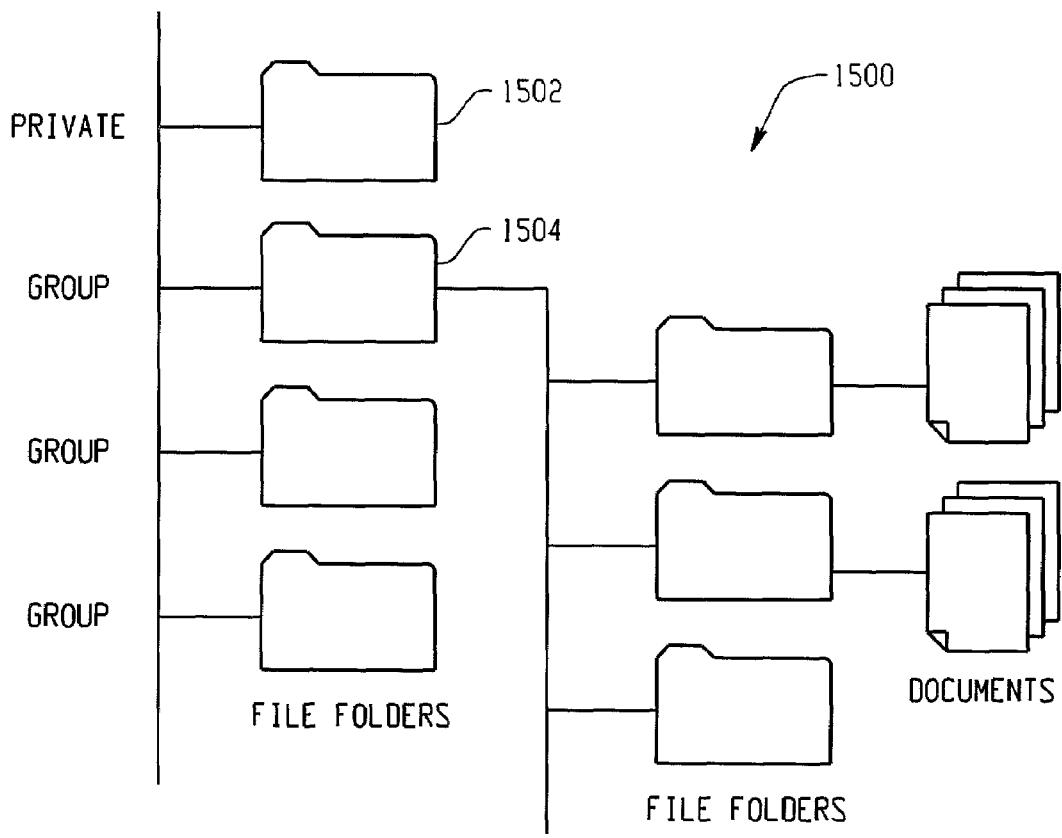
FIG. 15 illustrates a hierarchical folder tree structure of the repository.

Referring now to FIG. 15, there is illustrated a hierarchical folder tree structure 1500 of the repository 1400. The DMM module 202 supports one type of container—the file folder. After logging in, the user is presented with the view of the file folder tree 1500. The user can browse through the file folder tree 1500 to access file folders and documents. Authorized users can create a hierarchical tree by creating new file folders and documents. A file folder can contain both file subfolders and documents.

Folder Operations

The user is presented with file folders of two types: a private folder 1502 and a group folder 1504. The private folder 1502 allows only the folder owner access this type of file folder. The folder owner has all rights on the objects contained in it. The private folder 1502 is created when the Administrator creates the user account. The group folder 1504 is visible to users belonging to the group(s) assigned to this file folder. The operations that a user can perform on objects contained in the group folder 1504 are limited to the access rights inherited from the respective group.

As long as a user has the proper access rights, he or she can perform a number of file folder operations. The user can create a file folder. The Administrator can create new folders in any section of the tree structure 1500. Non-administrative users have this option available only if their access rights include editing on the file folder in which they want to create the new file folder. After selecting the menu option for creating a new file folder, the user is presented with an interface to specify the new name of the file folder. If the new name is not valid, the file folder will not be created and the user is notified with the proper error message. The user can also assign a comment, access rights to users and groups, and Indexes.

The user can view the properties of a file folder by selecting the respective folder from the tree structure 1500. The following folder properties are supported: Name, Comment, Access/Modified/Created Date and Time, Owner, Space Available, etc.

By selecting a file folder (1502 or 1504) from the tree structure 1500, the user is presented with a view of its properties and with an option of changing the properties. The user can modify the following file folder properties: Name, Comment, and Access rights to users and groups.

The user can delete a file folder 1504 if he/she has sufficient access rights to do so, or if he/she is the owner of the file folder 1502. To delete the file folder, the user selects the file folder from the tree 1500 and selects a Delete menu option. The user can never delete a private File Folder. An Administrator can delete any file folders.

The user can browse a file folder by selecting the respective folder in the tree structure 1500, an action that results in the display of the objects contained in the folder.

For searching purposes, the user can assign index information to newly created file folders. The following standard indexes can be associated with a folder: Department, Group, Language, Project, Purpose, Status, and Priority, etc.

The user can display the index information associated with the file folder, and with sufficient rights, modify index values already associated with the file folder. The following standard indexes are modifiable: Department, Group, Language, Project, Purpose, Status, and Priority, etc.

After selecting the source file folder and the destination folder, the user can initiate a copy operation by selecting the Copy menu item. The user can copy a file folder only if the user has Edit access rights on the destination object.

After selecting the source file folder and the destination folder, the Move operation is initiated by selecting the Move menu. The user can move a file folder only if the user has Edit access rights on both destination and source objects.

The user can search a file folder. Numerous options are available to the user who wishes to perform a folder search. The user can specify the index information, attributes, or content data in combination with logical operators such as AND, NOT, OR, Not Equal, Max, Min, and is allowed to enter wild card characters for specific attributes. The user can specify the index information, attributes, or the content data, while using wild card characters for specific attributes. The can limit the search to a specific file folder, a branch, or the entire hierarchy. The user has the option to save the search queries for use at a later time, and to retrieve the saved search queries for use. The search result depends on the above-specified criteria, and contains the list of file folders with some visible properties such as Name, Creation date, number of documents, etc.

Document Operations—Print to DMM

Figure 16:
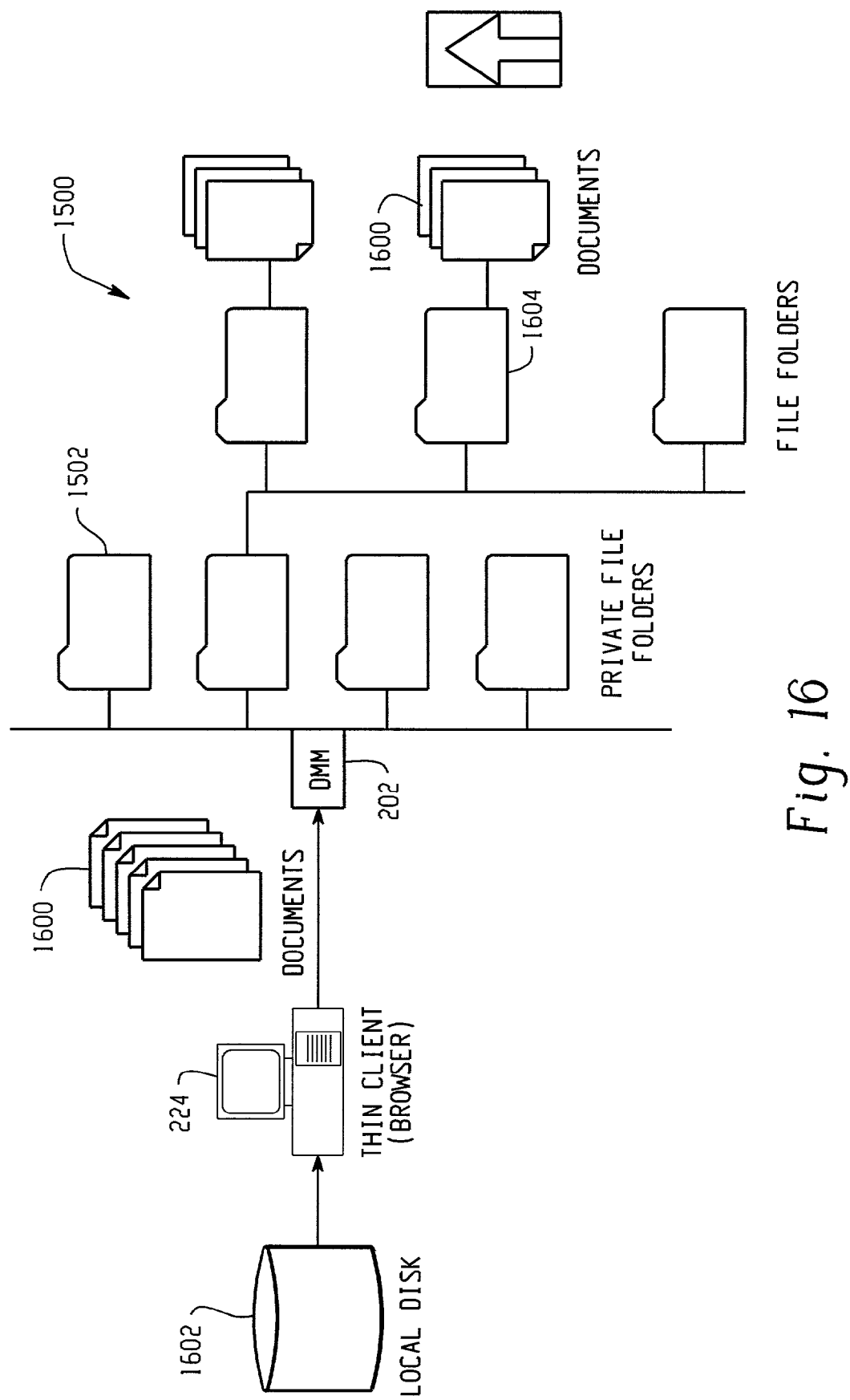
FIG. 16 illustrates a block diagram of a client capturing local documents for storage on the DMM repository.

Referring now to FIG. 16, there is illustrated a block diagram of a client 224 capturing local documents for storage on the DMM repository 1400. Depending on the provided access rights, the user can perform a wide variety of operations on documents 1600 stored in file folders 1502. The user can create a new document 1600, and select a destination file folder 1604 that the new document 1600 that will be stored in. This option is available to the user having Edit access rights on the selected file folder. The user is provided a number of methods via the DMM 202 for creating a new document 1600 in a selected destination file folder 1604. The user can capture the document 1600 from a local drive 1602 or network hard drive (not shown) utilizing an interface suitably implemented to allow the user to browse such devices and for selecting the document 1600. This is also called an upload operation. The interface allows the user to then point the destination folder 1604, and perform, e.g., copy or move operations to place the file in the destination folder 1604.

The user can capture input/output from a scanner. The paper documents scanned by the user are converted to an image format and are stored in the user DMM Inbox file folder 710. The user has an option of moving the document from his/her Inbox 710 to a particular file folder 1502 in the tree structure 1500.

The user can capture output from a fax. Paper documents faxed by the user are converted to an image format and stored in the user DMM Inbox file folder 710. The user has an option of moving the document from his/her Inbox 710 to a particular file folder (1502 and 1504) in the tree structure 1500.

The user can capture from e-mail as both text and an attachment. A document sent via e-mail is stored in the user DMM Inbox file folder 710. The user has an option of moving the document 1600 from his/her Inbox 710 to a particular file folder (1502 and 1504) in the tree structure 1500.

The user can capture files from servers disposed on the GCN 112. The GUI provides the capability of specifying the URL of the source document(s) and the destination file folder. The user can also specify how deep to traverse the URL (how many levels). The DMM 202 facilitates download of the specified documents and storage in the specified folder.

The user can create new documents from current documents, and save in a different format. The following format conversions are available to users: PDF, PNG, TIFF, to HTML, BMP, JPG etc. A new document can be created by merging several documents (the final document will be a multi-page image document).

The user can render image files to text utilizing an OCR (Optical Character Recognition) utility.

The user can delete the selected document only if the user has Delete access rights on the parent file folder. The Administrator is always able to perform this operation.

After selecting the source document and the destination folder, a user can copy a document, but only if the user has edit access rights on the destination object.

After selecting the source document and the destination folder, a user can move a file folder, but only if the user has Edit access rights on both the destination object and the file folder containing the document.

The user can view the properties of a document by selecting it from the tree structure 1500. The following document properties are supported: Name, Comment, Type, Access/Modified/Created Date and time, Owner, Number of Pages, Space Available, and Space Assigned.

By selecting a document from the tree structure 1500, the user is presented with a view of the document properties and with an option of changing the following: Name, Comment, Author and, Access rights to users and groups.

For searching purposes, the user has the option of associating index information with newly created documents. The following standard index fields are associated with a document: Department, Client, Date completed, Destination, Group, Language, Project, Purpose, Status, and Priority. The user also has the option of displaying the index information associated with a document. The user has the option of modifying the values of indexes already associated with the document. The following standard indexes are modifiable: Department, Client, Date completed, Destination, Group, Language, Project, Purpose, Status, and Priority. This option is available to users having Edit access right on the parent folder of the selected document.

The user can save the document utilizing the following supported options. The document can be save by replacing the original document with the edited version of the document. In this instance, the user opens the document for viewing with a DMM Document Viewer application (e.g., applet). After opening the document in the DMM Viewer, the user edits the document (e.g., by adding annotations), and then saves it by overwriting the original document. This operation does not create a new version of the document. The document can be saved along with its meta data to an attached storage device (e.g., hard disk). The user has two options for performing this operation. First, the user can select one or more documents from the tree structure 1500, and then select a "Save" menu option. Second, the user can select the "Save" option from inside the document viewer to save the document to selected ones of destination storage devices attached to the appliance 200. The user can save the document to an external EDMS (Electronic Document Management System) like Microsoft Share Point, Lotus Notes, TABS Proof Buddy, Questys, other online document management systems, etc. As described hereinabove, the user can perform this operation for either multiple documents or for a single document by opening it in the document viewer such that the external EDMS system can be specified. It is preferable that the external EDMS destination should be compliant with ODMA (Open Document Management API).

DMM Bookmark

Figure 78:
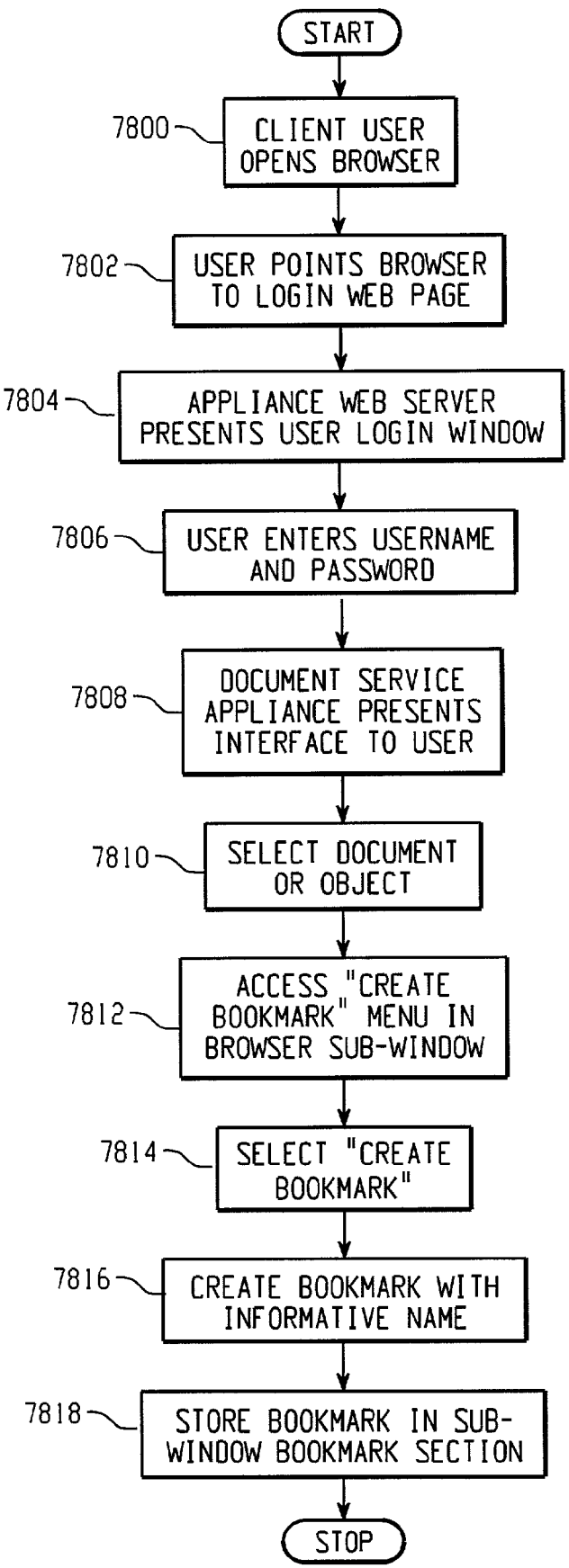
FIG. 78 illustrates a flow chart of the process for creating a bookmarked document, in accordance with a disclosed embodiment.

Reference is made hereinbelow to FIG. 78, where there is illustrated a flow chart of the process for creating a bookmarked document, in accordance with a disclosed embodiment. A unique feature provided by the DMM module 202 is the capability of defining a bookmark to a document stored inside or outside of the DMM repository 1400. The procedure is equivalent to defining a symbolic link to a document, and storing this link in a general-purpose DMM folder. The symbolic link is treated as any other document managed by the DMM 202. Further, upon linking to a document, the user can download (i.e., retrieve a copy) a document stored in the DMM repository 1400 to the user local machine or network hard drive. This procedure is performed via the iSP browser-based thin client 224 by following the subsequent steps: select the bookmark menu item; select the Create New Bookmark; browse to desired local or network file; select desired file; define the bookmark name; and select OK to exit the operation.

Generally, the client user opens the browser and then selects a "Create Bookmark" option (or the option suitably provided in the browser being used) as is performed conventionally with, for example, Microsoft Internet Explorer, Netscape Navigator, etc. The user selects the file to bookmark. The DMM 202 then intercedes and creates an association between the selected file and file location with a link. The link information is then stored on the client computer such that the user can select the bookmark, causing the browser to link to the location of the bookmarked document in the DMM repository 1400. The DMM module 202 allows users to perform the following bookmark operations: Create, Delete, Rename, Copy, Move, View Properties, Change Properties, Search, View a document referenced by the bookmark, and Save the referenced document in the DMM repository 1400. If the document referenced by the bookmark is deleted, or if its location is changed, the bookmark will become invalid and an error will be displayed when the user tries to access the document.

The user can search for a document by specifying index information, attributes, or content data in combination with the following logical operators: AND, NOT, OR, Not equal, Max, Min. The user can also enter wild card characters for specific attributes. The search can also be limited to the specific file folder, branch, or the entire tree hierarchy 1500. The user has the option to save the search queries for later use, and to retrieve the saved search queries. The search result depends on the above-specified criteria, and contains the list of documents with some visible properties such as Name, Creation date, and size.

The user can view a selected document in a "Read Only" mode such that no editing of contents is allowed. In this case, the original application is invoked inside the browser (however, if the browser does not have support for the original application, the user will have an option of downloading the document and opening it on the local machine with the native application). The read-only option is available for both image, as well as non-image document formats.

The user can display the selected document as "Read-Modify", an option available only for image document formats. The document is opened for viewing with the document viewer application running as an applet inside the browser. Insofar as the user opens the document as "Read-Modify", no other user can modify the contents of the respective document. After modifying the document, the user can then save the modifications.

The user can navigate through a document by paging forward or backward through a displayed document, or by jumping to the first page, last page, and to a specific page. The document can also be previewed. This includes either a thumbnail view of the first page, or the thumbnail view of all the pages.

Figure 17:
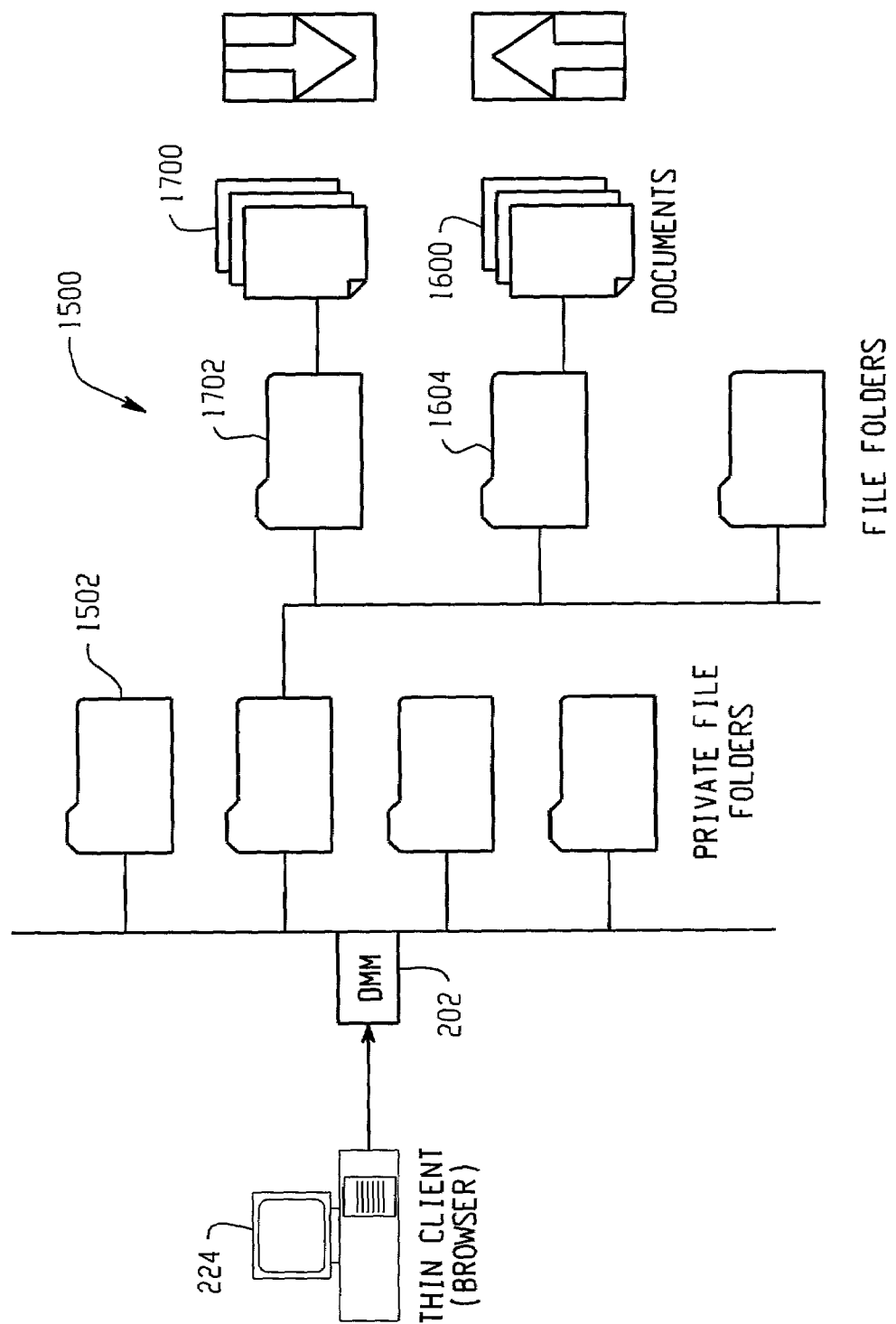
FIG. 17 illustrates a block diagram where the client can manipulate documents via the disclosed appliance system.

Referring now to FIG. 17, there is illustrated a block diagram where the client can manipulate documents via the disclosed appliance system. The user at the client 224 can manipulate image documents by opening the document 1600 using an applet viewer. Once opened, the user can perform following operations, and save the document in the respective orientations. For example, the user can save the original document 1600 in a first destination folder 1604, and a rotated document version 1700 in a second destination folder 1702 of the repository 1400. The document can also be flipped horizontally, vertically, rotate in 90-degree increments, zoom in and out, zoom the document to fit the screen size, and copy pages from the currently opened document to another document using an interface to facilitate such copy functions. The user can move pages from the currently opened document to another document, and pages can be deleted from a document.

Authorized users can perform the following operations support of document versions. A document can be checked out of the system, i.e., the latest version of a document can be retrieved for editing purpose. The user selects the document from the tree 1500 and selects a "Checkout" menu option. After checking out the document, the user gets the latest version of the document (download) or simply checks out the document. In the later case, the document is not downloaded to the client machine. The check out operation marks the document as locked for the user who checked out the document. As long as the document is checked out, other users are not able to edit the same document. The user can view document status and properties. The status information is represented by visible properties including version tag, version comment, version date, and the name of the user who checked out the document.

Users can check-in a checked-out document such that the document is saved as a version of the original document. After making modifications to the local copy (retrieved via check-out operation) of the document, the users can then check-in the document. During the check-in operation, the user can either upload the local modified copy of the document or simply check in. In the first case, a new version of the document will be created by the DMM component 202, with the currently uploaded version as the latest version of the document. In the second case (i.e., check in), a new version is not created, but the status of the document is changed from "check out" to "check in", and the document will be unlocked for access by other users.

The user has an option of using WebDAV-enabled client applications to access documents stored in DMM 202.

DMM Repository Access Via Windows Explorer

Figure 18:
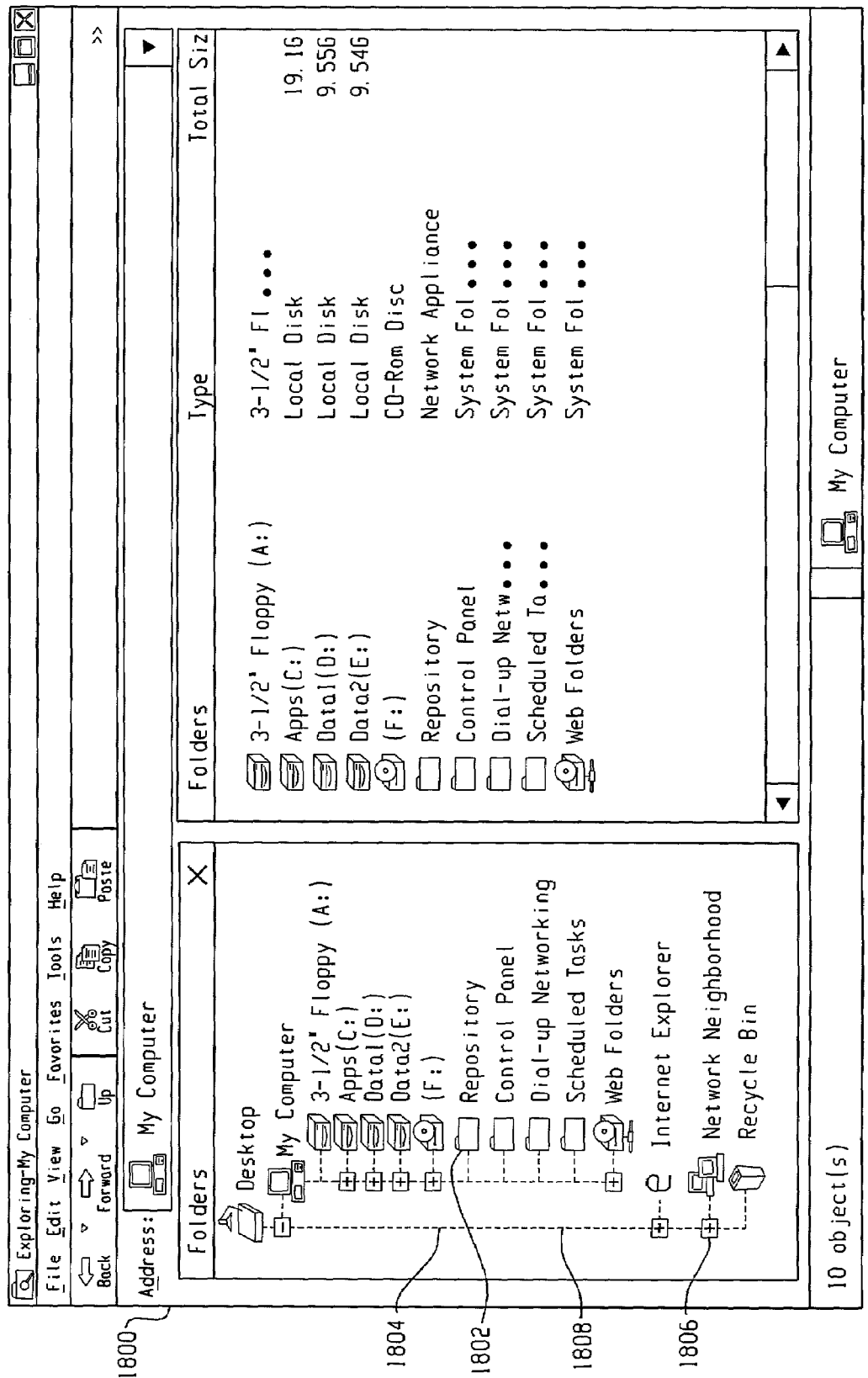
FIG. 18 illustrates a screenshot of a window showing a repository folder displayed to the user for accessing repository documents.

Referring now to FIG. 18, there is illustrated a screenshot of a window 1800 showing a repository folder 1802 displayed to the user for accessing repository documents. The iSP DMM 202 presents the repository folder 1802 in the Windows™ Explorer interface file navigation tool. The DMM operations available via the Windows Explorer interface utility represent a subset of the DMM operations available to a user who uses the DMM browser-based thin client 224. Nevertheless this feature provides ease of use to users who are accustomed to using the Windows tools and environment, and provides sufficient functionality for users who just want to perform basic DMM functionality. When a user invokes Windows Explorer, the Repository 1400 managed by the iSP DMM 202 is represented as a Repository folder 1802 in the Explorer folder pane 1804. The user can perform the following operations on the DMM folder as long as he or she has the right credentials (these operations may be challenged via an account name/password request): expand the DMM tree structure (expansion plus sign "+" not shown), view folder properties, delete folder, rename folder, copy folder, move folder, drag and drop documents, delete documents, rename documents, copy documents, move documents, view document properties, and view document content for read only.

In the current illustration of FIG. 18, the Repository folder 1802 is shown as a folder in a peripheral folder area 1808. However, the Repository folder 1802 can also be placed in other areas, for example, the Network Neighborhood area 1806 where after the user expands this area using the plus sign "+", the Repository folder 1802 is displayed therein to the user. The Repository folder 1802 can be displayed in the drive area having a drive icon (e.g., similar to that drive icon associated with the drive labeled Data2 [E:]). In any case, the Repository folder 1802 is displayed to the user in the folder pane 1804 of the Windows Explorer utility such that the user can easily access the networked-based document management system of the appliance 200.

Figure 19:
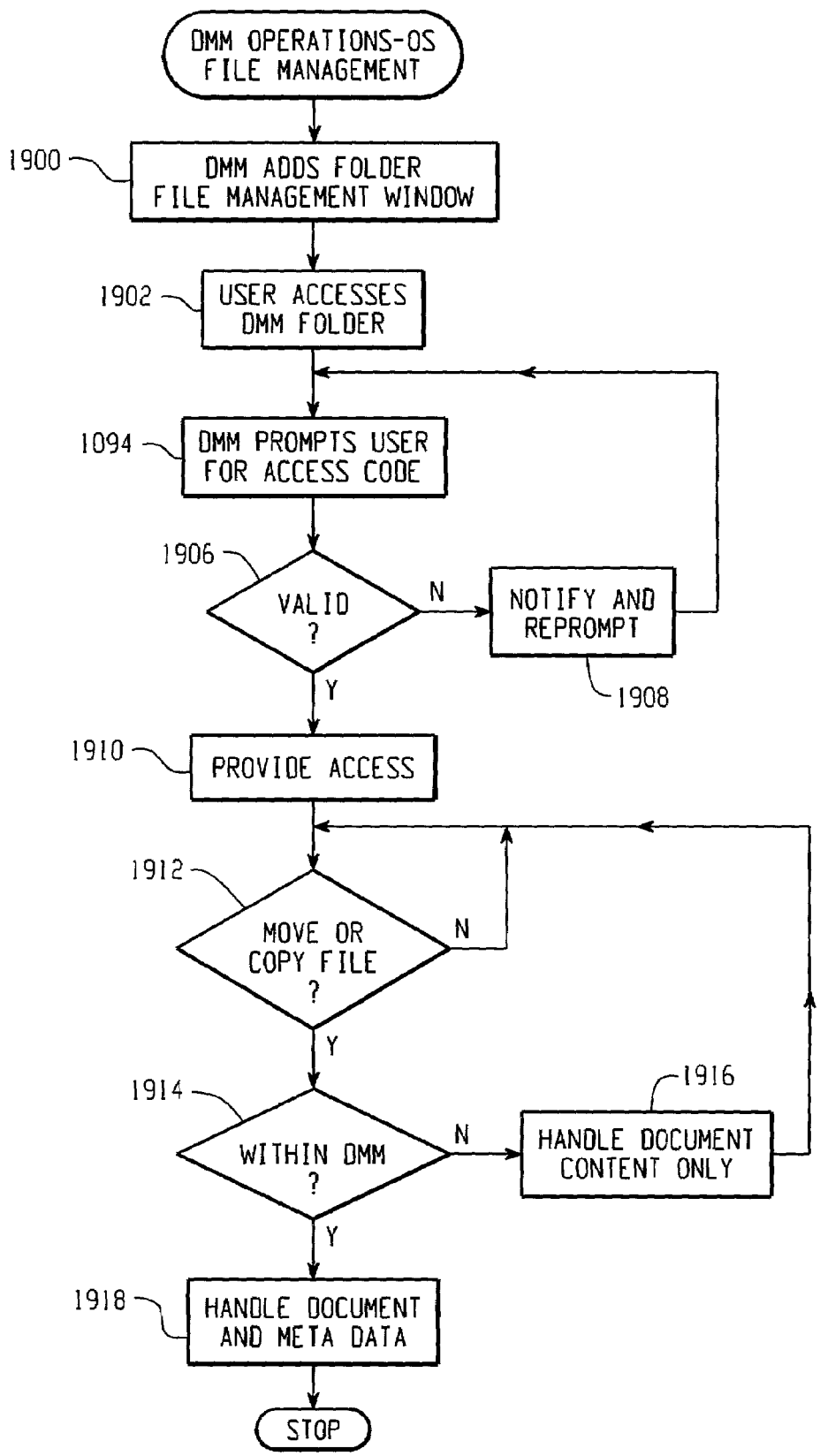
FIG. 19 illustrates a flow chart of the process for moving a document within the disclosed appliance system.

Referring now to FIG. 19, there is illustrated a flow chart of the process for moving a document within the disclosed appliance system. Flow begins at a function block 1900 where upon installation of the appliance system, all authorized users will have a repository folder 1802 presented in a file management window (e.g., Windows Explorer, for a Microsoft operating system). Flow is next to a function block 1902 where the user accesses the repository folder 1802. If the user is not currently authorized to access the folder 1802, the user is prompted to provide a username and password to again access. User rights to the folder 1802 are assigned by the Administrator in accordance with the level of access provided to that particular user. For example, the user may be granted full access to his or her documents in private folders 1502, yet restricted to a lesser read-only access to documents in the group folder 1504. The Administrator can set the rights to any user, and to any document location. Note that the username/password login can be implemented as a single login coinciding with the network login, or as separate logins. Thus when the appliance 200 prompts the user for a username/password as a separate login procedure, for is to a decision block 1906 to determine of the login is valid. If not, flow is out the "N" path to a function block 1908 where the user is notified of the failed attempt, and optionally, a message indicating further action is required. Flow then loops back to the input of function block 1904 where the user is re-prompted for a username and password.

If the login attempt is successful, flow is out the "Y" path of decision block 1906 to a function block 1910 where the user is granted access in accordance to rights assigned by the Administrator. Flow is then to a decision block 1912 to determine if the user chooses to move or copy a file from one location to another. If not, flow is out the "N path to the input of the decision block 1912. If so, flow is out the "Y" path to a decision block 1914 to determine if the file action is within the DMM 202. If not, flow is out the "N" path to a function block 1916 where only the document contents are handled. Flow then loops back to the input of decision block 1912 for the next document handling process. Note that when documents are moved or copied within the DMM repository 1400, the document as well as its meta data is "moved" or "copied". When a document is moved or copied to a folder that is located outside the DMM storage 1400 only the document content is moved or copied (this operation is equivalent to the DMM download operation). Thus if document handling occurs only within the repository 1400, flow is out the "Y" path of decision block 1914 to a function block 1918 to process both the document contents and the meta data. Flow then reaches a Stop terminal.

Authorized users can perform the following operations that support the creation of document annotations. An authorized user can add annotations to the selected document, but only after opening the document with the document applet viewer application. The types of annotations that can be added include graphical, textual and color highlighter. Authorized users can view the properties of an annotation. The properties include Author, Creation Date, and Modified Date. Annotations can also be Cut and Pasted from one document to another. A specific textual annotation can be searched within a document or throughout the DMM storage.

Authorized users and the Administrator can set up, configure and monitor the DMM activities and storage area. The appliance 200 provides an interface to the Administrator to specify an alternative, off-line, optical file storage location or magnetic disk drives. The Administrator can configure the attributes of the storage media. The appliance 200 provides the user with an archiving/restoring utility to help an authorized user to archive/restore documents from magnetic disk drives or optical media. Users can use the archive utility only for containers or documents that they own. The Administrator uses the archive utility for any DMM document or container. After selecting the file folders and documents that need to be archived, the user selects from a list of storage media configured by the Administrator. The user is provided with an interface to specify archiving parameters such as Author, Type, Creation Date and Time, Keywords and Phrases. Additionally, a facility is provided to the user through which aged files (documents that were not accessed within a specified period of time) are automatically moved to an alternative storage location. The user specifies the aging period and the alternative storage media.

The user is provided with a mechanism for collecting user deleted files in a special holding area until the files have reach a predetermined age or, the storage area fills up and the files are discarded to create room for new files. The user can then monitor the status of the storage area and provide data such as space utilization.

The user can monitor relevant activities and operations, and at a minimum, can record significant events, such as, document deletion, document check in and check out operations, document printing, login/logout activity, file storage space utilization, and archive/restore operations.

The user can specify the activities and operations to be monitored, and retrieve a record of these events by specifying a filtering criterion. The criterion includes the activity to be monitored, the period of time.

For auditing purposes, the user generates predefined reports of activities and operations. These reports describe the system configuration, user configuration, archived documents, and deleted documents. Authorized users can export these reports to standard text file formats such as coma-separated or space-separated formats.

The user is provided with the capability to generate alerts for specific events such as New Document In Inbox, Low File Storage Conditions, Failed Logon Attempts, Exceeding Threshold, etc. E-mail and/or Popup windows inform the user of these alerts. Authorized users can initiate printing of the documents stored in DMM repository 1400.

The appliance 200 provides a series of dedicated utilities that will allow the Administrator to define and manage the user accounts. The appliance architecture recognizes the following user archetypes: Administrator, Power User, and User. The appliance 200 allows for the grouping of users into user groups. A Power User and Administrator can only create/delete a group and add/delete members to the group. Grouping is only available for the DMM component, and is basically done to simplify the sharing of resources (Folders, etc.). At a minimum, a Group is characterized by the following properties: Group name, Group description, and Group ID (which is unique). Whenever an operation is performed on a group, the Group ID is used to identify the respective group. A user may belong to multiple groups. By default, a user is at least a member of one default group. Creation of groups, which is available only to Administrators and Power Users, is performed via a browser-based interface. The interface provides fields that allow a user to specify a Group Name, Group Description and Group ID. The Administrator has full access to all the activities in the system irrespective of the service/module. By default, the appliance 200 has a default administrator who executes the initial setup processes. The Administrator generates an account for each user. At a minimum, an account is characterized by the following properties: Account ID (non-modifiable), Password, Description, Account type (Admin/Power/General), Group membership, and Department ID. The account creator provides values for these properties via a browser-interface located under the "Administration" tab. Only the Administrator and the respective user can change these properties. An exception is the Account Type, which can be changed only by the Administrator. In the case of the administrator account, the account name and password must be the same as that of the network username and password. This is required in order to provide the Administrator with access to all system level tasks (e.g., uploading drivers to the appliance 200). The Power User and general user can have a different appliance username and password from their domain username and password. For security reasons, passwords will always be stored in encrypted form.

For each iSP account, the appliance 200 generates the following containers: Inbox, Outbox, and Private file drawer. These containers are visible and accessed through the browser interface of the DMM module 202. The Inbox is the destination for all the documents arriving from outside at the DMM component 202. The Outbox stores copies of documents that have been sent outwards via e-mail, fax etc. For each new account, the appliance 200 sends a mail note to the account owner, specifying the following: Account name, Account password, and URL of the appliance 200. Users can access the appliance 200 via a browser interface and by providing the respective account name and password. The Administrator can perform the following operations: view a list of all user accounts, change account properties, view a list of all groups and their composition, change the Group ID, and change group membership.

Depending on the type of user, Administrator or general user, the DVMM and DDM functionality is either available or not available. A general user only has access to certain features, whereas the Administrator has access to all available features. The DMM module 200 is different from this point of view because "access rights" are defined at container level (e.g., folder). Containers can be shared between users based on the assigned rights. Access is enforced in accordance with the following access levels: None (user has no access to the container and its contents); View (user can view the container); Edit (user can view and modify the container or its content); and Delete (user can view, edit and delete the container or its content). Some rights are implicit, for example, a user with the Delete right has implicit right of Edit and View, and a user with the Edit right has implicit right of View. The owner of an object, and the Administrator, can revoke the rights of any group/user who has rights to the respective object. By default, the appliance 200 enforces the following un-modifiable access rights: only the Administrator and the owner of a private container have full access to the respective container; the Inbox and Outbox containers cannot be deleted as they are automatically deleted when the user is deleted.

A creator/owner of a DMM group file folder awards access rights to the respective folder by associating it with defined groups/users and access rights. The respective user selects a folder, and from the list of available groups/users, selects a particular group/user and then assigns the desired rights. If no explicit action is taken to assign rights to a container, then the rights are inherited from the parent container (a folder inherits from its parent folder and a document from its parent folder).

Graphical User Interface (GUI)

Thick Client Interface

Figure 20:
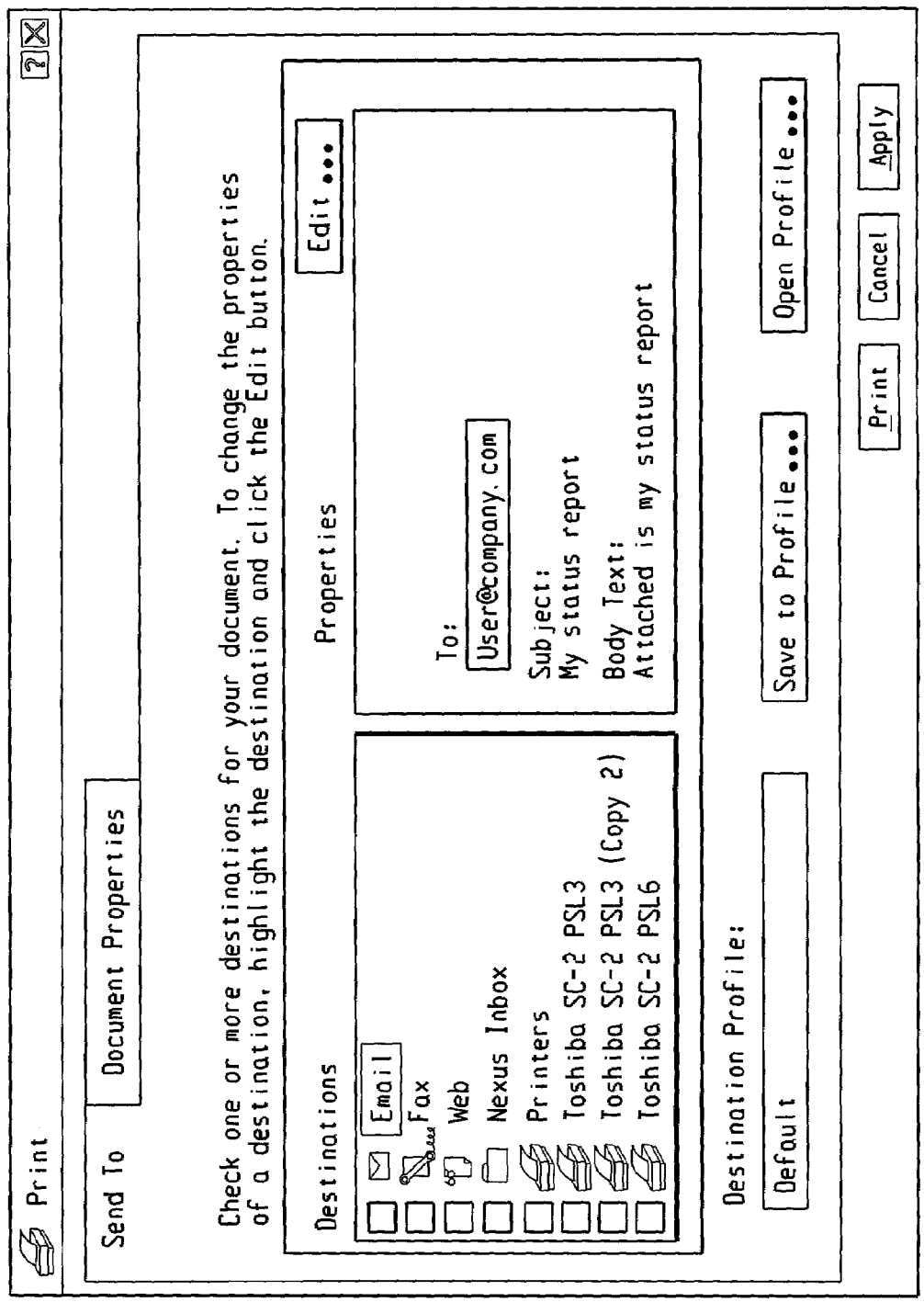
Figure 21:
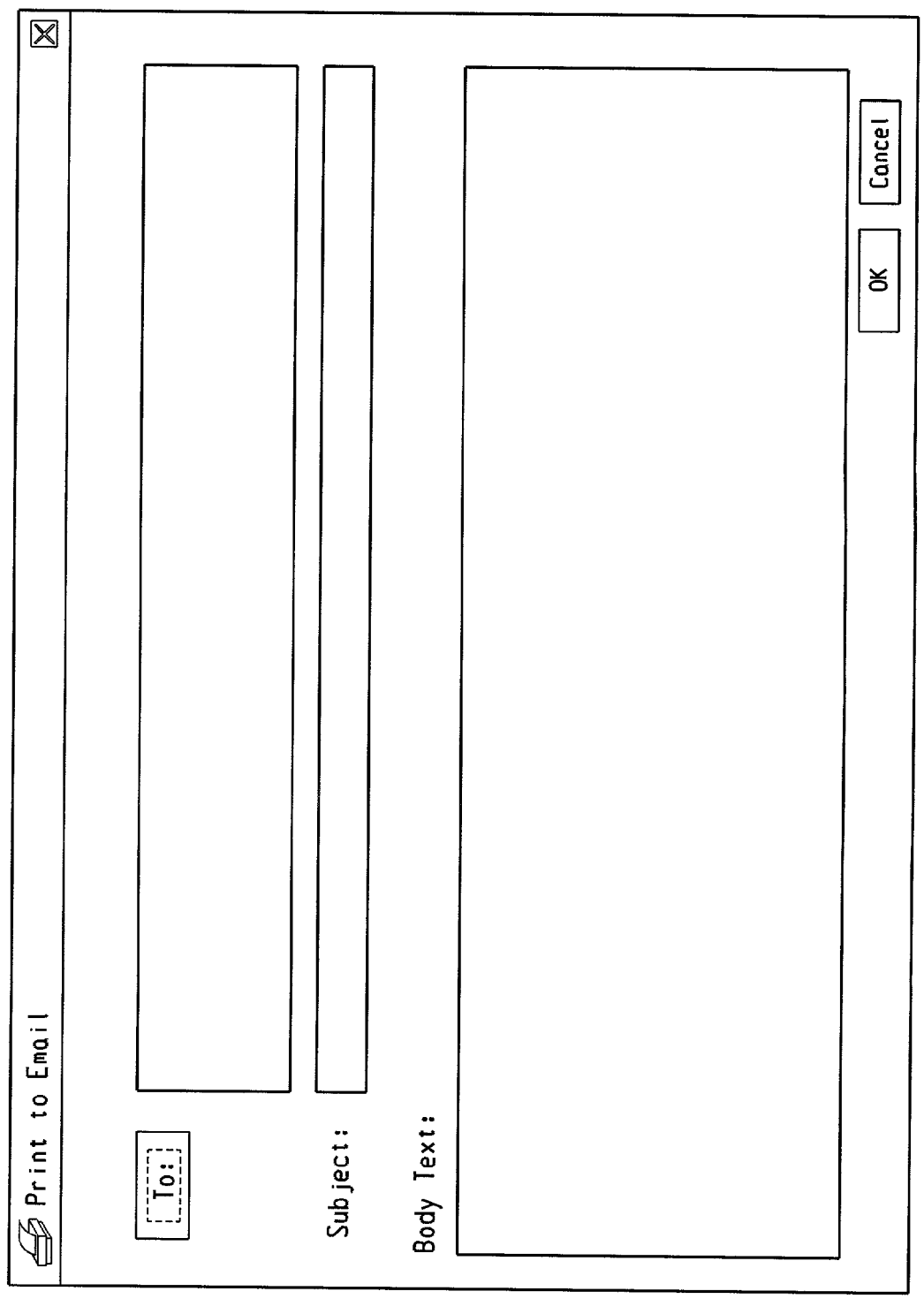

Referring now to FIGS. 20–30, there are illustrated screenshots of various windows provided to the thick client user to facilitate use of the disclosed appliance system. The thick client interface is invoked from an applications print dialog and allows a user to send a document to multiple destinations. FIG. 20 shows a "Send To" destinations list window for sending documents to one or more destinations. For example, a document can be sent to e-mail, fax, a web posting, and network printers. The document can be sent to multiple devices from this window by selecting the desired destinations, and initiating transfer by further selecting the Print option. The appliance system will then transmit copies of the document to the selected destinations substantially simultaneously. FIG. 21 shows a screenshot of the Edit window for transmitting the document to e-mail. The user can enter the destination e-mail address, and comments that will appear in the Properties section of FIG. 20, once completed.

Figure 22:
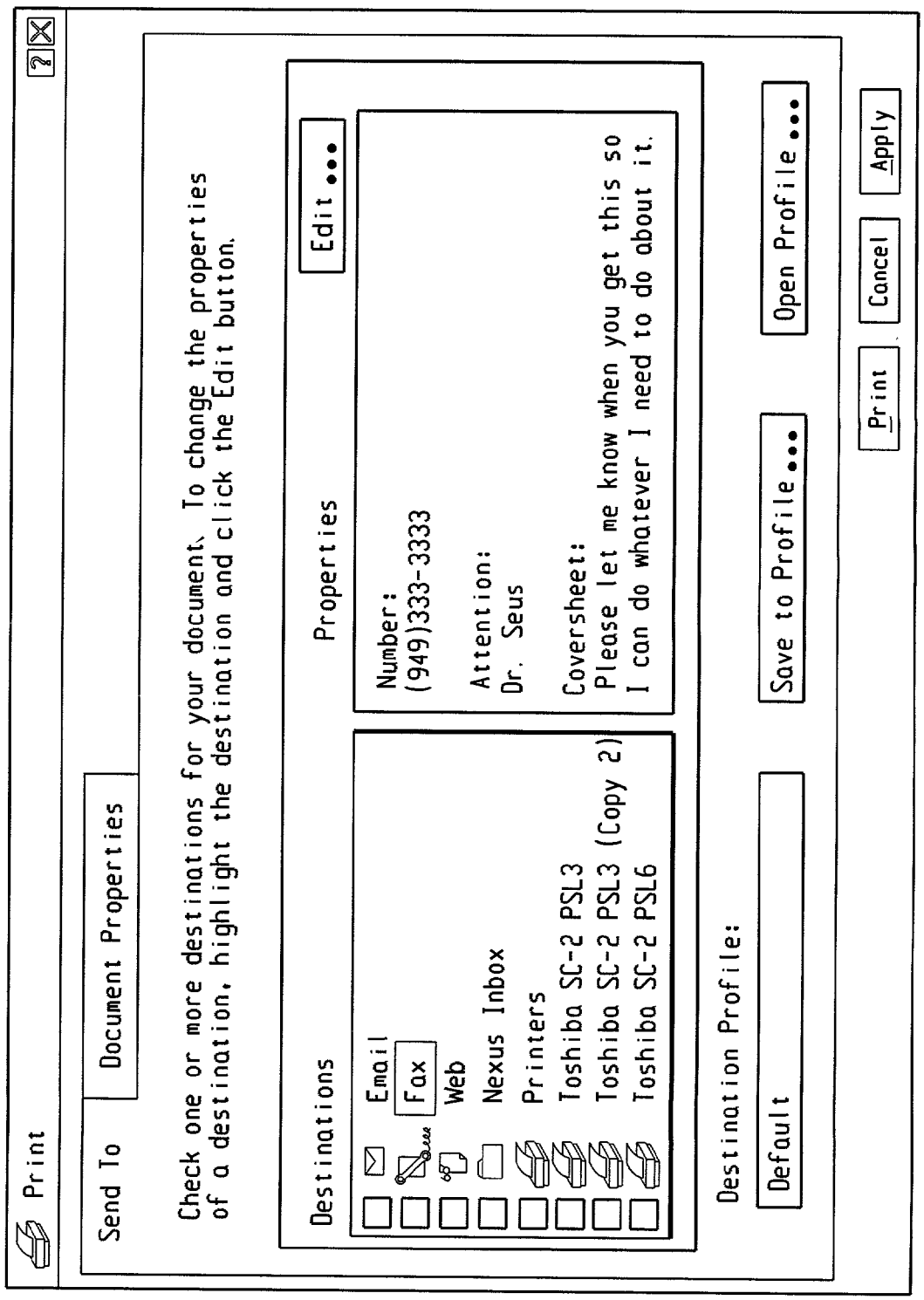
Figure 23:
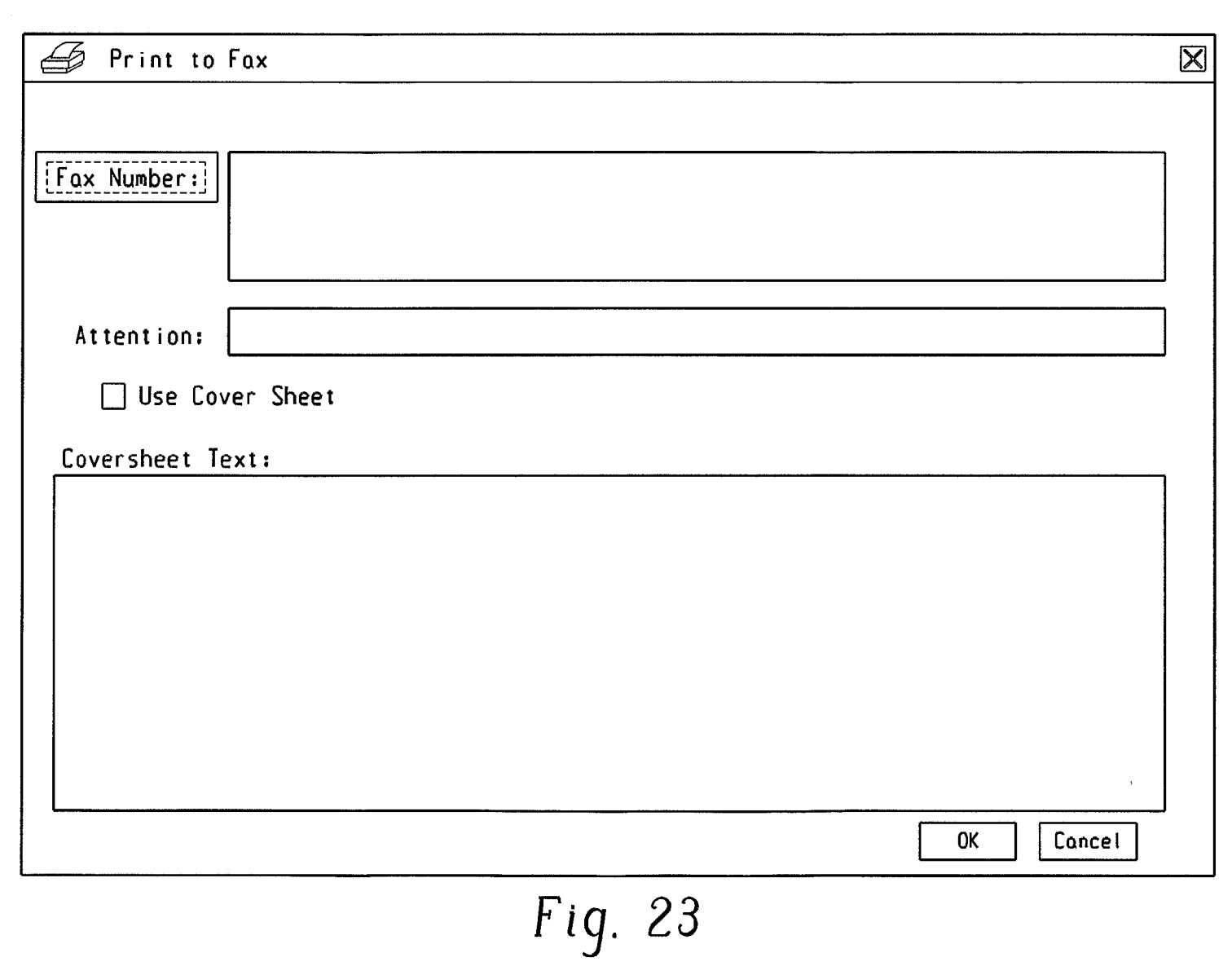

FIG. 22 shows a screenshot of the of the "Send To" window when directing a document to a fax machine. FIG. 23 shows the corresponding Edit window utilized for entering the fax number, recipient, and comments, all that appear in the Properties section of the "Send To" window of FIG. 22.

Figure 24:
Figure 25:
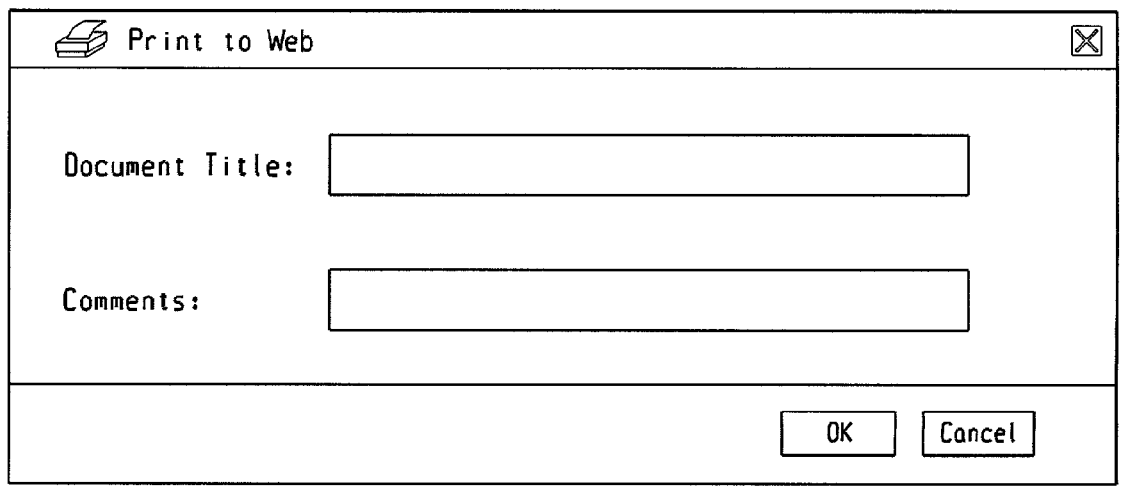

FIG. 24 shows a screenshot of the of the "Send To" window when directing a document to a web server. FIG. 25 shows the web dialog window used for entering the document title and comments, both of which appear in the Properties section of the window of FIG. 24.

Figure 27:
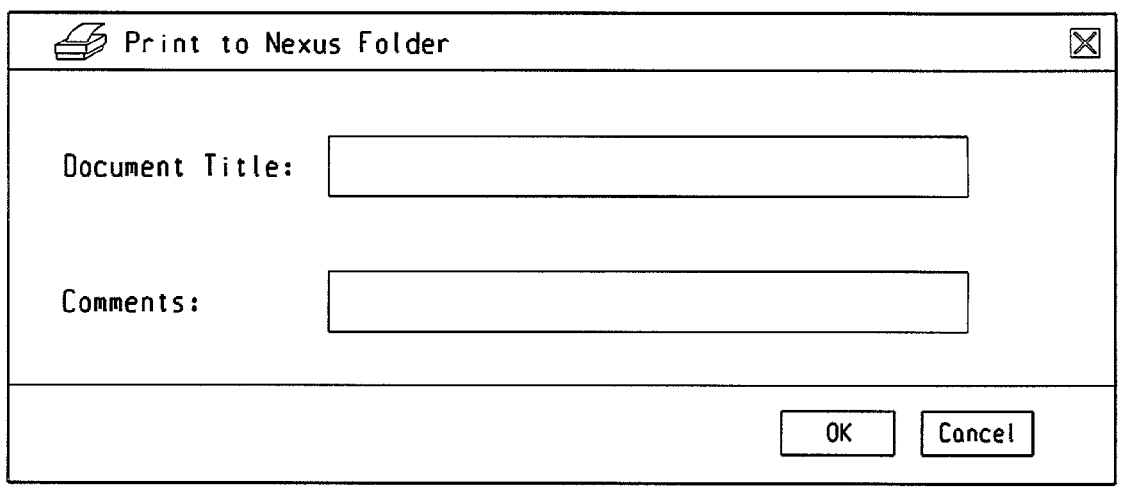
Figure 26:
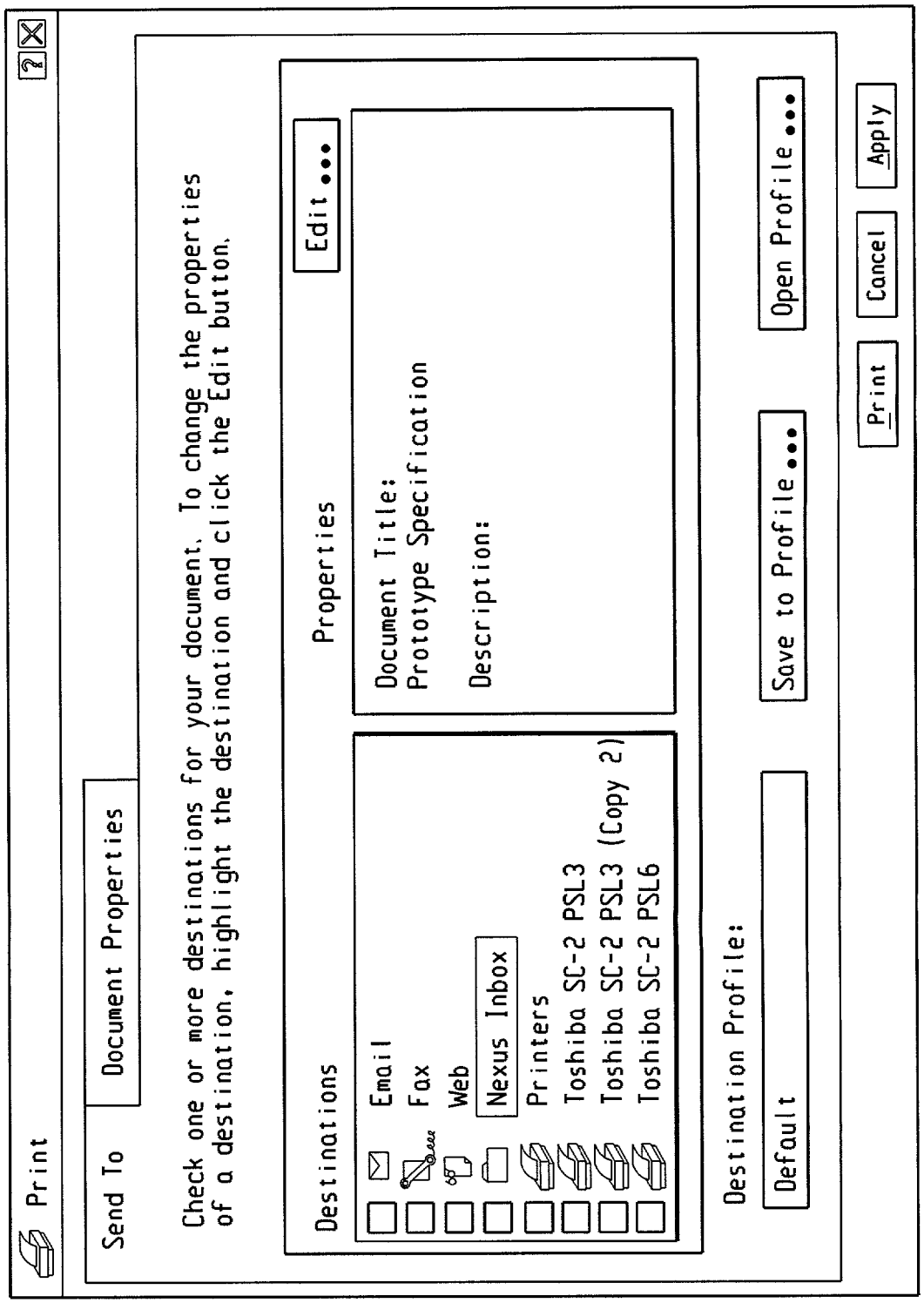

FIG. 26 shows a screenshot of the of the "Send To" window when directing a document to a folder (e.g., Nexus folder or Inbox). FIG. 27 shows the folder dialog window used for entering the document title and comments, both of which appear in the Properties section of the window of FIG. 26.

Figure 28:
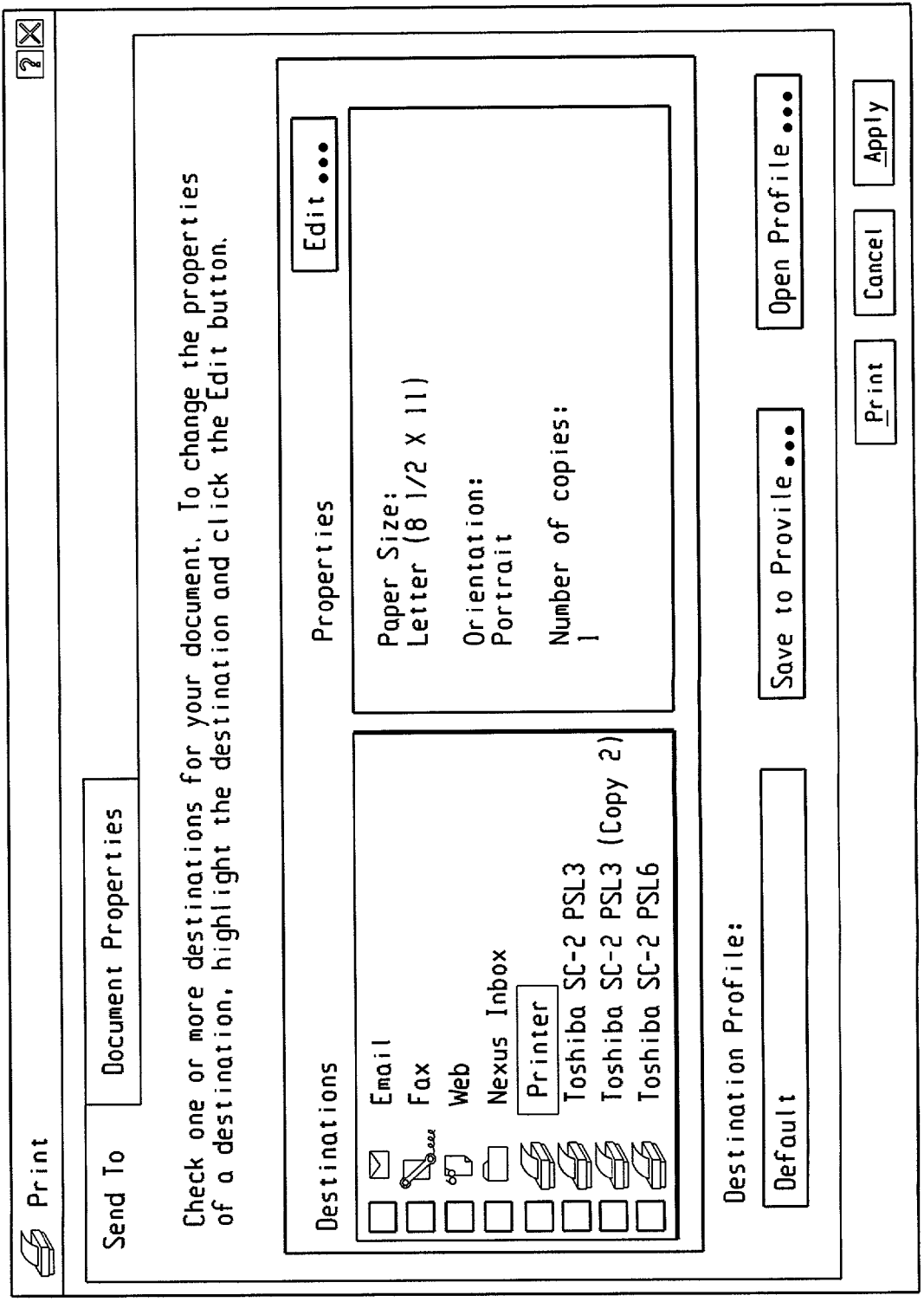
Figure 29:
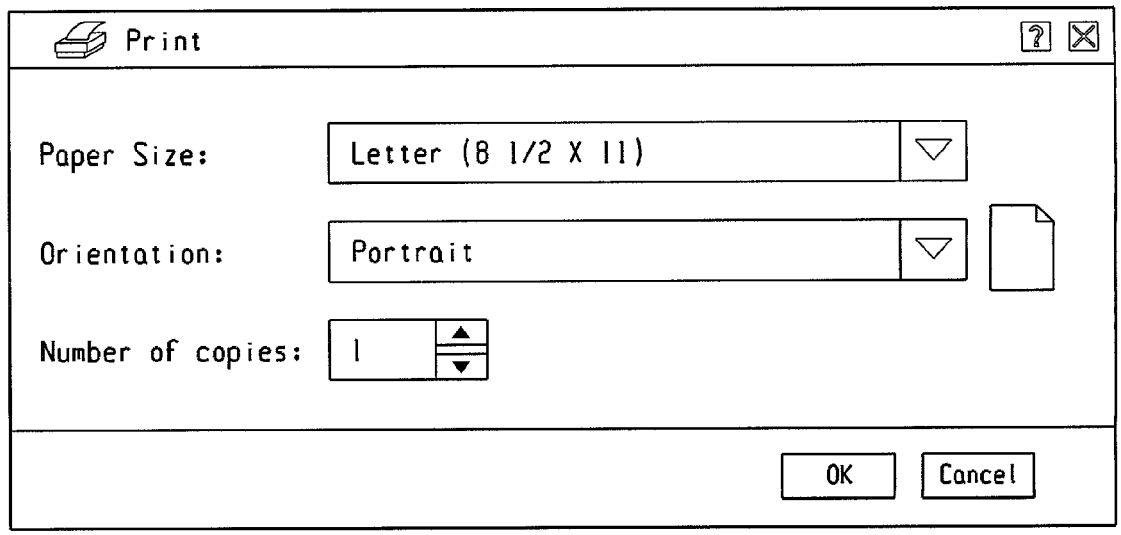

FIG. 28 shows a screenshot of the of the "Send To" window when directing a document to a printer. FIG. 29 shows the printer dialog window used for selecting output options, for example, paper size, output orientation, and number of copies, all of which appear in the Properties section of the window of FIG. 28.

Figure 30:
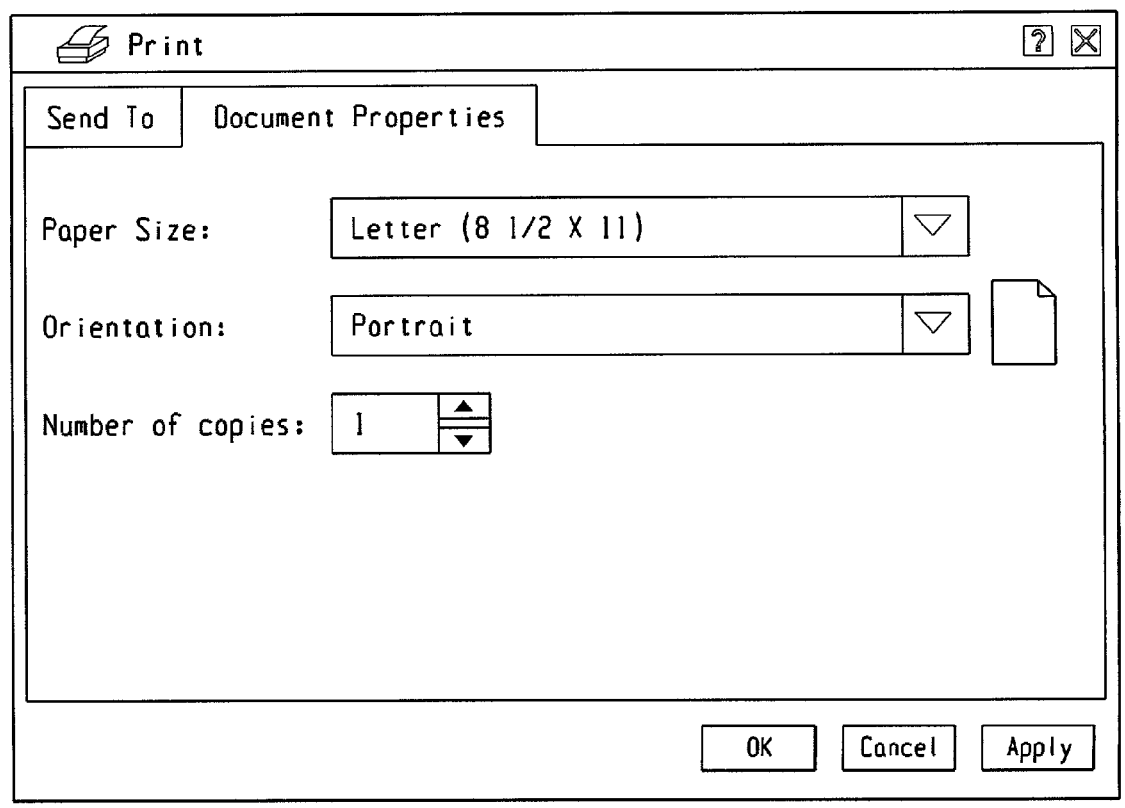

FIG. 30 shows a screenshot of the Document Properties tab, which also provides printer output selections for print jobs, including paper size, output orientation, and the number of copies.

Thin Client Interface

Figure 31:
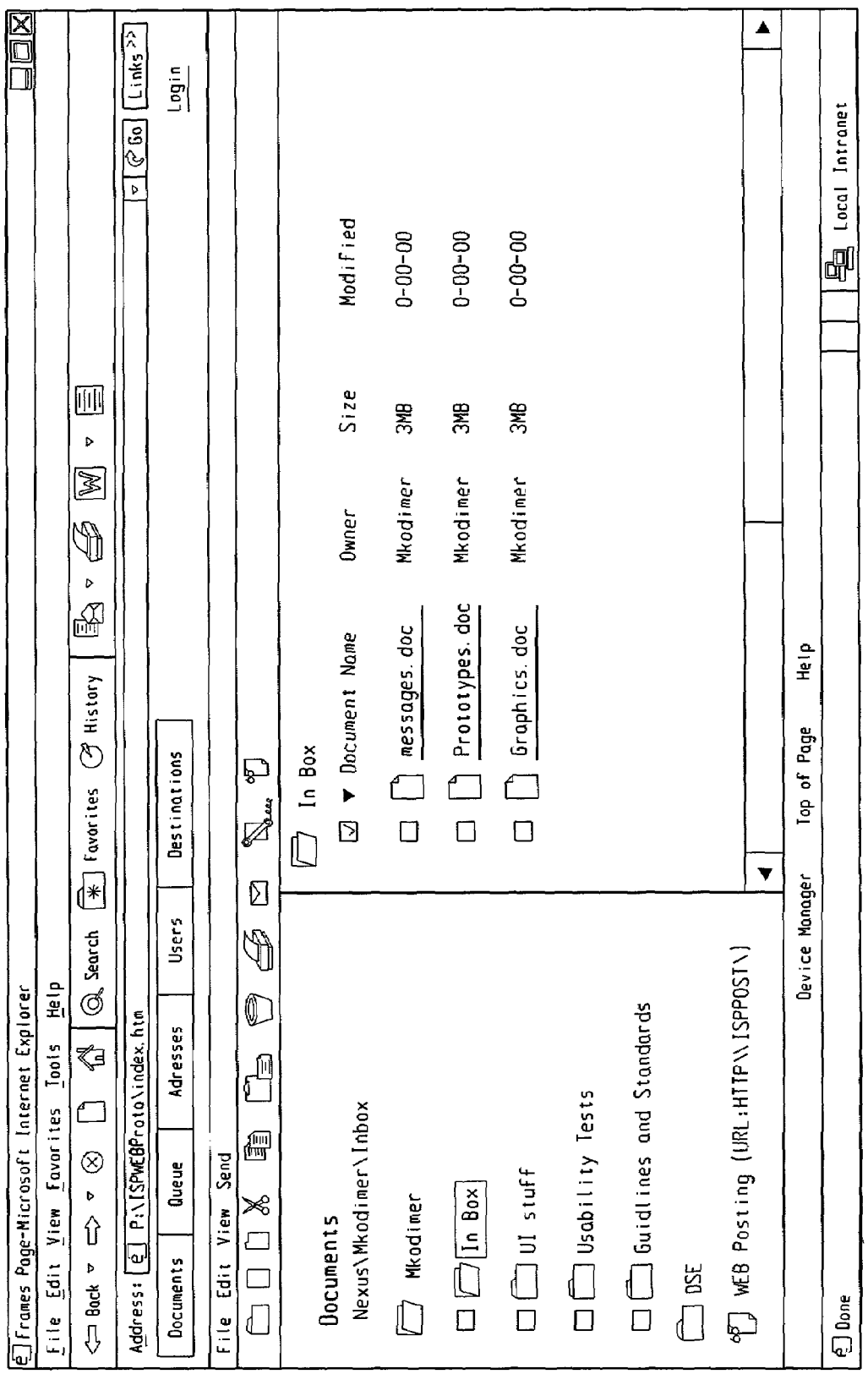
FIG. 31 illustrates a screenshot of a GUI window and general structure.

Referring now to FIG. 31, there is illustrated a screenshot of a GUI window and general structure. The GUI framework is based on a tab design. Four tabs represent the user interface content: Documents, Queue, Addresses, Users, and Destinations. The following terminology is used to explain the user interface throughout the document. The "Header" contains the tabs, logo, login, menus and toolbar. The "Footer" can contain a vendor logo, the footer links, and copyright information. For example, a Device Manager footer link invokes the Device Manager web module. A Top footer link takes a user to the top of the body when page is scrolled, and a Help link invokes web help. The "Body" contains the main content (based on selected tab). Depending on the selected tab, the body may be divided into two frames. The two frames are referred to as the Container Frame, and the Contents Frame.

One item is always selected (or highlighted) in the container frame. The container supports single-selection only. When a container is selected, the associated view in the Contents frame is updated. The selected container is the target of paste operations.

One or more items can be checked. Checked items can become the source for editing operations including cut, copy, paste, and delete.

Referring now to FIG. 32, there is illustrated a popup window. Popup windows are used throughout the UI in a consistent manner to present nested information. The popup window contains the following UI elements: Window Heading, Horizontal Rule separating content from terminating buttons, and Terminating buttons. Terminating buttons used are either OK (for those windows that are not editable) or OK/Cancel (for those windows that are editable). Popup windows appear in the center of the user screen.

Figure 33:
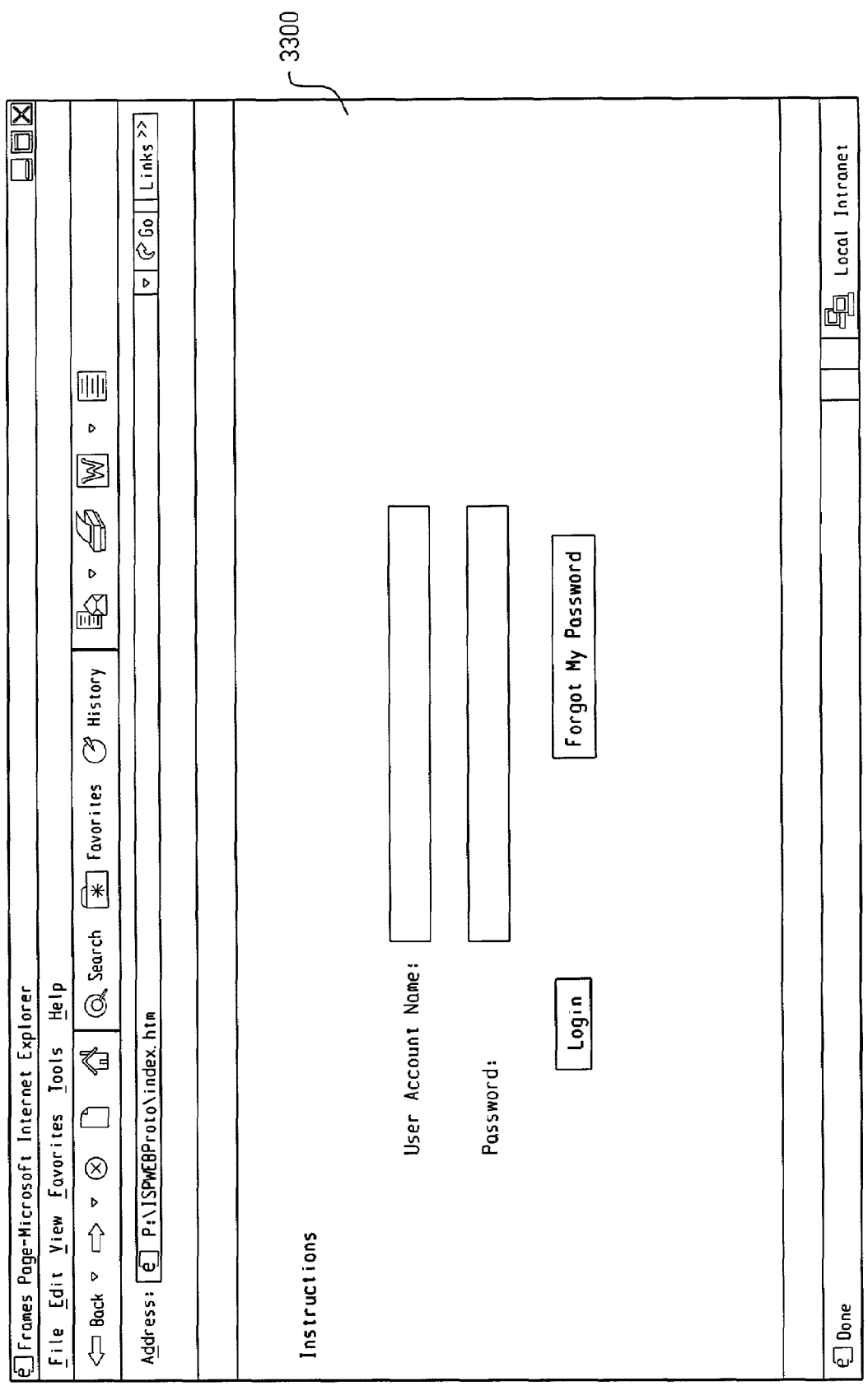
FIG. 33 illustrates a screenshot of login window.

Referring now to FIG. 33, there is illustrated a screenshot of login window. To access the disclosed appliance system, the user must login. After entering a URL to the system, the login screen is invoked. The Login button is clicked and the system user name and password is checked by the system. If login is successful, the main interface is shown. The documents Tab is selected and the user private folder is opened. All folders that the user has access to are visible. Only folders that the user has access to are visible. If the user enters the wrong user name or password, an error Alert Box is shown indicating to the user that the account name or password is not recognized. The field containing the error (either the User Name or Password) is shown in red. Focus is given to the relevant edit field.

Figure 34:
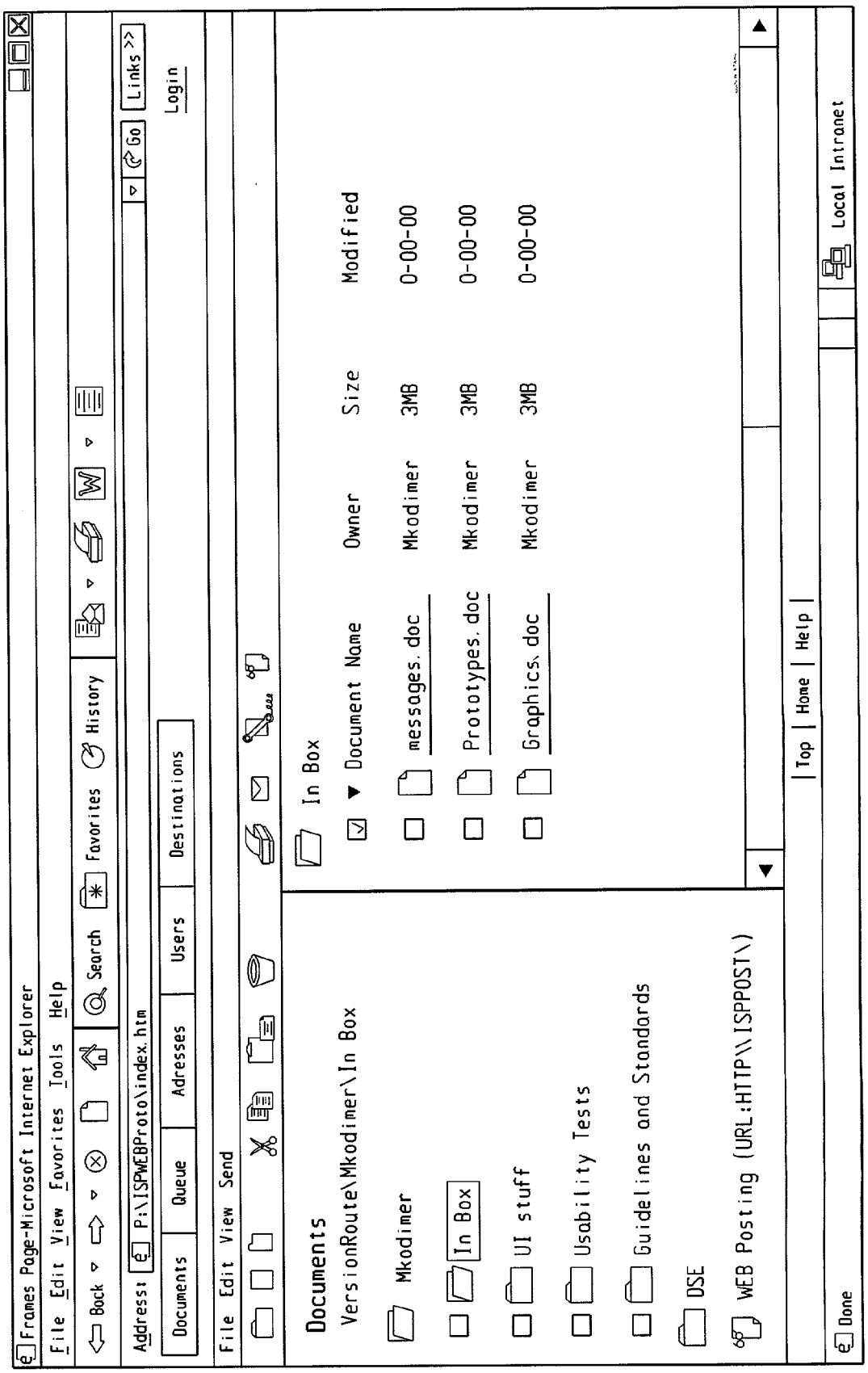
FIG. 34 illustrates a screenshot of sample documents listed under the Documents tab for an Inbox, and corresponding frame information.
Figure 35:
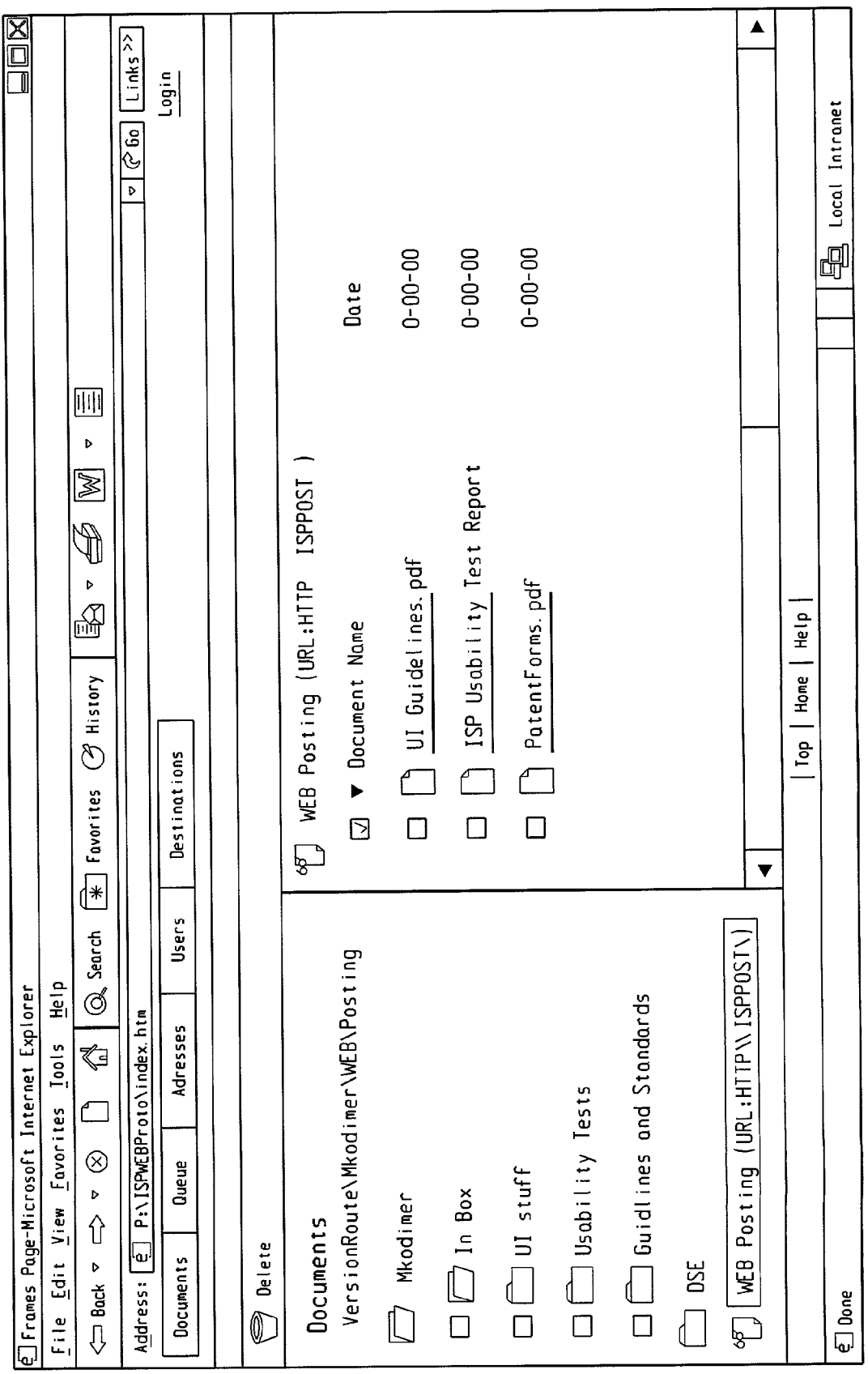
FIG. 35 illustrates a screenshot of sample documents listed under the Documents tab for of a web posting, and corresponding frame information.

Referring now to FIGS. 34 and 35, there are illustrated screenshots of various document tab selections, and corresponding frame information. The left side of the page shows the container frame and two types of containers—Folders and Web Post. When the user selects a folder from the Containers frame on the left, the documents are shown in the contents folder on the right. The name of the folder and the folder icon are shown in the Contents Frame heading. If the selected folder has subordinate folders, the folder tree is expanded to show subordinate folders. When the user selects the Web Post container, the corresponding posted documents are shown in the Contents frame. The owner of a posted document only can delete a posted document. The user can cut, copy, paste, or delete a document in the Contents frame by checking the document and selecting the appropriate menu or toolbar button. The user can view the document by clicking on the document link. The document link invokes the Viewer.

Figure 36:
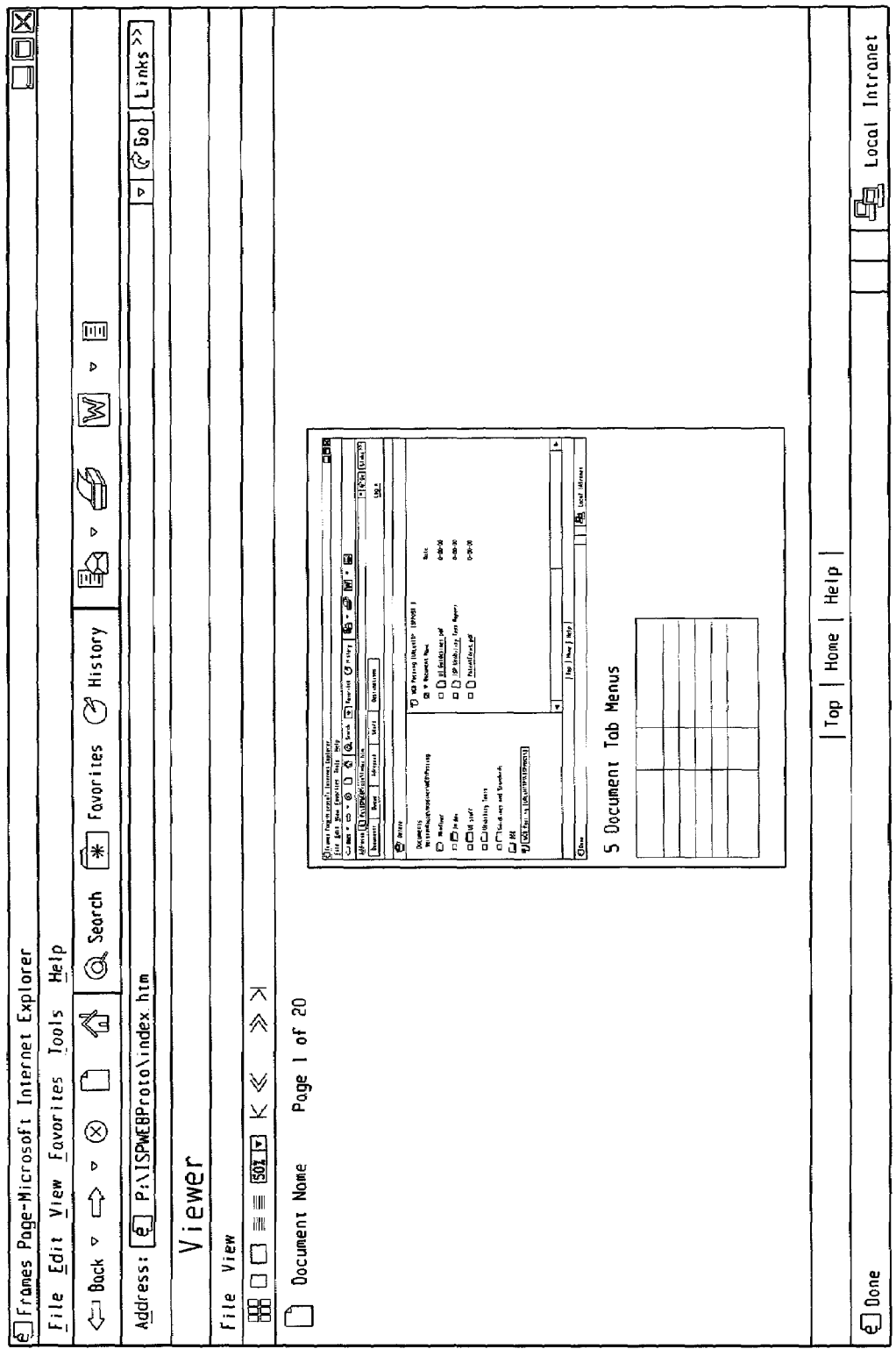
FIG. 36 illustrates a screenshot of a document viewer.

Referring now to FIG. 36, there is illustrated a screenshot of a document viewer. The viewer allows the user to view the document without checking the document out for editing. In this particular embodiment, the document has twenty pages, which is indicated in the page heading, when in page view mode.

Figure 37:
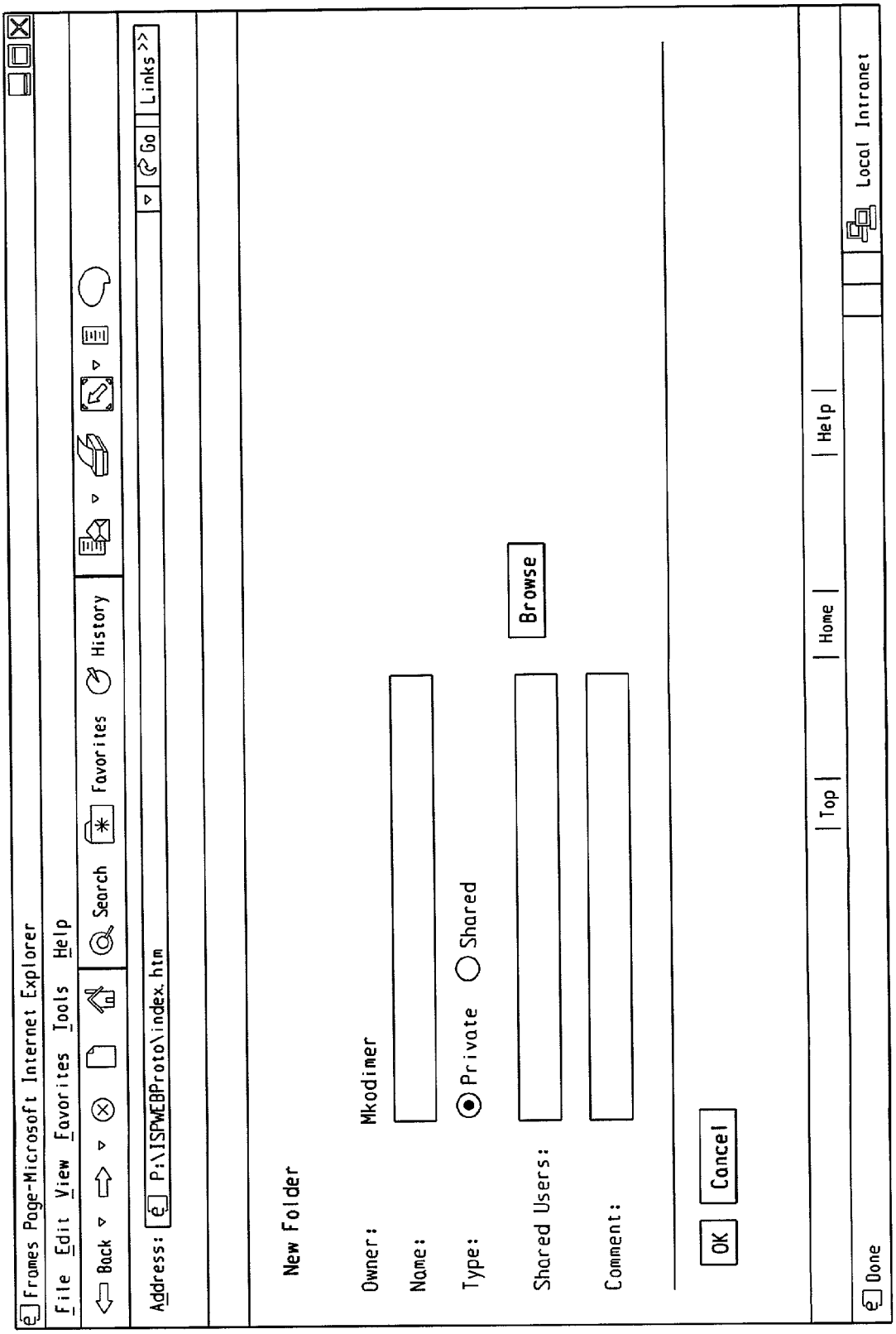
FIG. 37 illustrates a screenshot of a window that allows the user to create a new folder.

Referring now to FIG. 37, there is illustrated a screenshot of a window that allows the user to create a new folder. The user can select private or shared, enter the name of the folder, and any comments to associate therewith.

Figure 38:
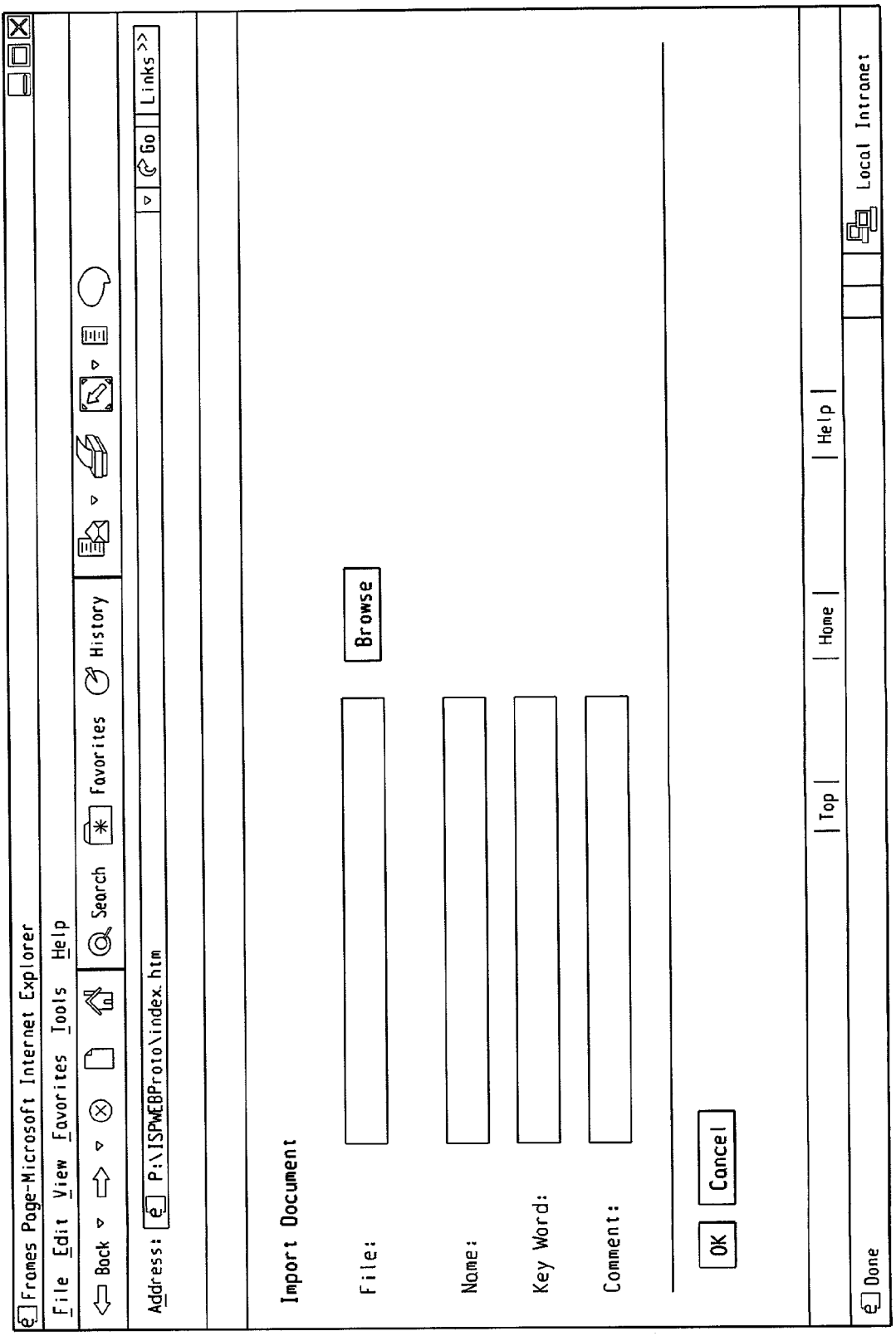
FIG. 38 illustrates a screenshot of a window that allows the user to import a document.

Referring now to FIG. 38, there is illustrated a screenshot of a window that allows the user to import a document. Utilizing this window, the user can import a document from the file system into the DMM system.

Figure 39:
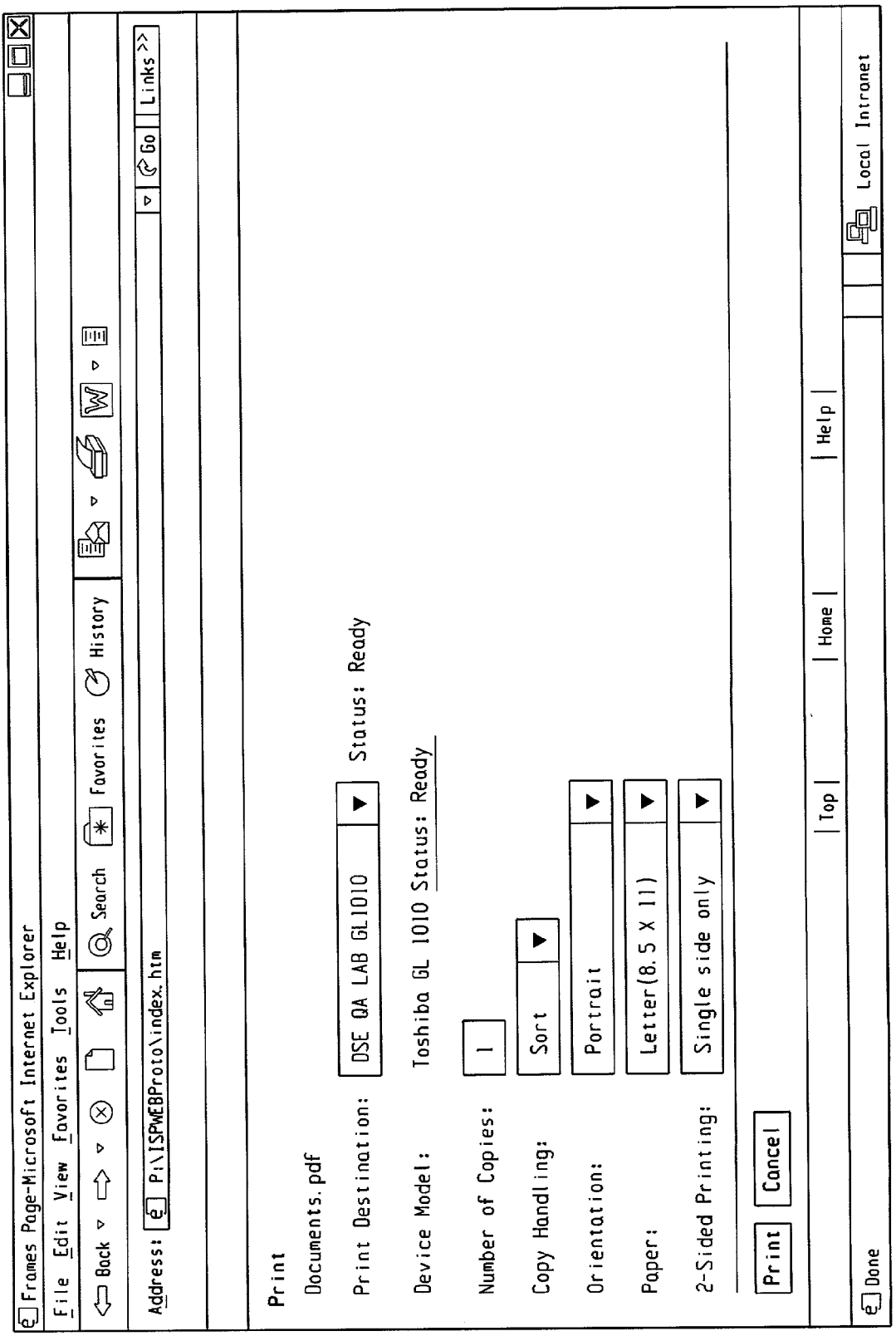
FIG. 39 illustrates a screenshot of a window that allows the user to direct a print job to selected destinations.

Referring now to FIG. 39, there is illustrated a screenshot of a window that allows the user to direct a print job to selected destinations. As illustrated, the window displays the name of the output device, output device status, device model, number of copies, type of copy handling, page orientation, paper size, and sided-printing options.

Figure 40:
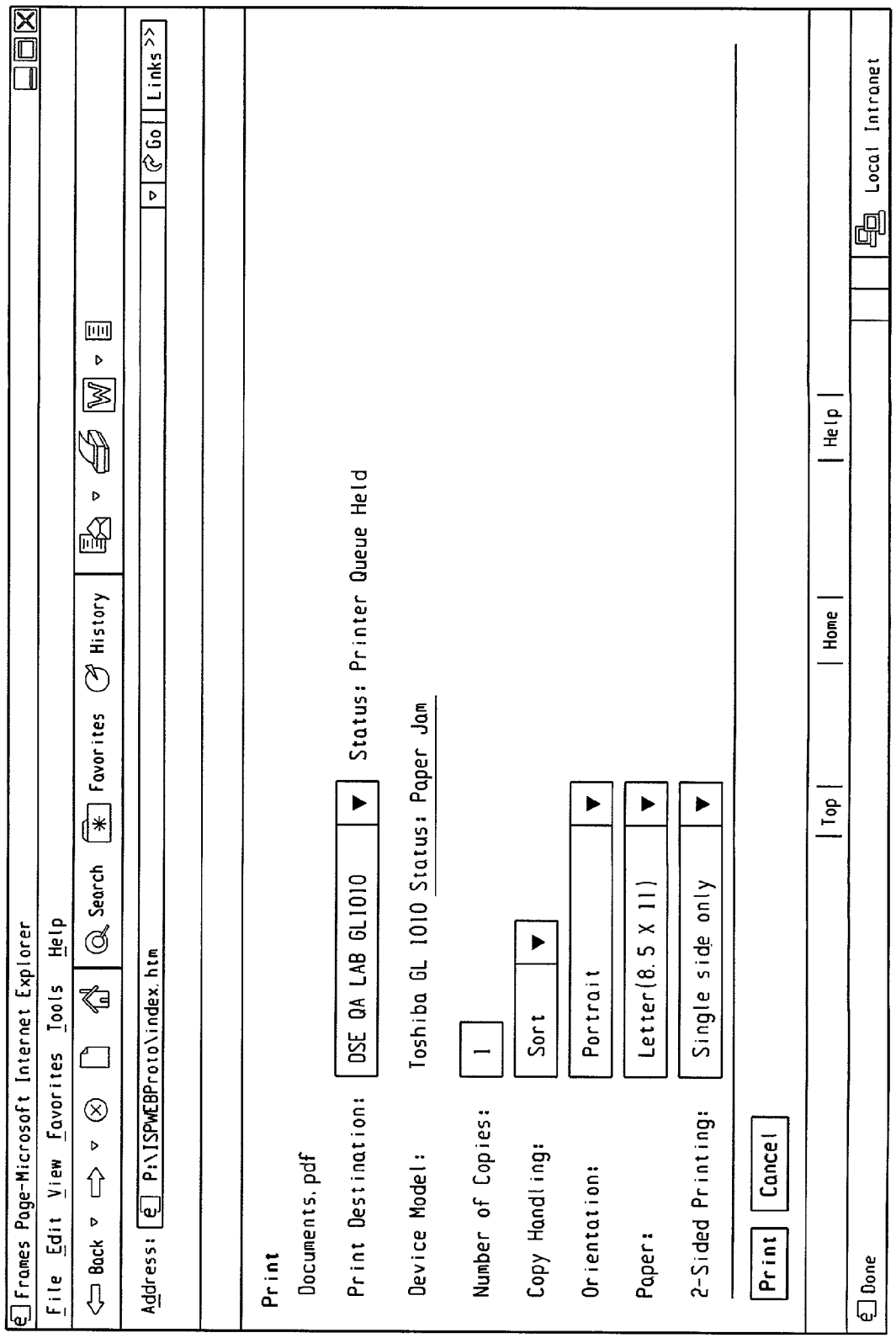
FIG. 40 illustrates a screenshot of the window of FIG. 39 showing updated status information about a print job.

Referring now to FIG. 40, there is illustrated a screenshot of the window of FIG. 39 showing updated status information about the printer print job. In this case, the print queue is on hold since a paper jam has occurred, as indicated by the device status information.

Figure 41:
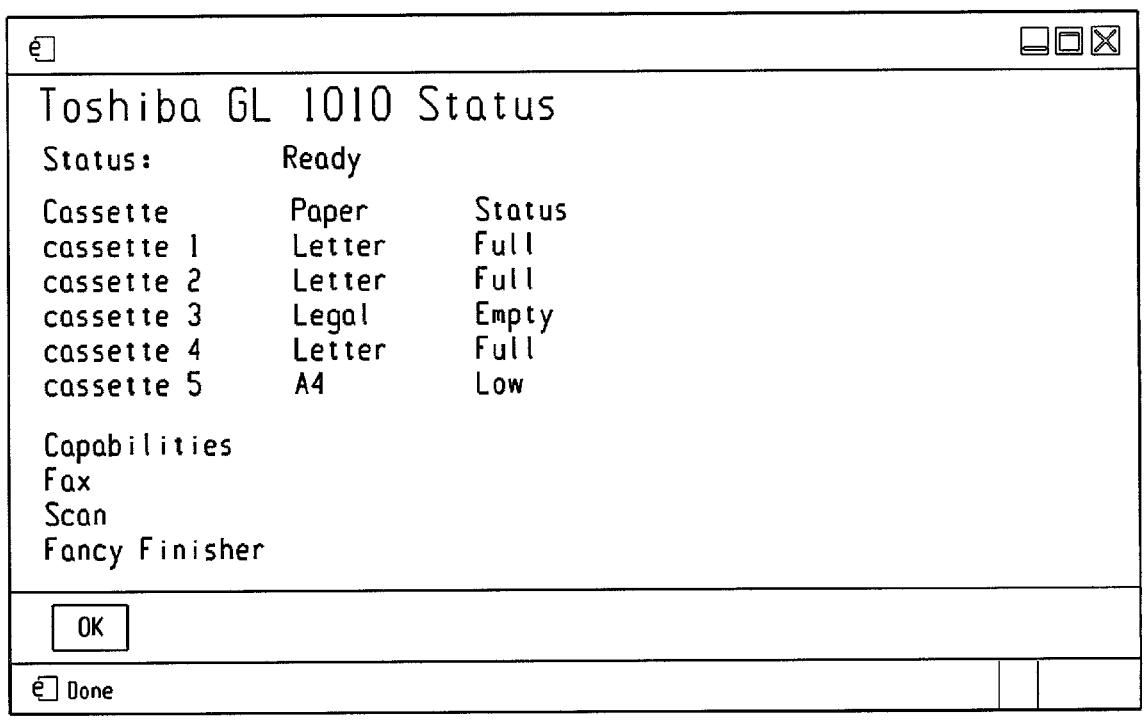
FIG. 41 illustrates a screenshot of a popup window that allows the user to view the status of printer resources, for example, available paper in various cassette trays of the printer, and what that particular model is configured to provide, i.e., fax and scan capabilities, and an option called Fancy Finisher.

Referring now to FIG. 41, there is illustrated a screenshot of a popup window that allows the user to view the status of printer resources, for example, available paper in various cassette trays of the printer, and what that particular model is configured to provide, i.e., fax and scan capabilities, and an option called Fancy Finisher.

Figure 42:
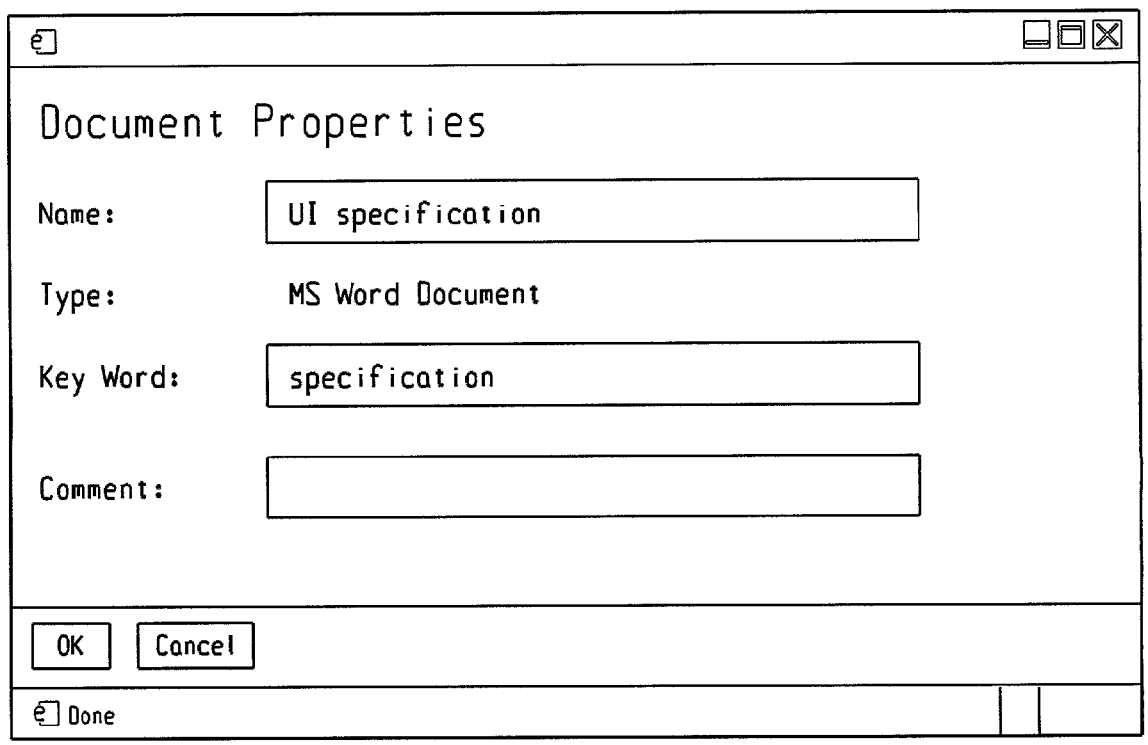
FIG. 42 illustrates a screenshot of a popup window that allows the user, who has the appropriate access rights, to edit the document properties.

Referring now to FIG. 42, there is illustrated a screenshot of a popup window that allows the user, who has the appropriate access rights, to edit the document properties.

Figure 43:
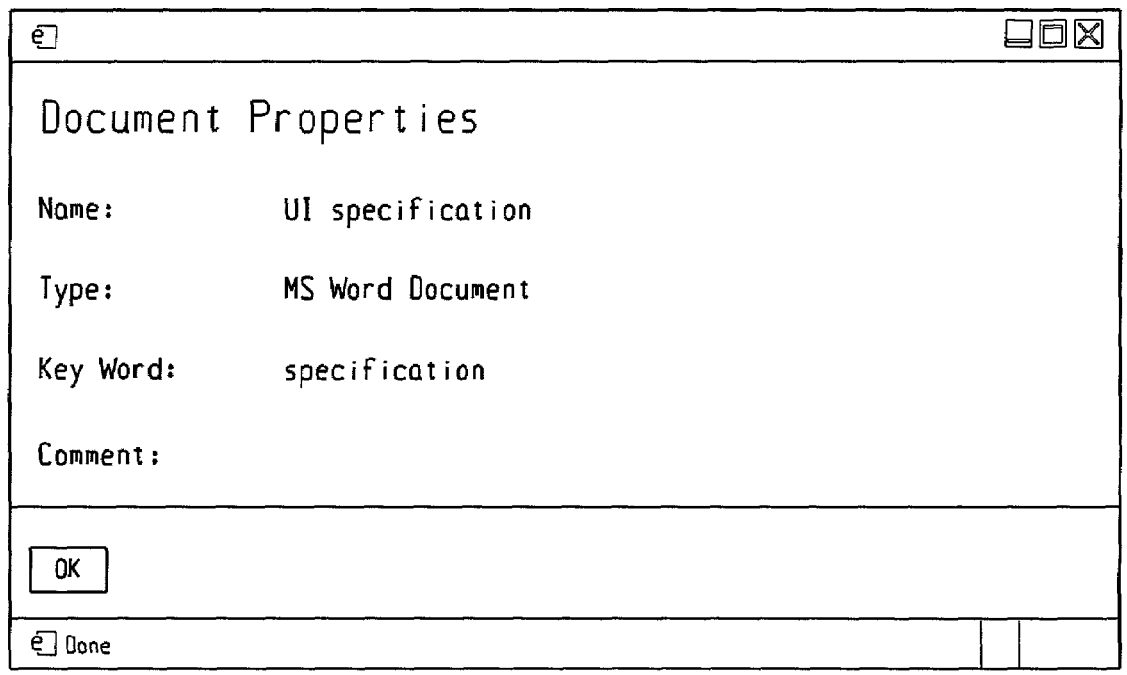
FIG. 43 illustrates a screenshot of a popup window that allows the user, who does not have the appropriate access rights, to simply view the document properties.

Referring now to FIG. 43, there is illustrated a screenshot of a popup window that allows the user, who does not have the appropriate access rights, to simply view the document properties.

Figure 44:
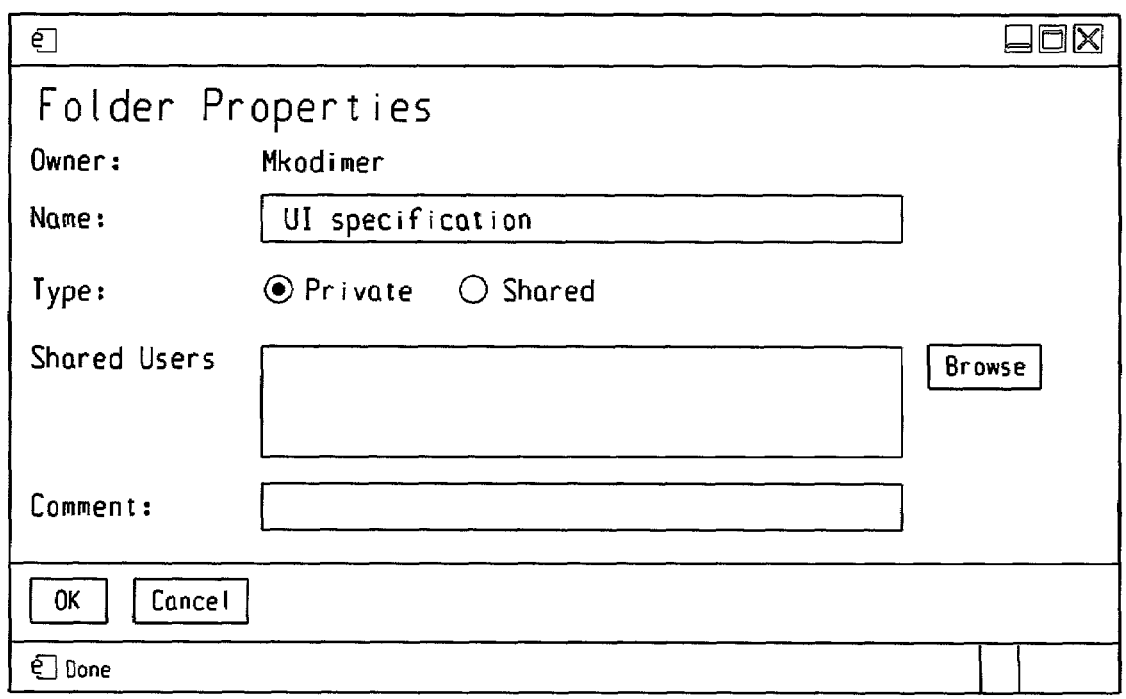
FIG. 44 illustrates a screenshot of a popup window that allows the user, who has the appropriate access rights, to edit the folder properties.

Referring now to FIG. 44, there is illustrated a screenshot of a popup window that allows the user, who has the appropriate access rights, to edit the folder properties.

Figure 45:
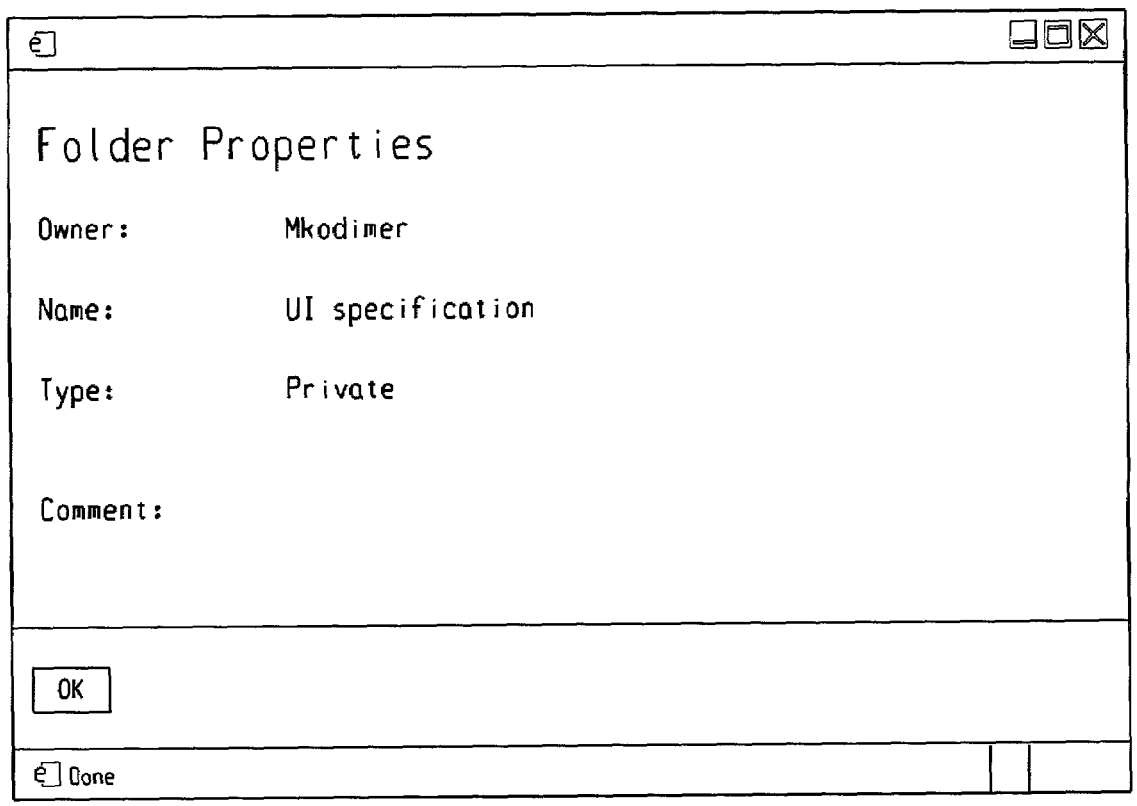
FIG. 45 illustrates a screenshot of a popup window that allows the user, who does not have the appropriate access rights, to simply view the document properties.

Referring now to FIG. 45, there is illustrated a screenshot of a popup window that allows the user, who does not have the appropriate access rights, to simply view the document properties.

Figure 46:
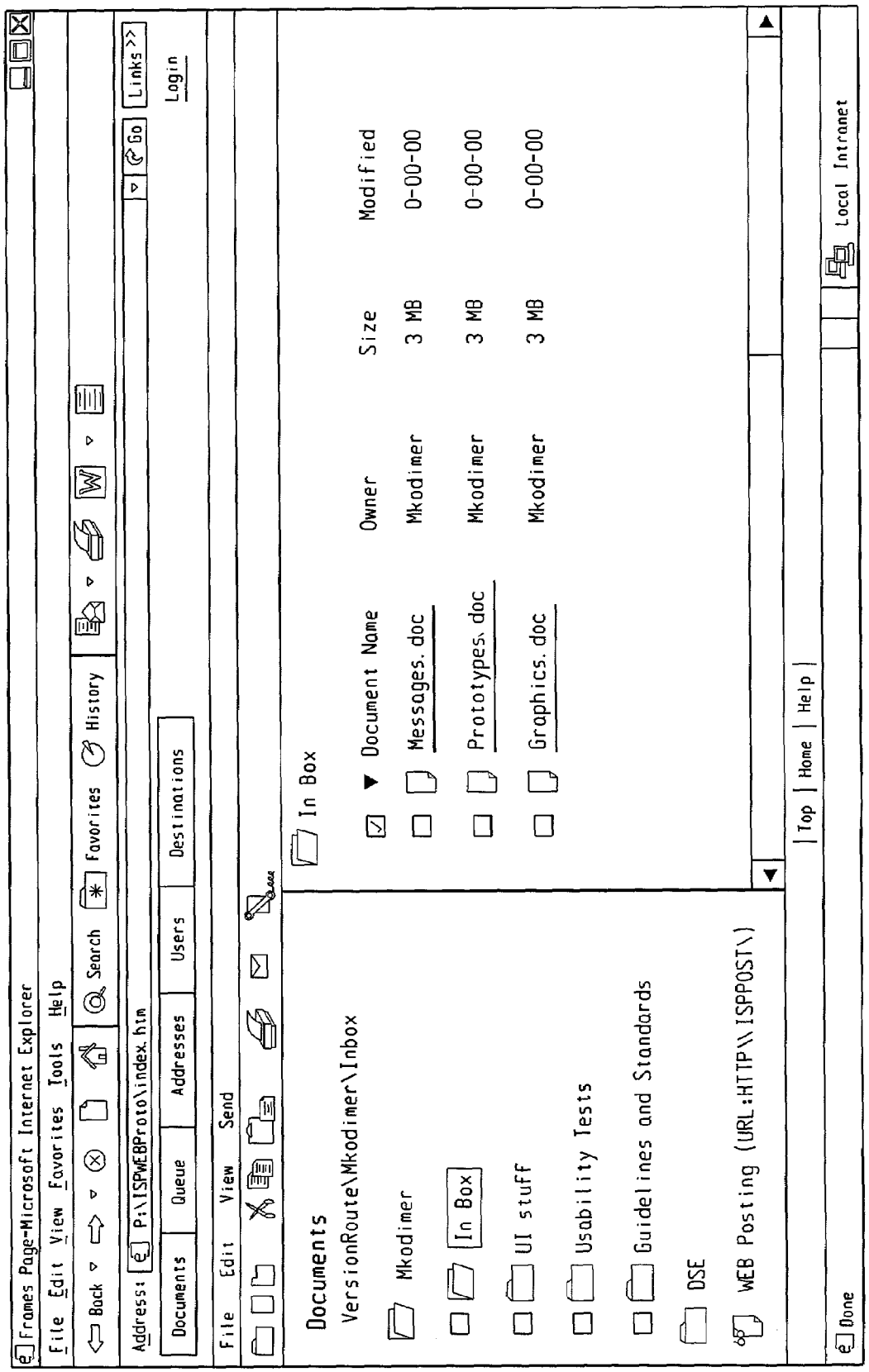
FIG. 46 illustrates a screenshot of a view menu window that allows the user view the contents of a selected container.

Referring now to FIG. 46, there is illustrated a screenshot of a view menu window that allows the user view the contents of a selected container. The content information includes the document name, owner, size, and date modified.

Figure 47:
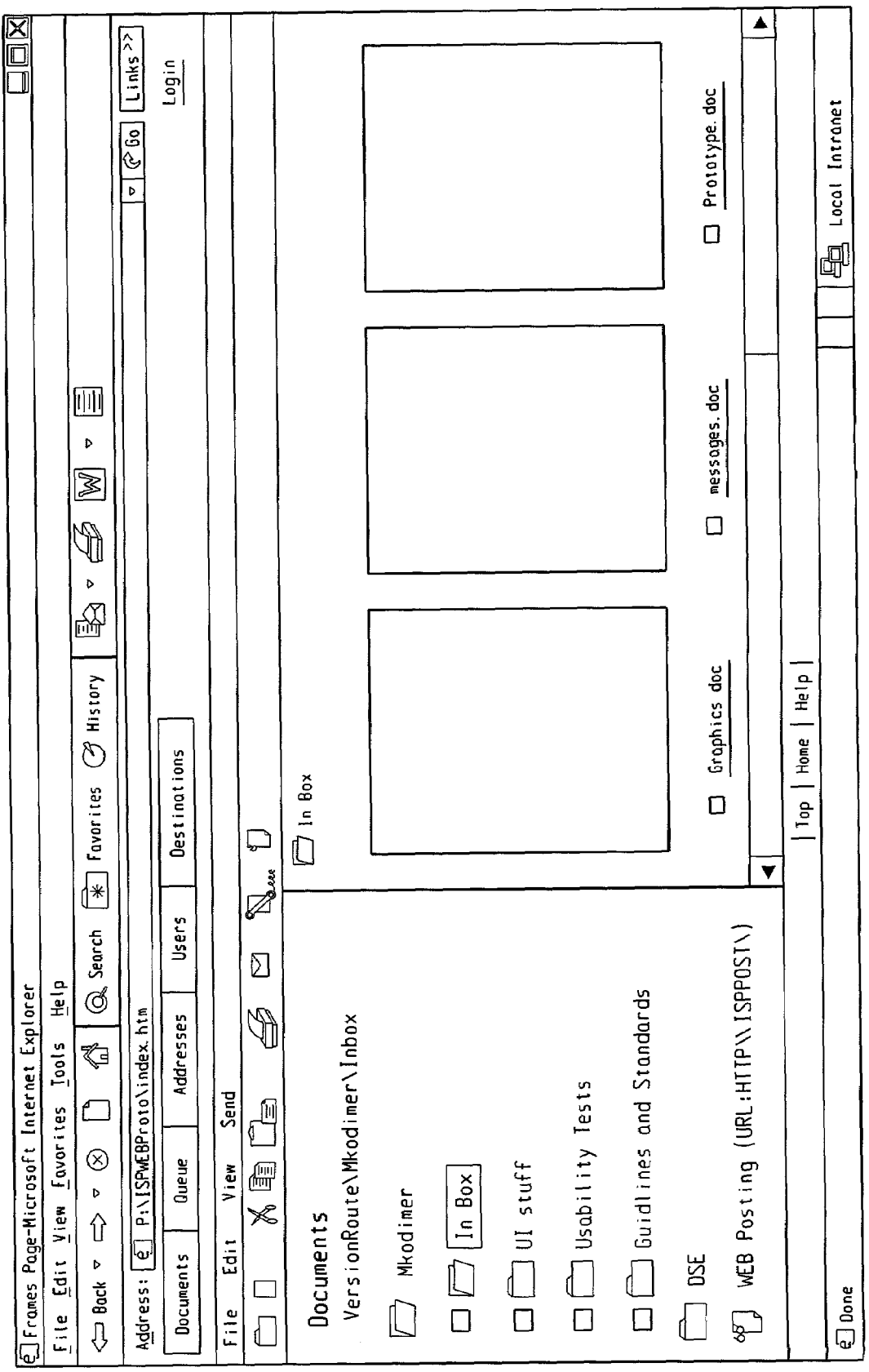
FIG. 47 illustrates a screenshot of a window that allows the user to view thumbnail images of the three documents listed in FIG. 46.

Referring now to FIG. 47, there is illustrated a screenshot of a window that allows the user to view thumbnail images of the three documents listed in FIG. 46.

Figure 48:
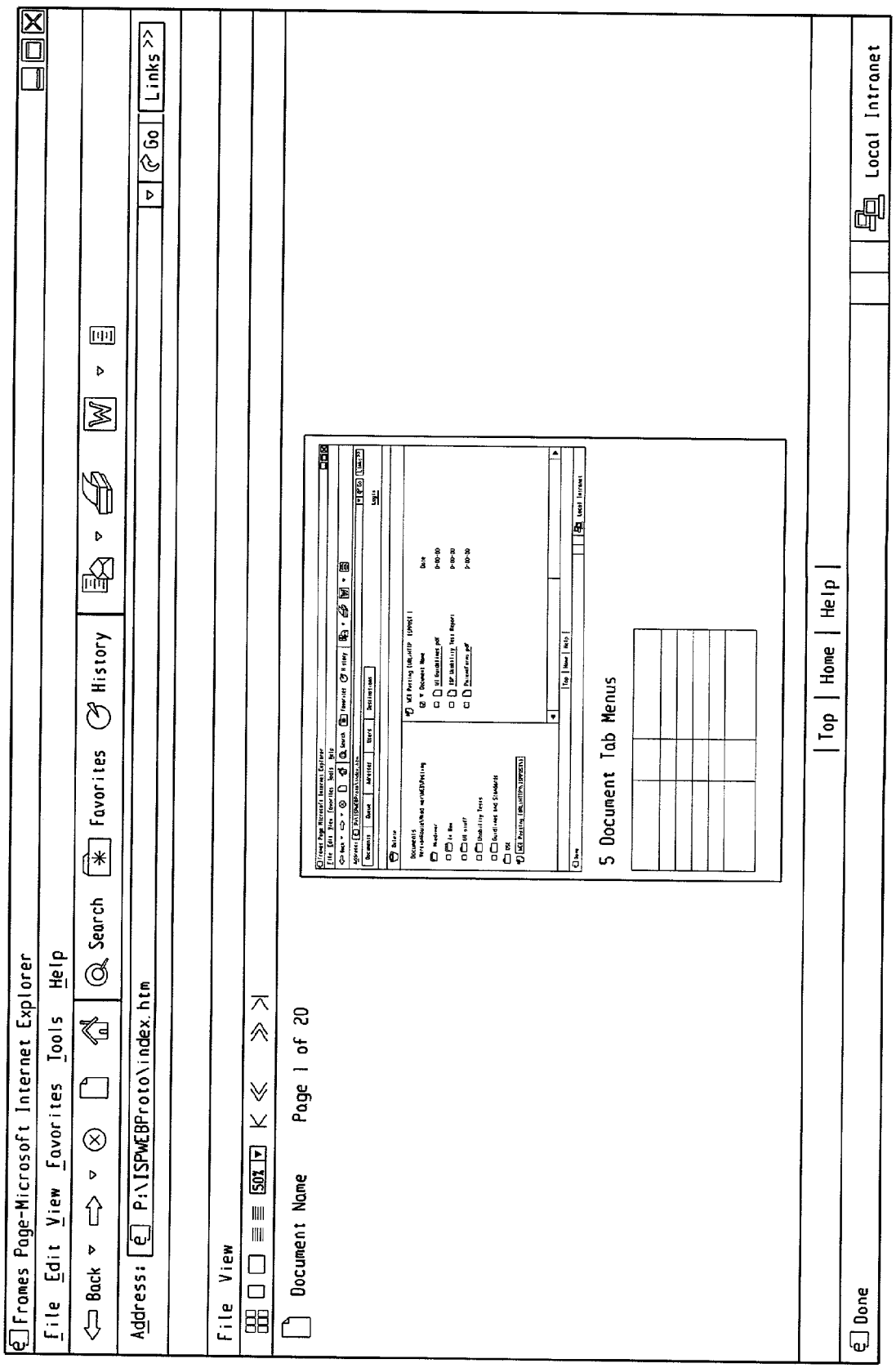
FIG. 48 illustrates a screenshot of a window that allows the user to view the full document selected from FIG. 46.

Referring now to FIG. 48, there is illustrated a screenshot of a window that allows the user to view the full document selected from FIG. 46.

Figure 49:
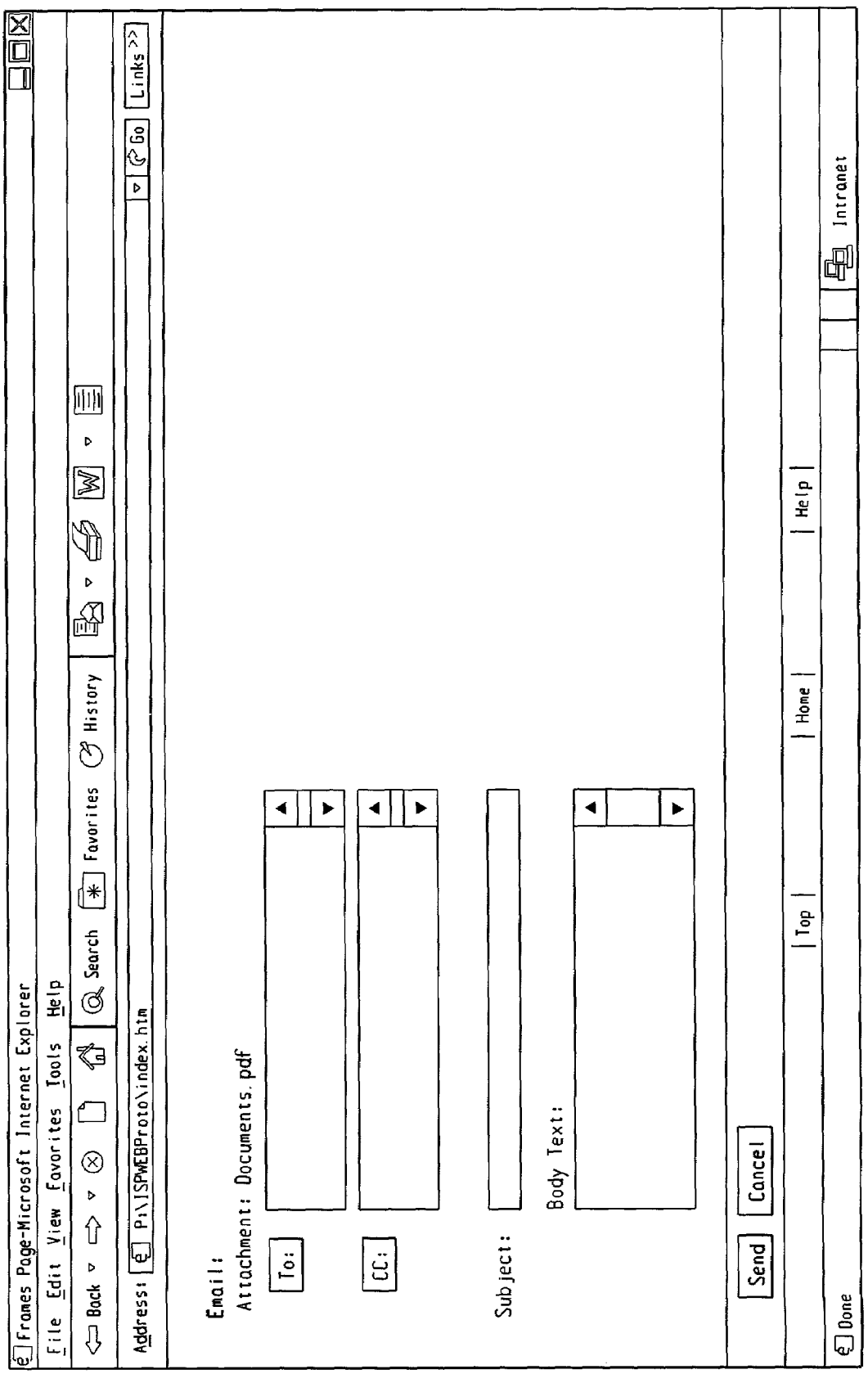
FIG. 49 illustrates a screenshot of an e-mail window accessible under the Send menu that allows the user send one or more documents to that particular destination device.

Referring now to FIG. 49, there is illustrated a screenshot of an e-mail window accessible under the Send menu that allows the user send one or more documents to that particular destination device.

Referring now to FIG. 50, there is illustrated a screenshot of a popup window that allows the user to select the destinations for the document when e-mailing is the mode of transmission. A table shows all of the contacts that are contained in the user address book. The user selects one or more destination addresses. The bolded entries near the bottom are e-mail groups.

Figure 51:
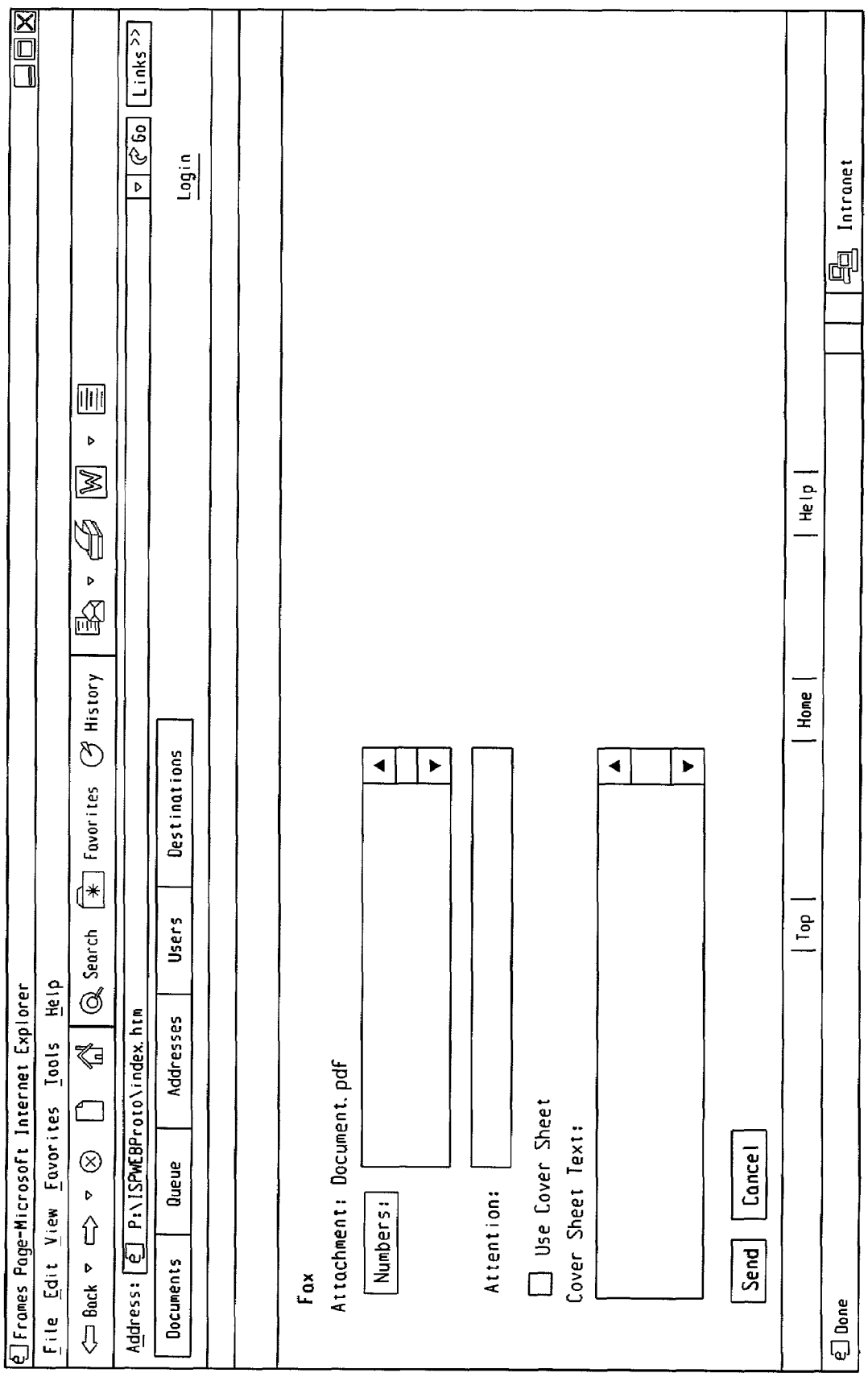
FIG. 51 illustrates a screenshot of a window that allows the user to select one or more documents for sending to a fax device for faxing to one or more recipients.

Referring now to FIG. 51, there is illustrated a screenshot of a window that allows the user to select one or more documents for sending to a fax device for faxing to one or more recipients. Recipient telephone numbers are entered in the Numbers field in comma-separated format.

Referring now to FIG. 52, there is illustrated a screenshot of a fax popup window that allows the user to more conveniently select fax recipients already entered into the system.

Figure 53:
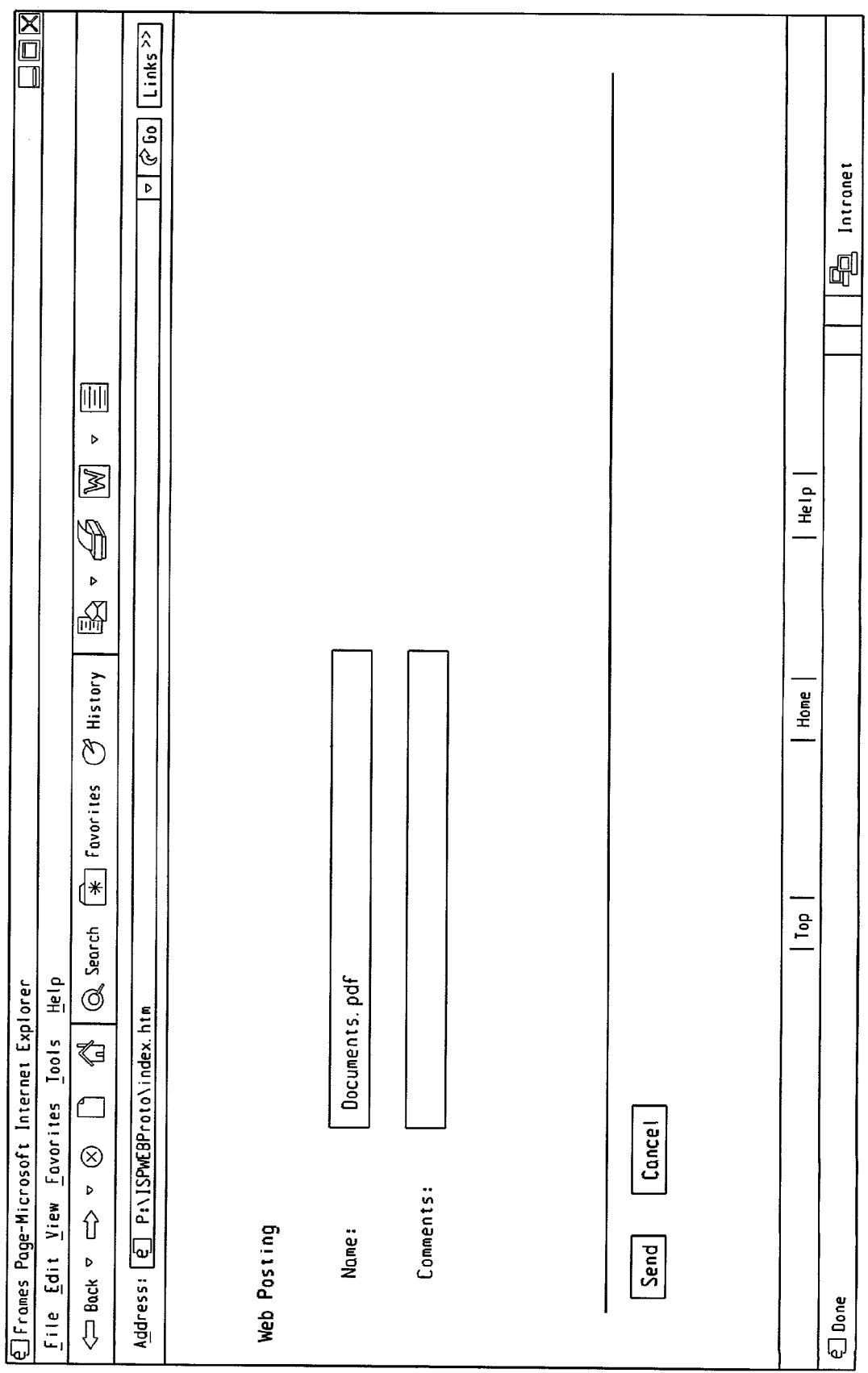
FIG. 53 illustrates a screenshot of a window that allows the user to send documents to a web server.

Referring now to FIG. 53, there is illustrated a screenshot of a window that allows the user to send documents to a web server. The name of the document is displayed in the Name field. Comments may also be associated with the document in a Comments field.

Figure 54:
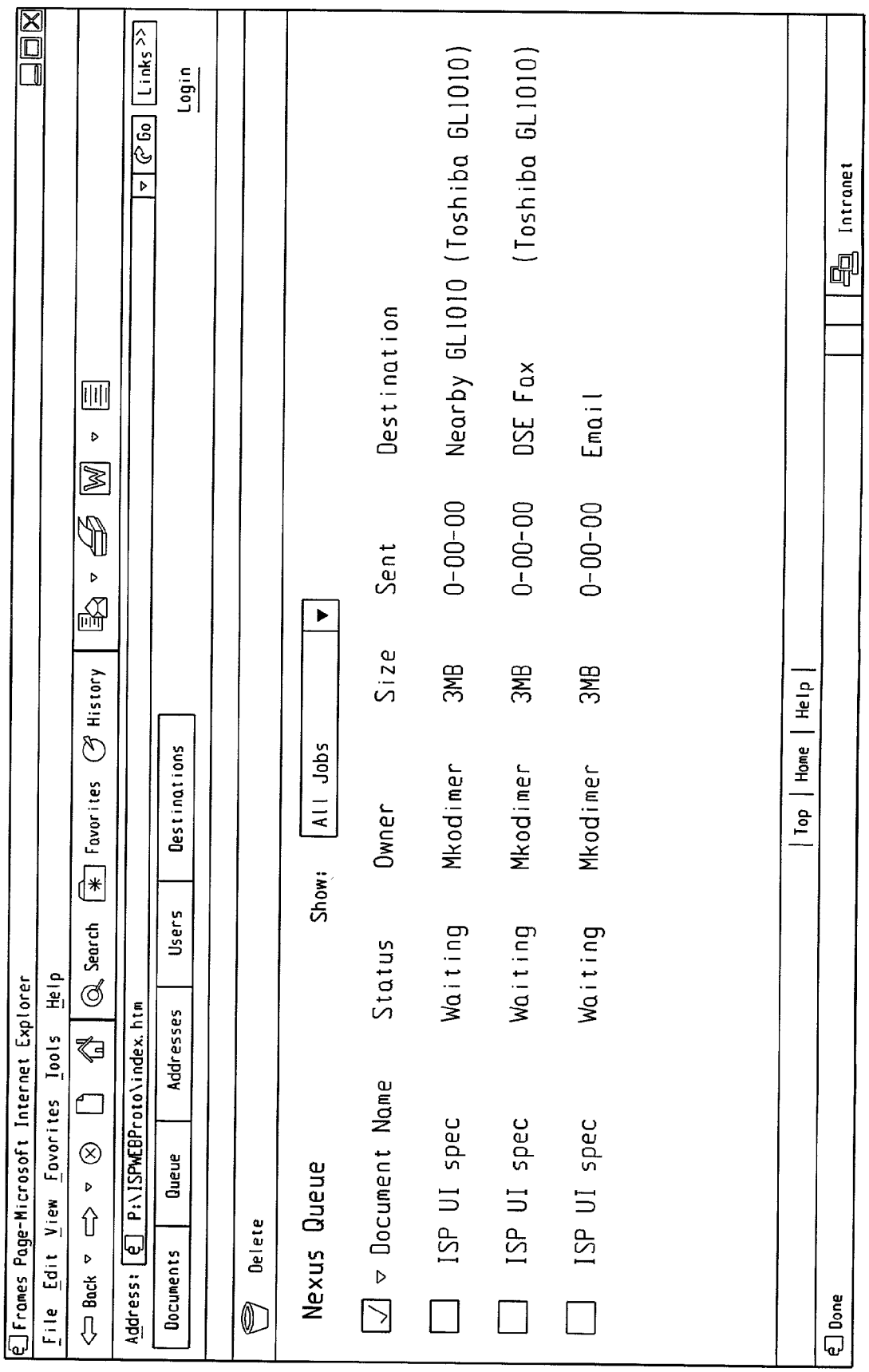
FIG. 54 illustrates a screenshot of a window that allows the user view all jobs in a job queue by selecting a Queue tab.

Referring now to FIG. 54, there is illustrated a screenshot of a window that allows the user view all jobs in a job queue by selecting a Queue tab. Job information includes the document name, status, document owner, size, data sent to the queue, and destination device (e.g., e-mail, fax, printer, etc.).

Referring now to FIG. 55, there is illustrated a screenshot of a popup window that allows the user view all jobs sent to a particular destination device listed in FIG. 54.

Figure 56:
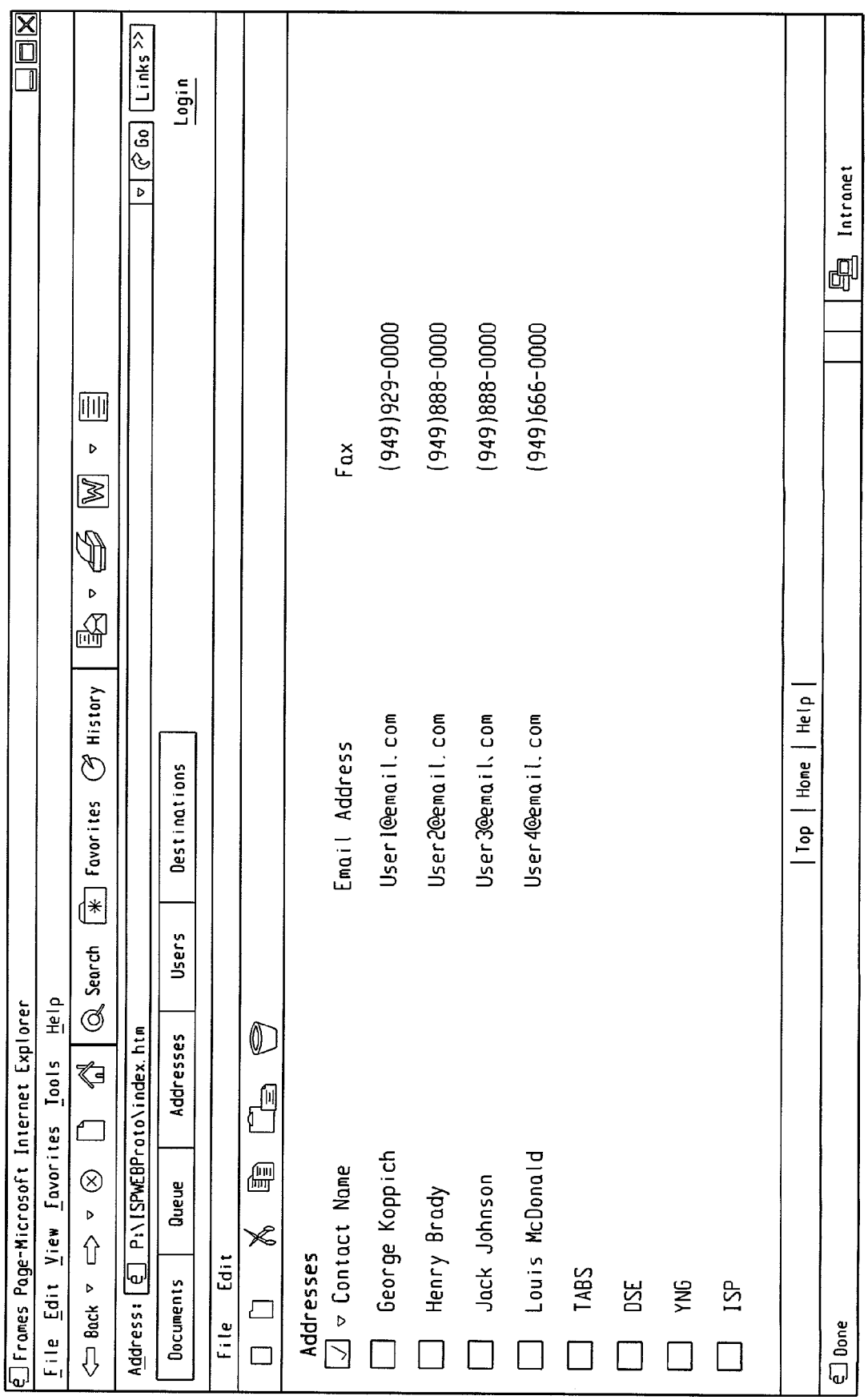
FIG. 56 illustrates a screenshot of a window presented in response to the user selecting the Addresses tab.

Referring now to FIG. 56, there is illustrated a screenshot of a window presented in response to the user selecting the Addresses tab. The window presents a list of user contact e-mail addresses.

Figure 57:
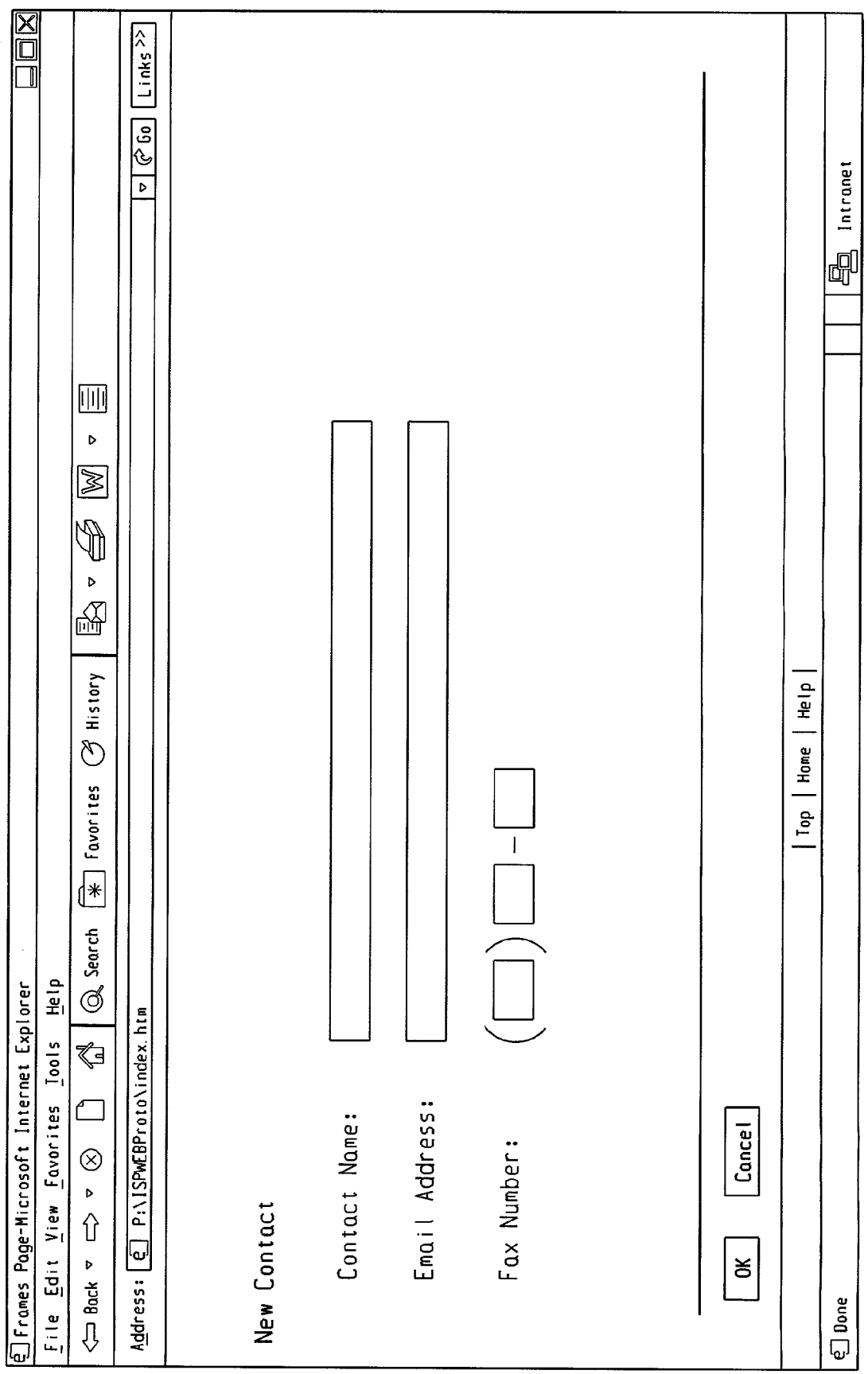
FIG. 57 illustrates a screenshot of a window that allows the user create a new contact by entering new contact information. Fields are provided for entering contact name, e-mail address, and fax number.

Referring now to FIG. 57, there is illustrated a screenshot of a window that allows the user create a new contact by entering new contact information. Fields are provided for entering contact name, e-mail address, and fax number.

Referring now to FIG. 58, there is illustrated a screenshot of a window that allows the user to edit properties of a user contact.

Figure 59:
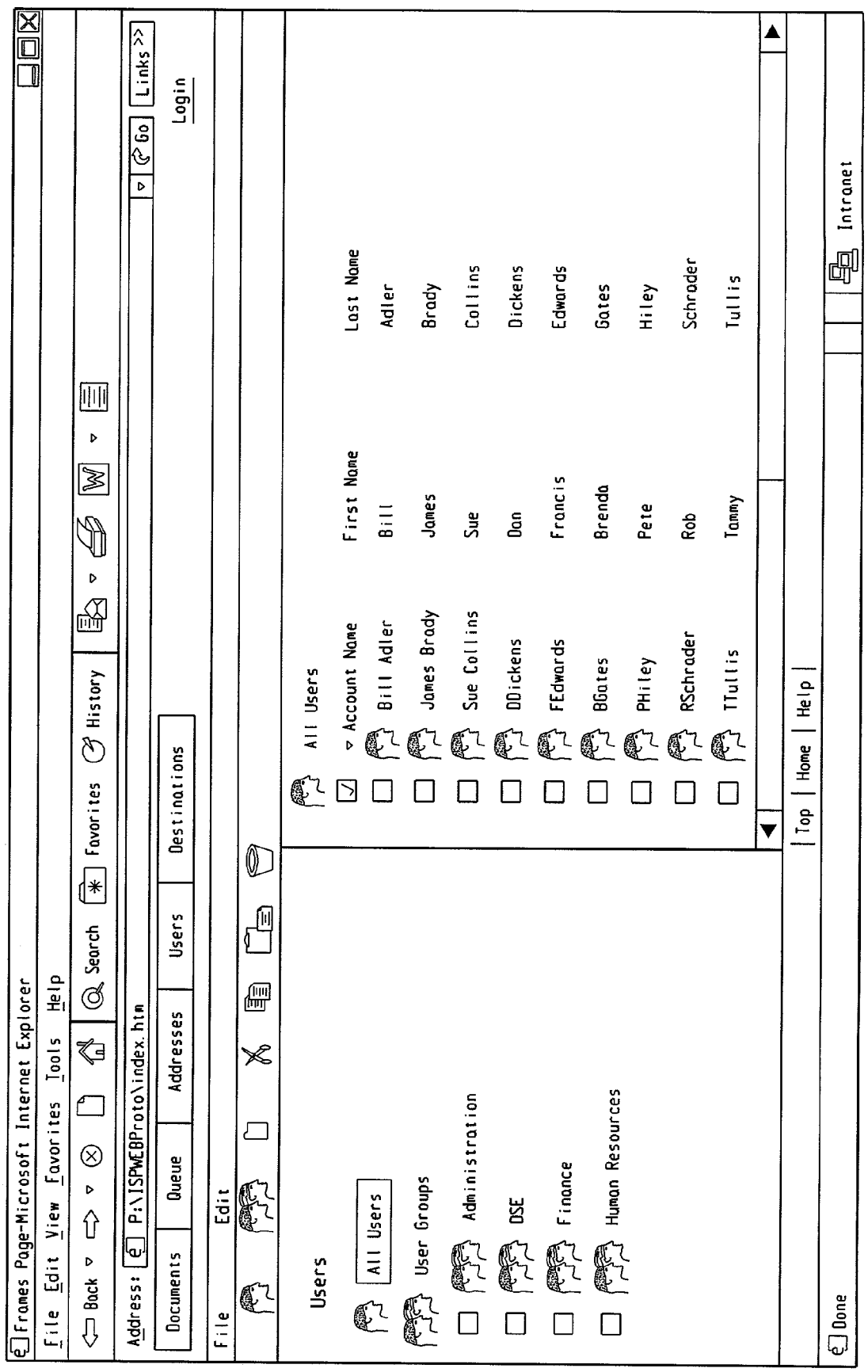
FIG. 59 illustrates a screenshot of a window displayed in response to the user selecting the Users tab, and which allows the Administrative user to manage all user accounts.

Referring now to FIG. 59, there is illustrated a screenshot of a window displayed in response to the user selecting the Users tab, and which allows the Administrative user to manage all user accounts. By selecting this tab, and the All Users option, all user accounts are displayed. Accounts can be edited, deleted, and moved to other user groups via cut-and-paste operations.

Figure 60:
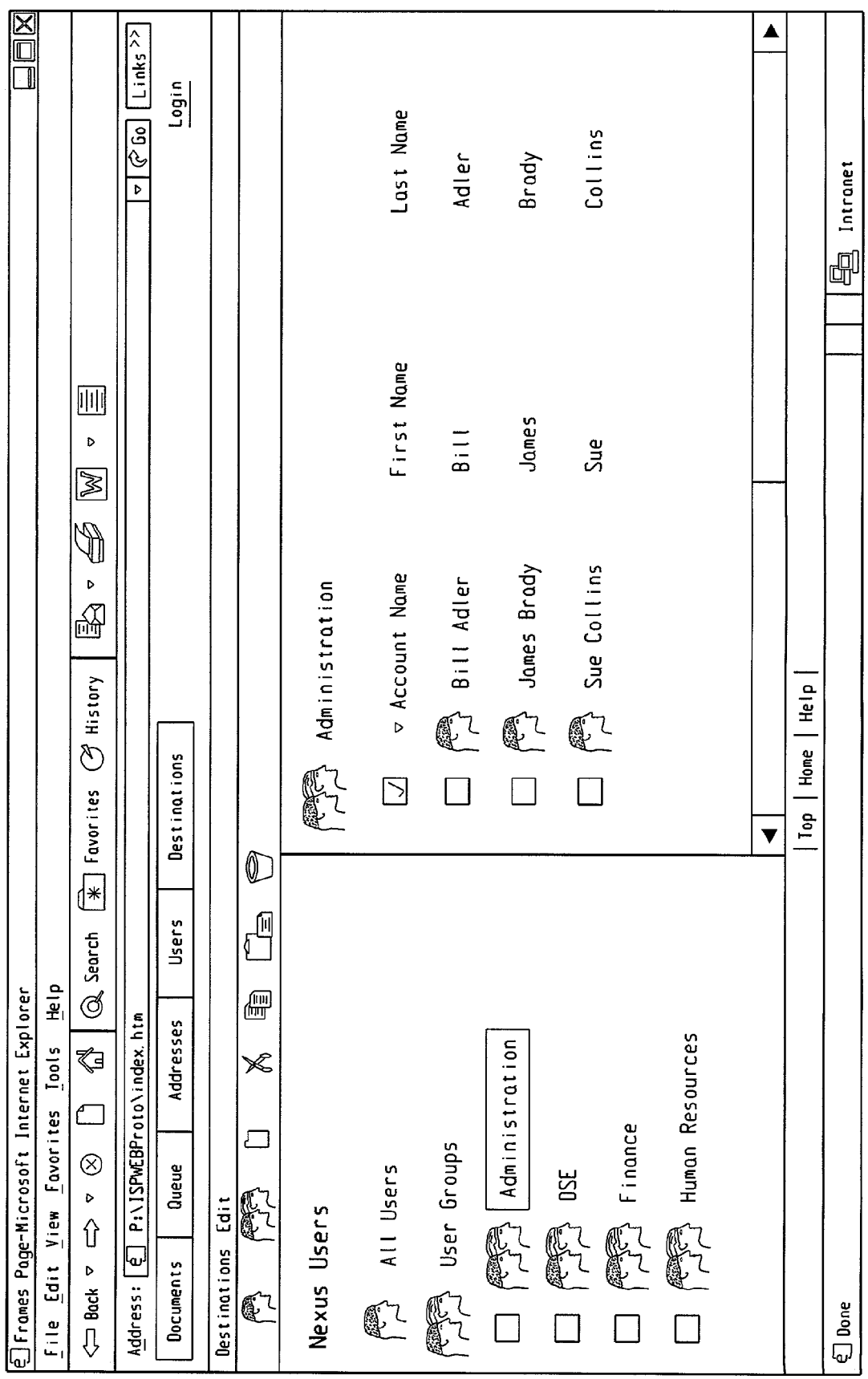
FIG. 60 illustrates a screenshot of a window displayed in response to the user selecting the Users tab, and which allows the Administrative user to manage user group accounts.

Referring now to FIG. 60, there is illustrated a screenshot of a window displayed in response to the user selecting the Users tab, and which allows the Administrative user to manage user group accounts. By selecting this tab, and the User Groups option, all user accounts within a group are displayed. Accounts can be edited, deleted, and moved to other user groups via cut-and-paste operations.

Figure 61:
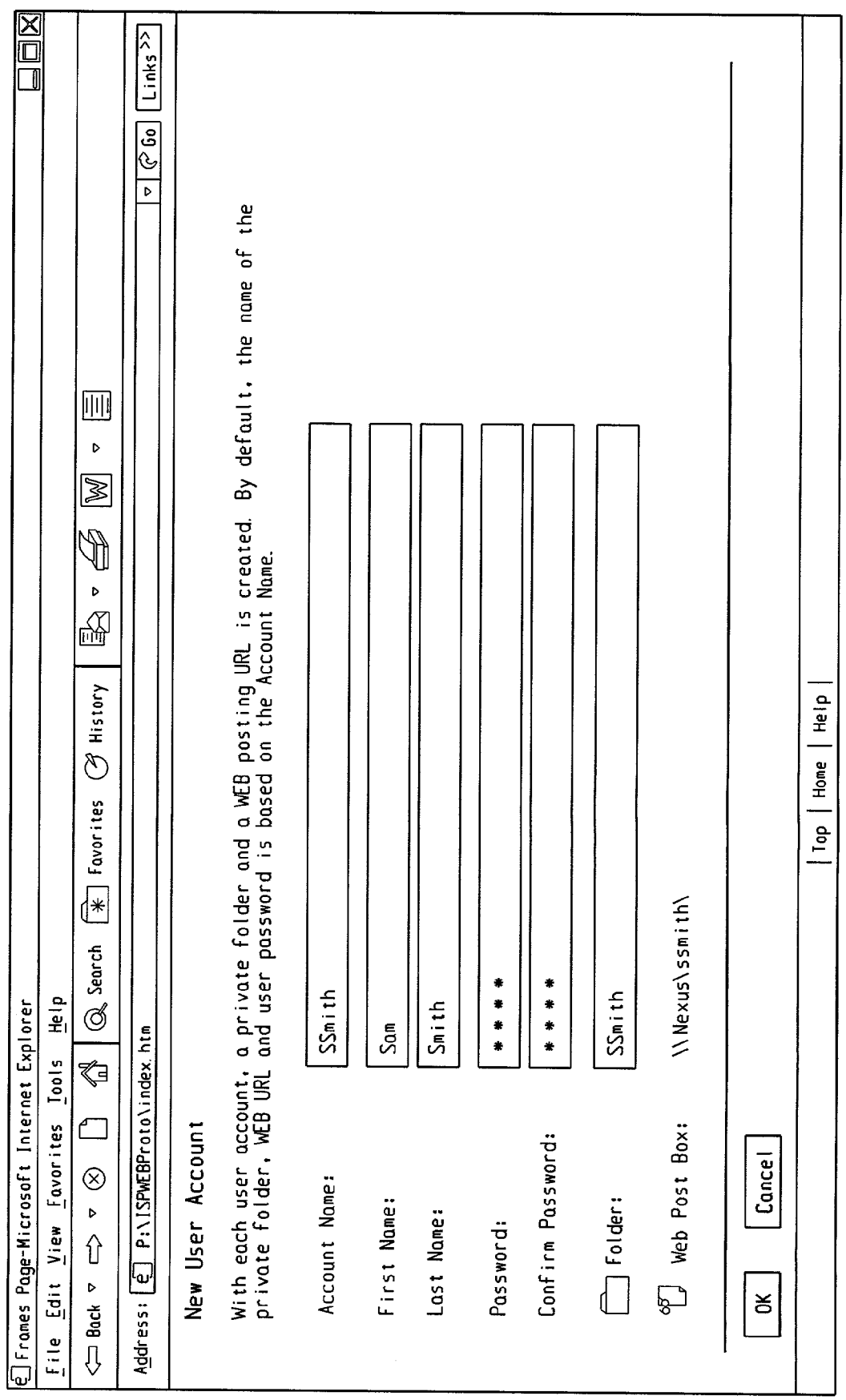
FIG. 61 illustrates a screenshot of a window that allows the Administrative user to add multiple new user accounts.

Referring now to FIG. 61, there is illustrated a screenshot of a window that allows the Administrative user to add multiple new user accounts. User information includes the account name, user name, password, user folder, and Web Post box.

Referring now to FIG. 62, there is illustrated a screenshot of a popup window that allows the Administrative user to add a single new user account. User information includes the account name, user name, password, user folder, and Web Post box.

Figure 63:
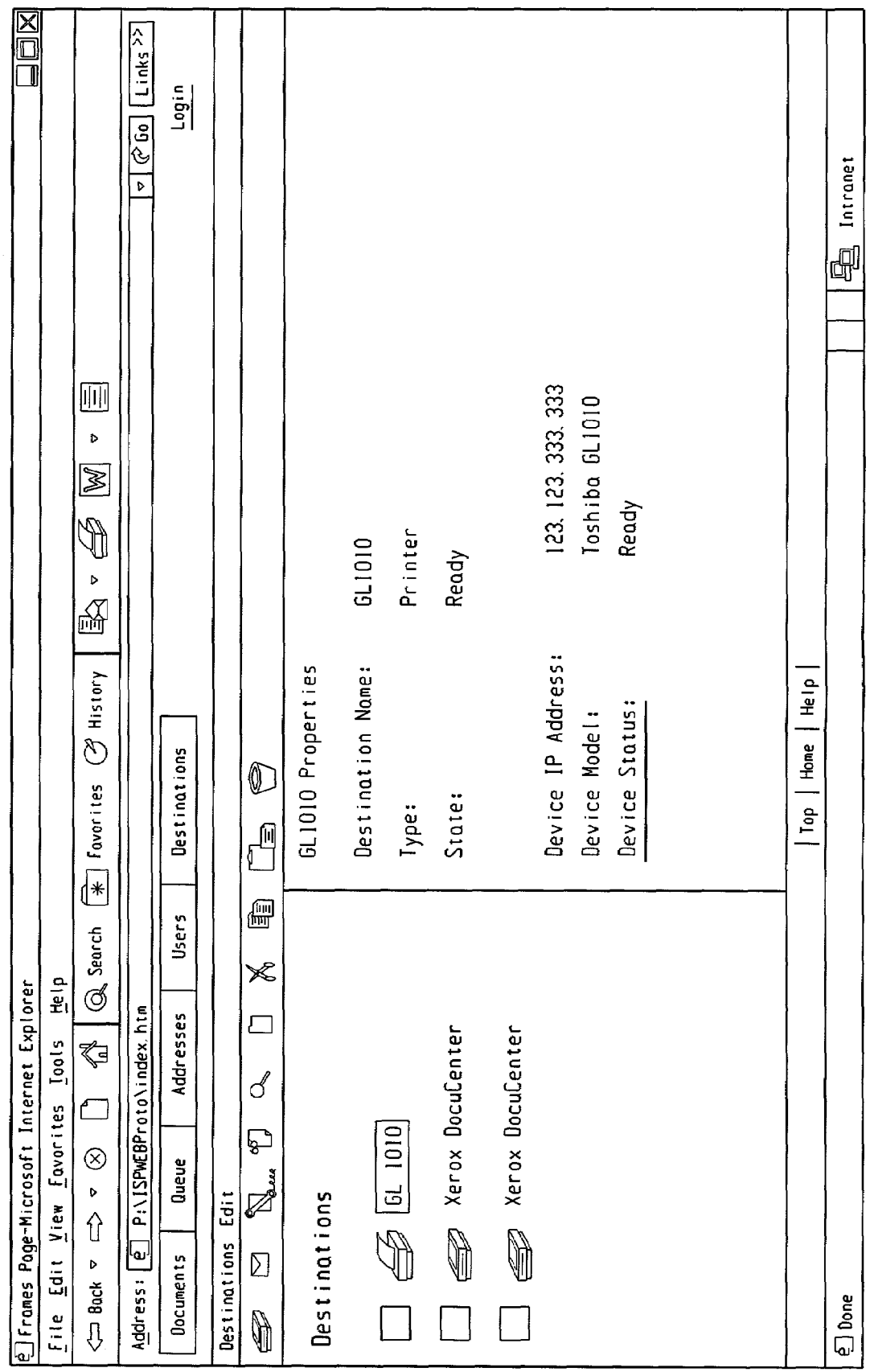
FIG. 63 illustrates a screenshot of a window displayed in response to selection of a printer under the Destinations tab.

Referring now to FIG. 63, there is illustrated a screenshot of a window displayed in response to selection of a printer under the Destinations tab. This window allows the user to add networked devices to the system and, obtain device property and status information. A list of available Destinations is shown on the left. When selected, the associated properties are shown on the right. The destination name is shown in the Container header along with the appropriate icon. A horizontal rule separates the destination information from the device properties. Checking the destination and selecting delete can remove a Destination device. The properties of the selected destination are shown on the right.

Figure 64:
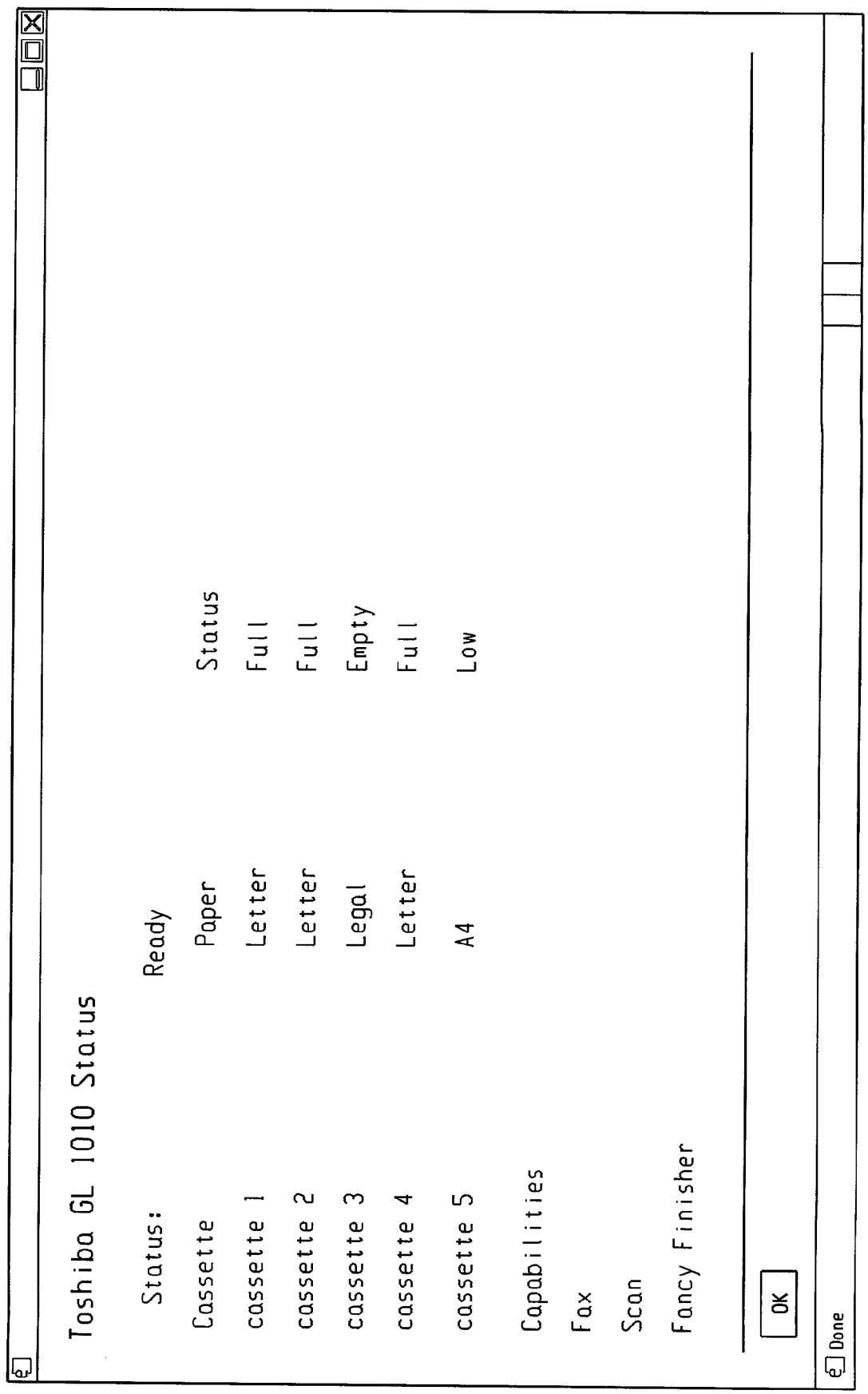
FIG. 64 illustrates a screenshot of a device status popup window displayed in response to selection of a corresponding printer device selected in FIG. 63.

Referring now to FIG. 64, there is illustrated a screenshot of a device status popup window displayed in response to selection of a corresponding printer device selected in FIG. 63. The popup window shows the available cassette resources of the particular printer device, and functions available on the device (e.g., fax, scan, etc.)

Figure 65:
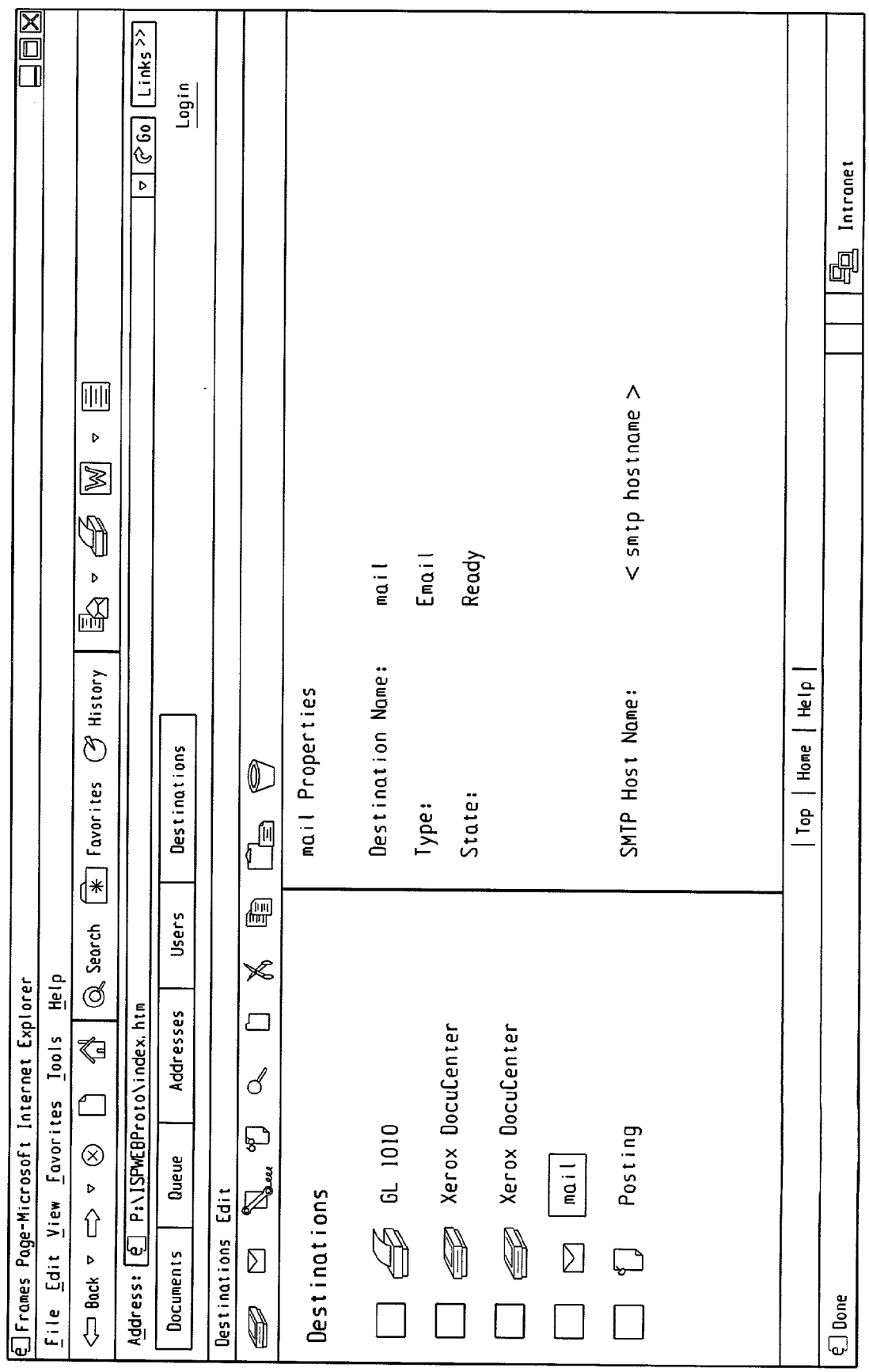
FIG. 65 illustrates a screenshot of a window displayed in response to selection of an e-mail device under the Destinations tab.

Referring now to FIG. 65, there is illustrated a screenshot of a window displayed in response to selection of an e-mail device under the Destinations tab. E-mail device property and status information are displayed in the right frame. Properties include destination name, type, state, and SMTP host name.

Figure 66:
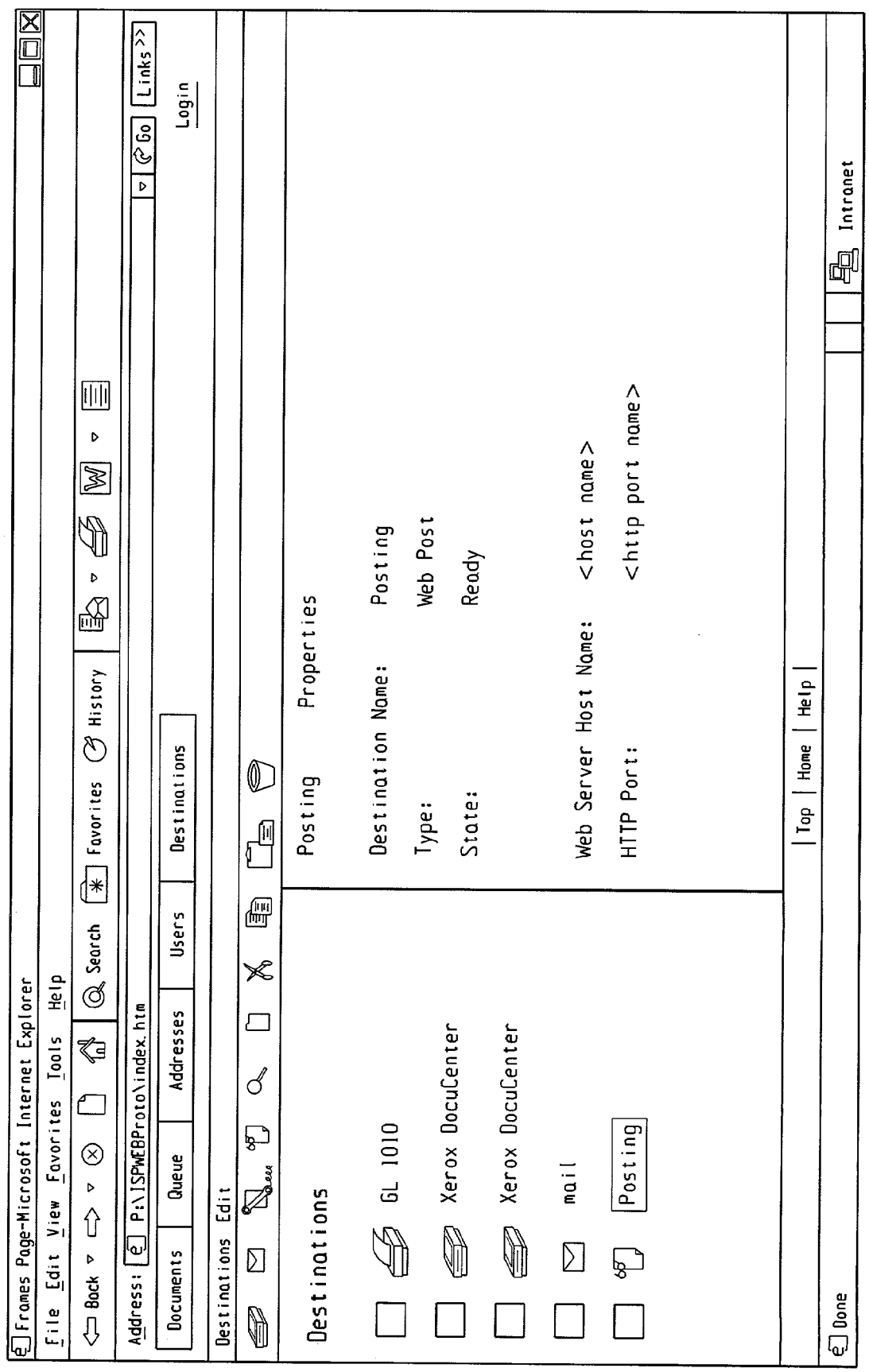
FIG. 66 illustrates a screenshot of a window that allows the user to post documents via to a web server.

Referring now to FIG. 66, there is illustrated a screenshot of a window that allows the user to post documents via to a web server. Destination properties include the destination name, type, state, web server host name, and HTTP port.

Figure 67:
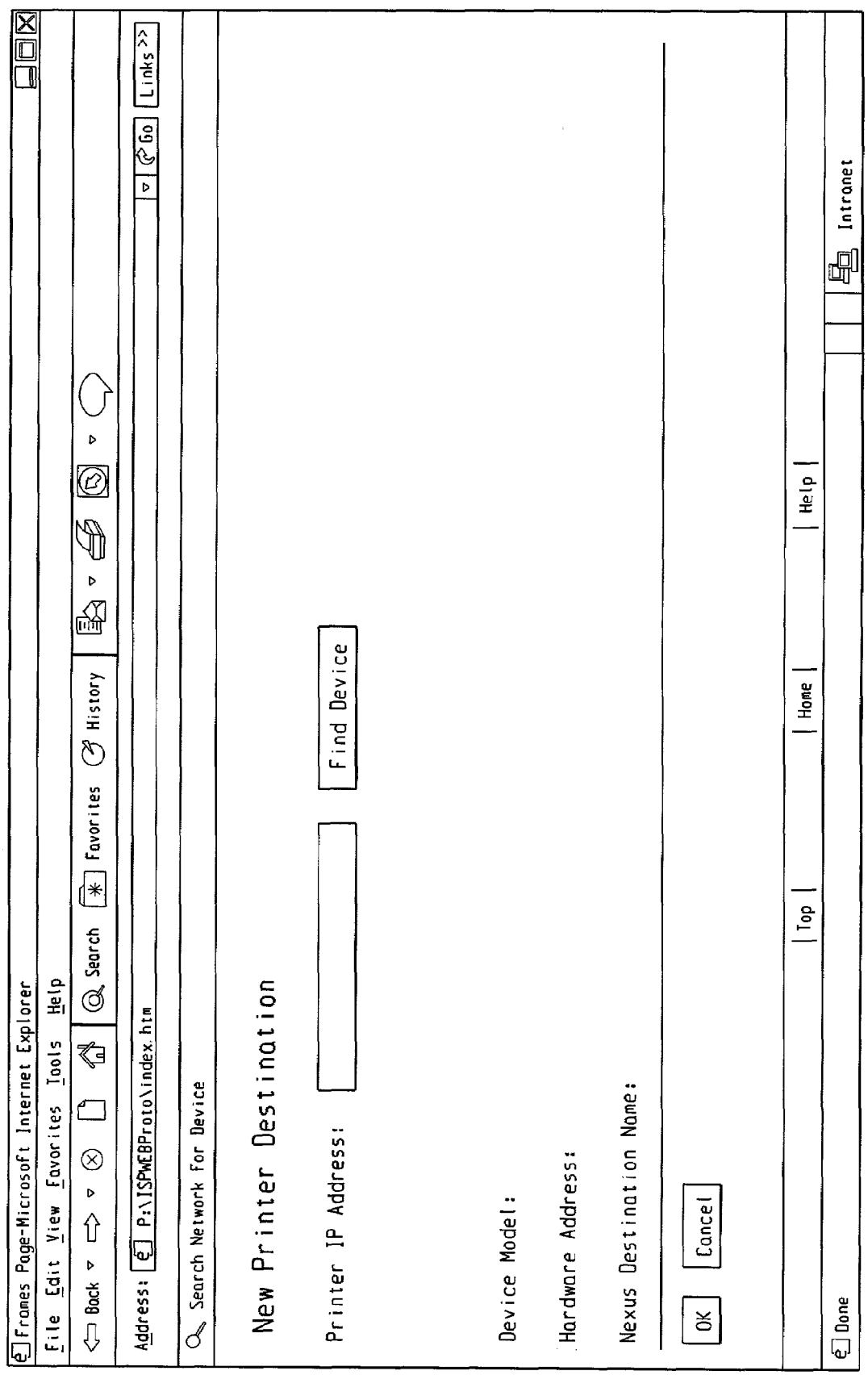
FIG. 67 illustrates a screenshot of a window that allows the Administrative user to add a new printer destination.

Referring now to FIG. 67, there is illustrated a screenshot of a window that allows the Administrative user to add a new printer destination. The administrator adds the printer IP address, and selects a Find button. The system returns the device information. The Admin can then enter a device name for the device at that IP address.

Figure 68:
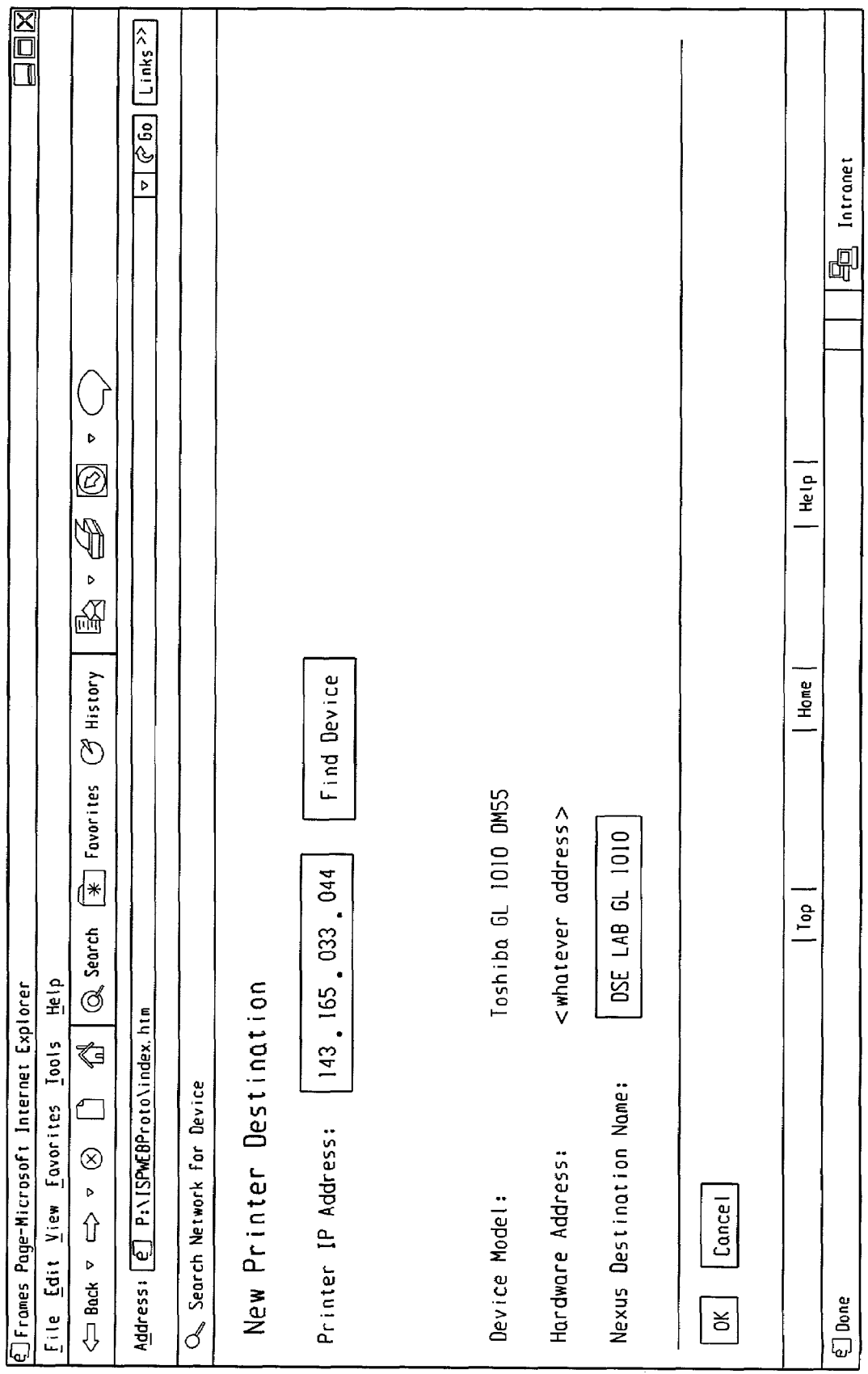
FIG. 68 illustrates a screenshot of a window that allows the user to view the device name associated with an IP address.

Referring now to FIG. 68, there is illustrated a screenshot of a window that allows the user to view the device name associated with an IP address.

Figure 69:
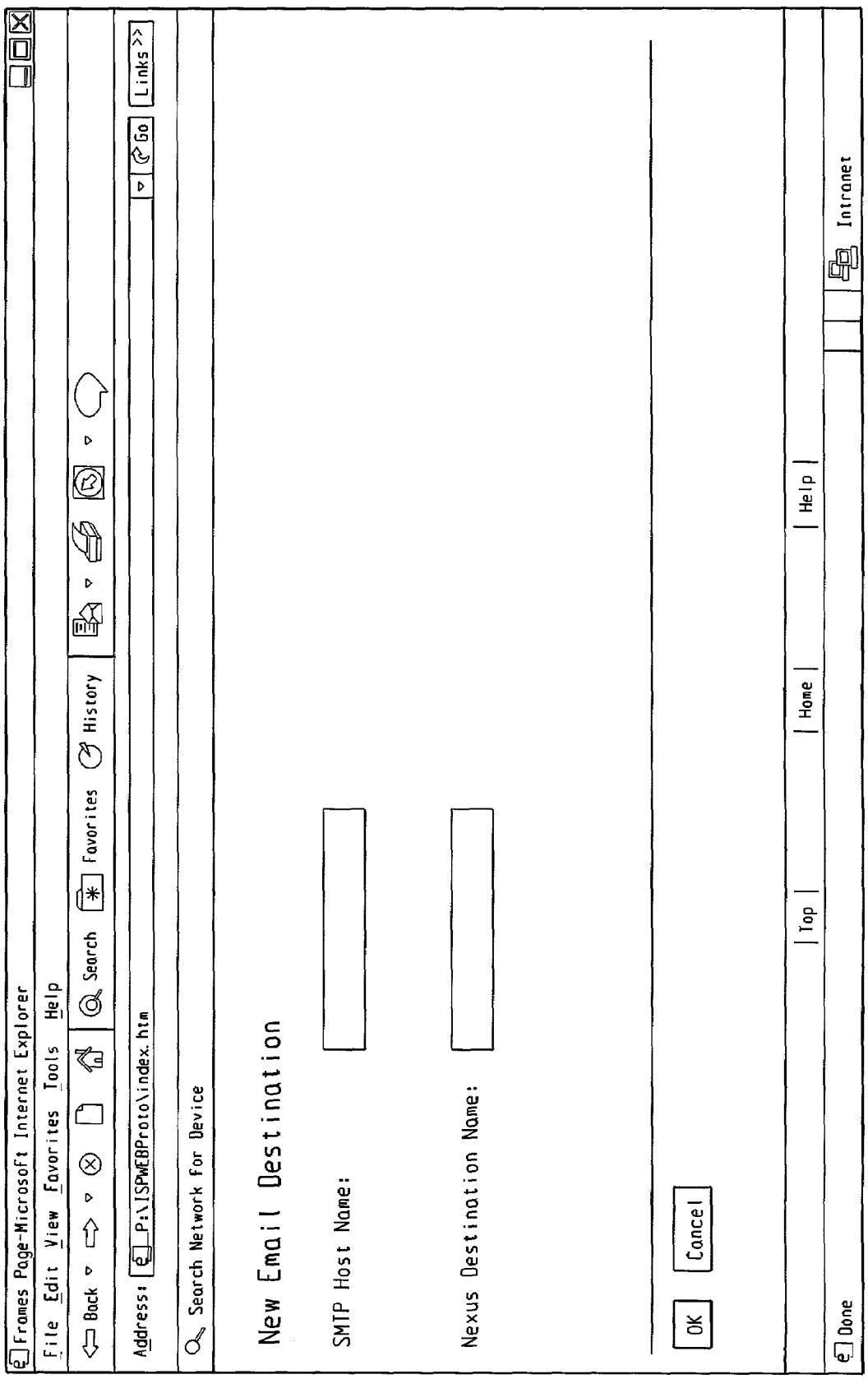
FIG. 69 illustrates a screenshot of a window that allows the Administrative user to add a new e-mail destination.

Referring now to FIG. 69, there is illustrated a screenshot of a window that allows the Administrative user to add a new e-mail destination. Destination information such as SMTP host name and the corresponding system name can be entered.

Figure 70:
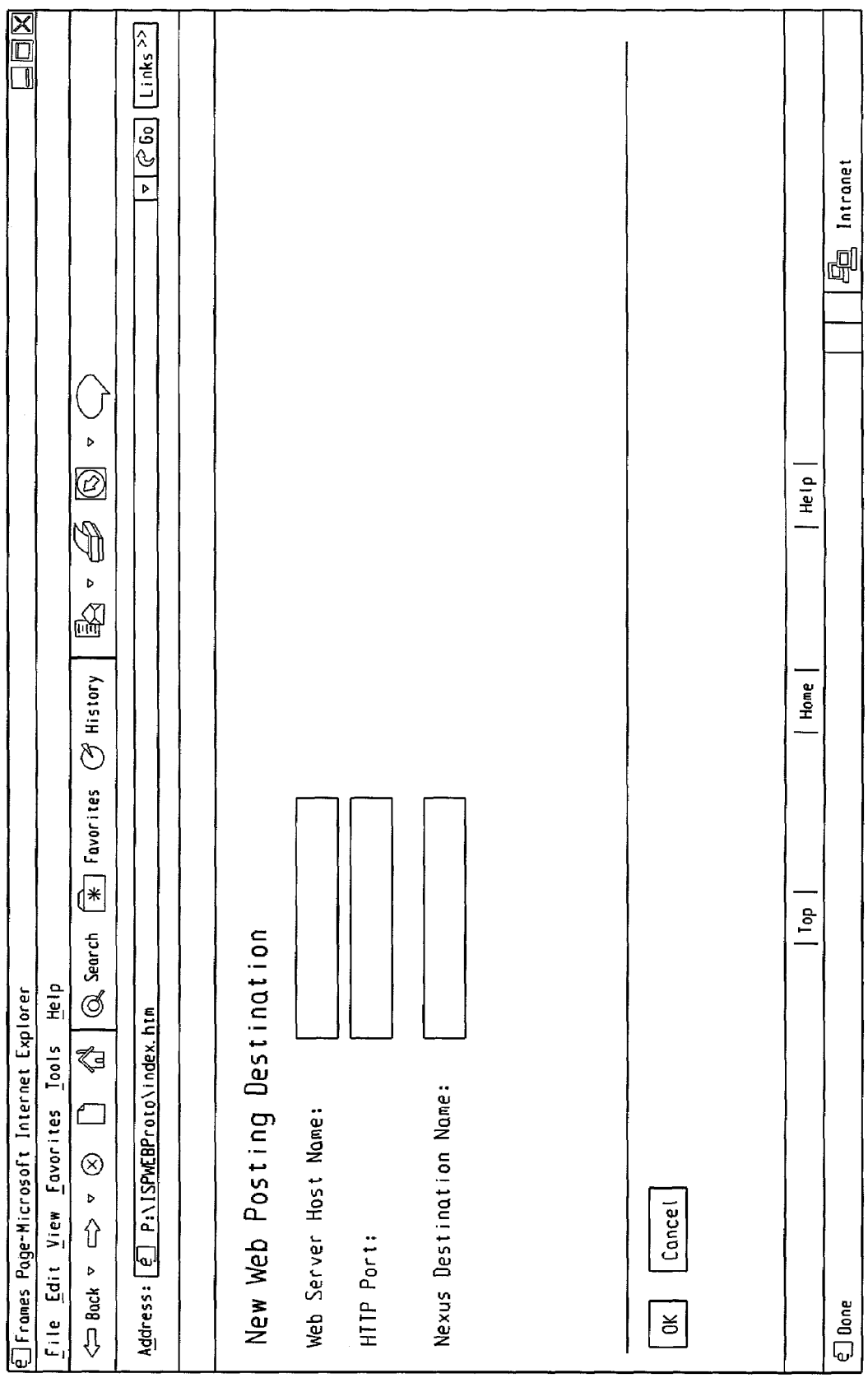
FIG. 70 illustrates a screenshot of a window that allows the Administrative user to add a new web destination.

Referring now to FIG. 70, there is illustrated a screenshot of a window that allows the Administrative user to add a new web destination. Destination information such as web server host name, HTTP port, and corresponding system name can be entered.

Figure 71:
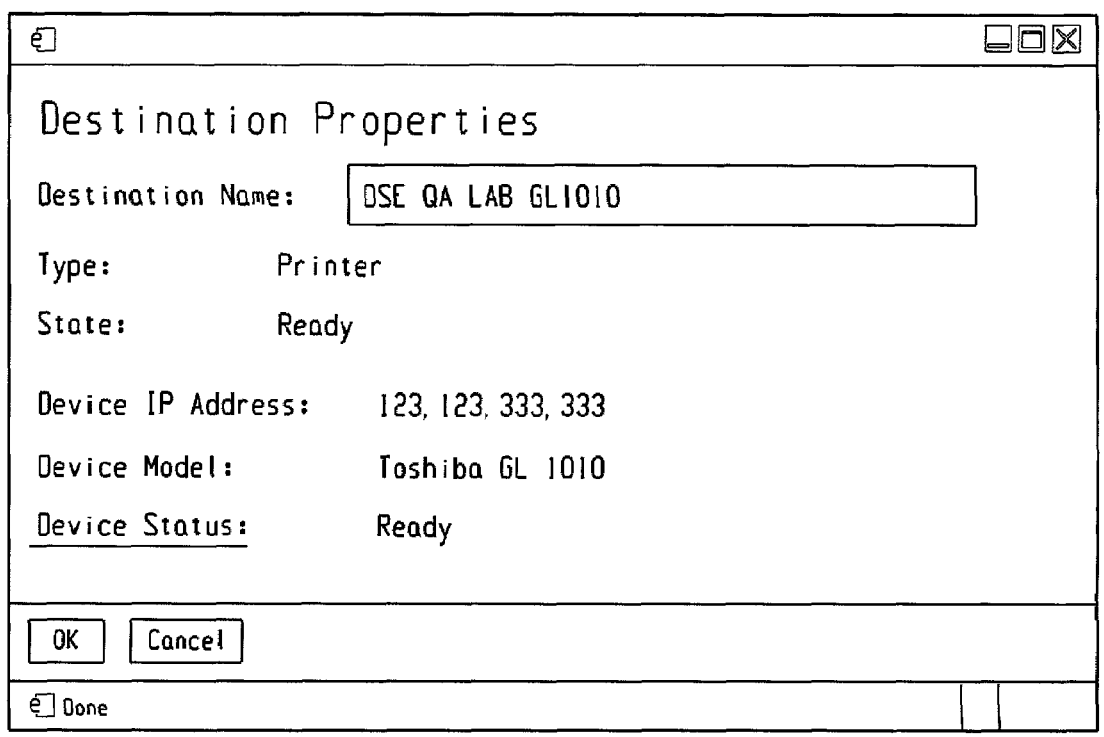
FIG. 71 illustrates a screenshot of a print destination popup window that allows the user view the device status when selected from the Destinations tab.

Referring now to FIG. 71, there is illustrated a screenshot of a print destination popup window that allows the user view the device status when selected from the Destinations tab. The properties information includes the destination name, type, state, IP address, device model, and device status.

Figure 72:
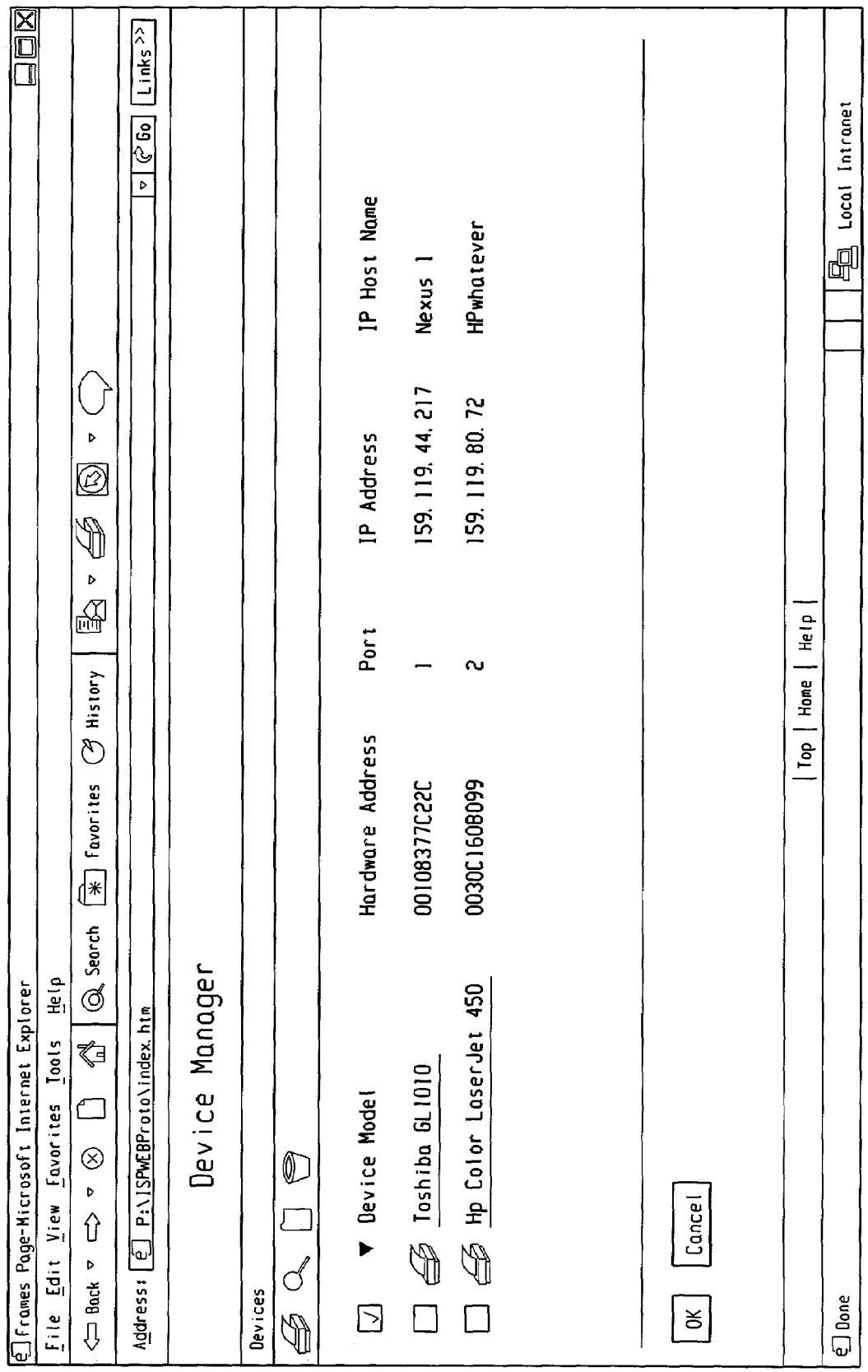
FIG. 72 illustrates a screenshot of a Device Manager window that allows the user to search for a device and obtain its status.

Referring now to FIG. 72, there is illustrated a screenshot of a Device Manager window that allows the user to search for a device and obtain its status. Device information includes the device model, hardware address, port number, IP address, and IP host name.

Figure 73:
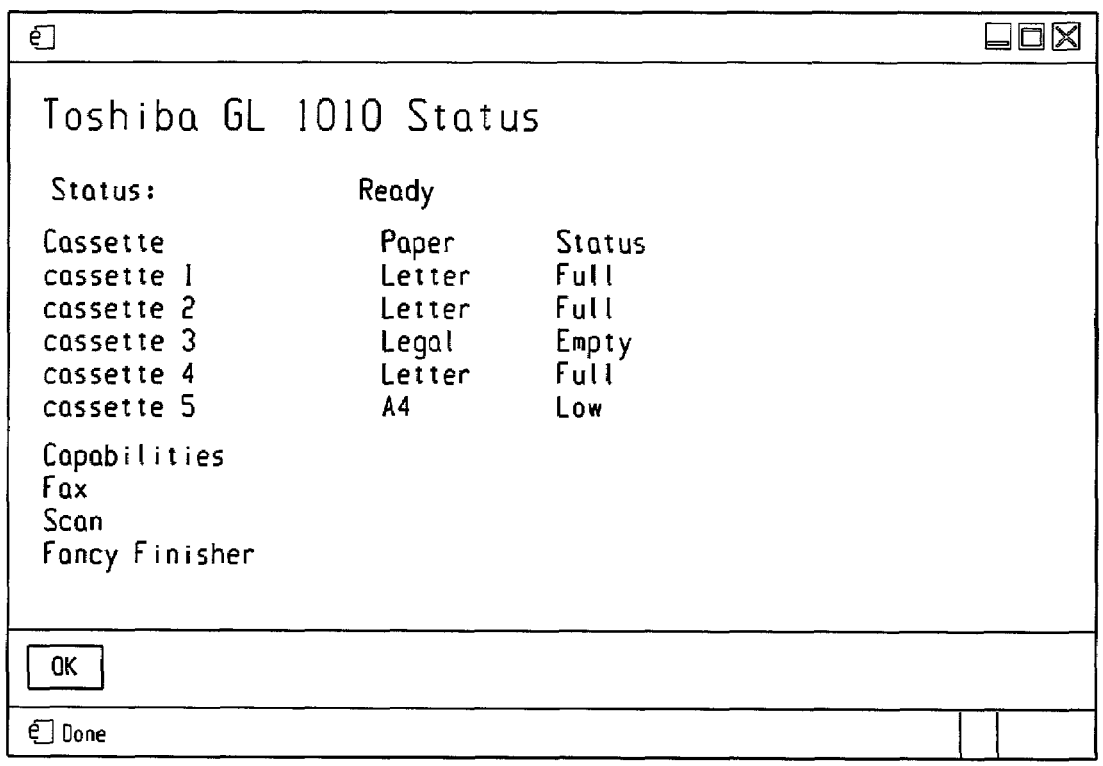
FIG. 73 illustrates a screenshot of a Device Status popup window that allows the user to view the current device status.

Referring now to FIG. 73, there is illustrated a screenshot of a Device Status popup window that allows the user to view the current device status. Status information includes the status of various device resources. In the example of a printer, available cassette resources are listed, along with any other configured functions (e.g., fax, scan, etc.)

Figure 74:
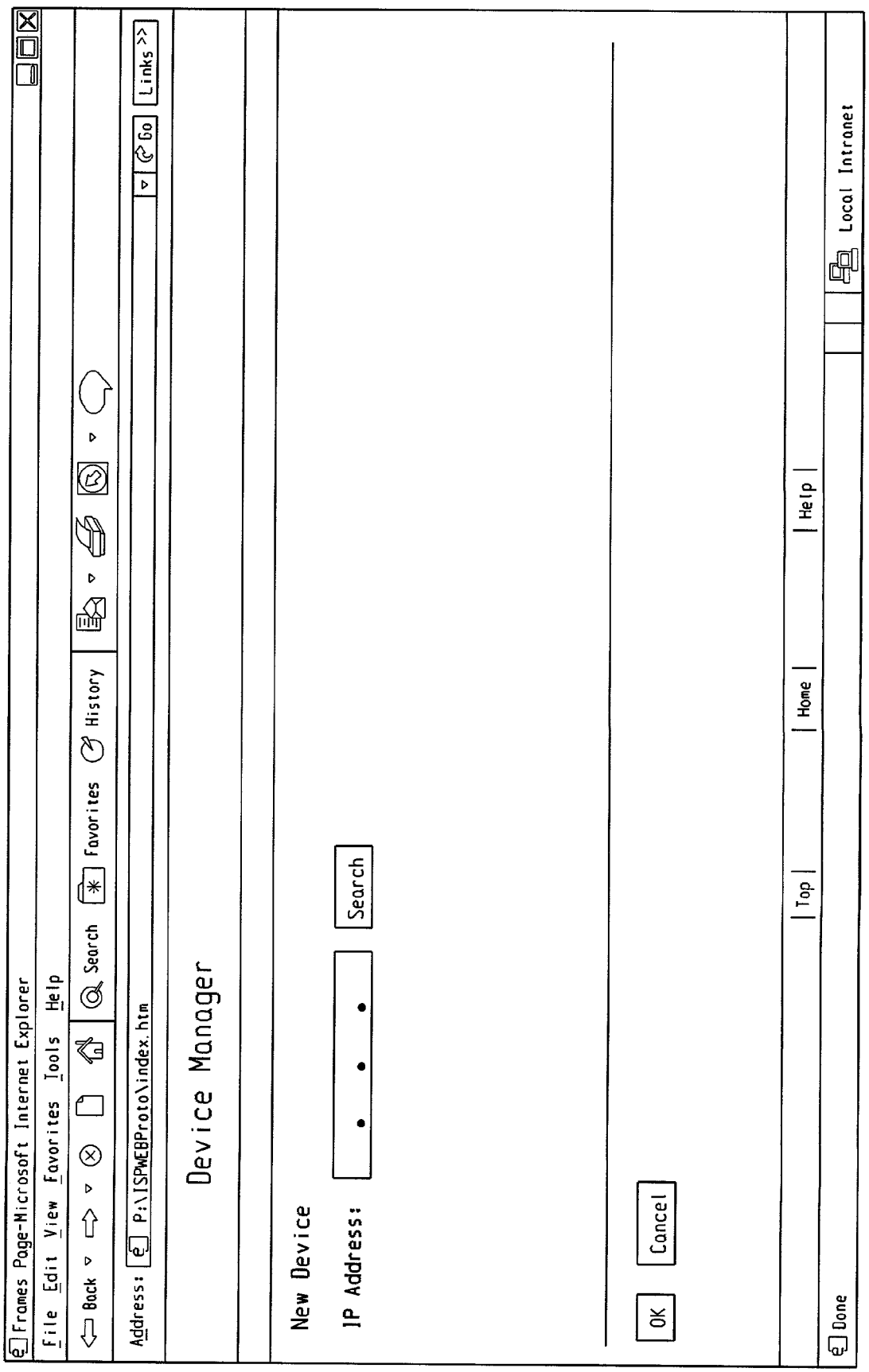
FIG. 74 illustrates a screenshot of a New Device window that allows the user to add an IP address for a new device.

Referring now to FIG. 74, there is illustrated a screenshot of a New Device window that allows the user to add an IP address for a new device.

Figure 75:
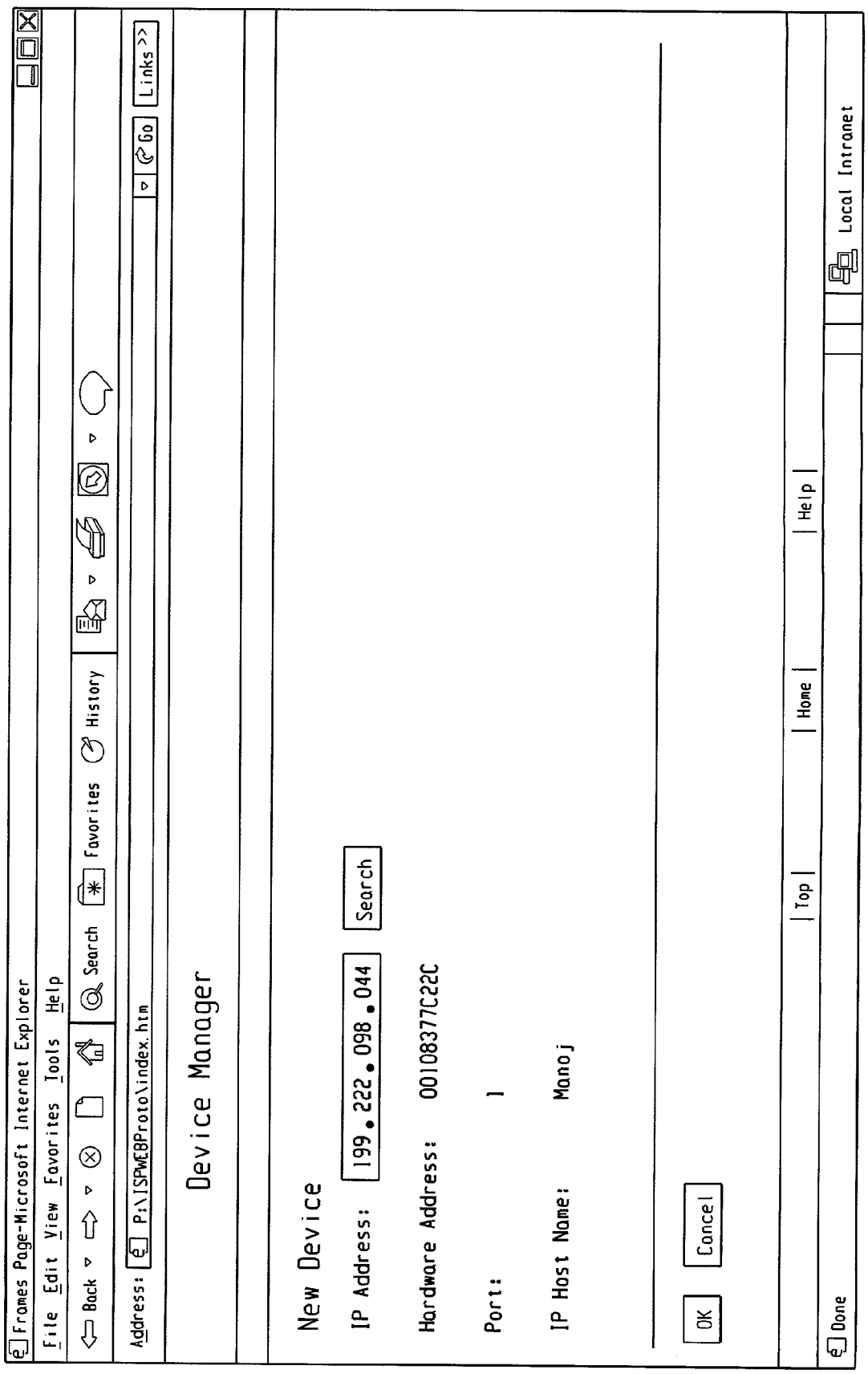
FIG. 75 illustrates a screenshot of a New Device window that allows the user view any devices that have the IP address entered in FIG. 74.

Referring now to FIG. 75, there is illustrated a screenshot of a New Device window that allows the user view any devices that have the IP address entered in FIG. 74. If a new device is found, the associated properties are listed. For example, device IP address, hardware address, port number, and IP host name.

Multiple Destination Output

Currently Windows® applications send a document only to one destination device. To foreclose on such conventional limitations, the DDM 206 of the disclosed appliance architecture provides the capability of distributing a document substantially simultaneously to multiple destinations of different types including printers, faxes, web servers, and the DMM 202. On Windows® platforms this is accomplished by a generic iSP print driver which repeatedly invokes specific print drivers. Reference is directed to FIGS. 63–66 for screenshots of the windows provided by the user interface related to the user selecting existing output destinations. The user initiates a print operation directed to the appliance 200 by selecting the "File-Print" menu, which results in the display of the "Print Dialog" box, and by choosing the appliance 200 as the print destination. Once this is done the user has two possible options, either to select the "OK" button, or to select the "Printer Properties" button. If the user selects the "Printer Properties" button, a new dialog box is opened. The user can now set the destination of the print operation as well as generic, common properties, such as Page Size, Orientation, Color, etc. The user is provided the capability to select one, a few, or all of the available destination types (i.e., Printer, E-mail, Web Post, Fax, DMM, etc.), and any number of devices within each device category. If the user selects the OK button, a dialog box is displayed that allows the selection of vendor-specific destination properties. The user is offered the opportunity to store all of these settings in a profile file that can be used to simplify subsequent "Print File" operations. Once these properties are set, the user exits these screens by selecting the "OK" button. In accordance with prior destination selections, the "Print File" operation is initiated by repeatedly invoking the corresponding print drivers.

Figure 76:
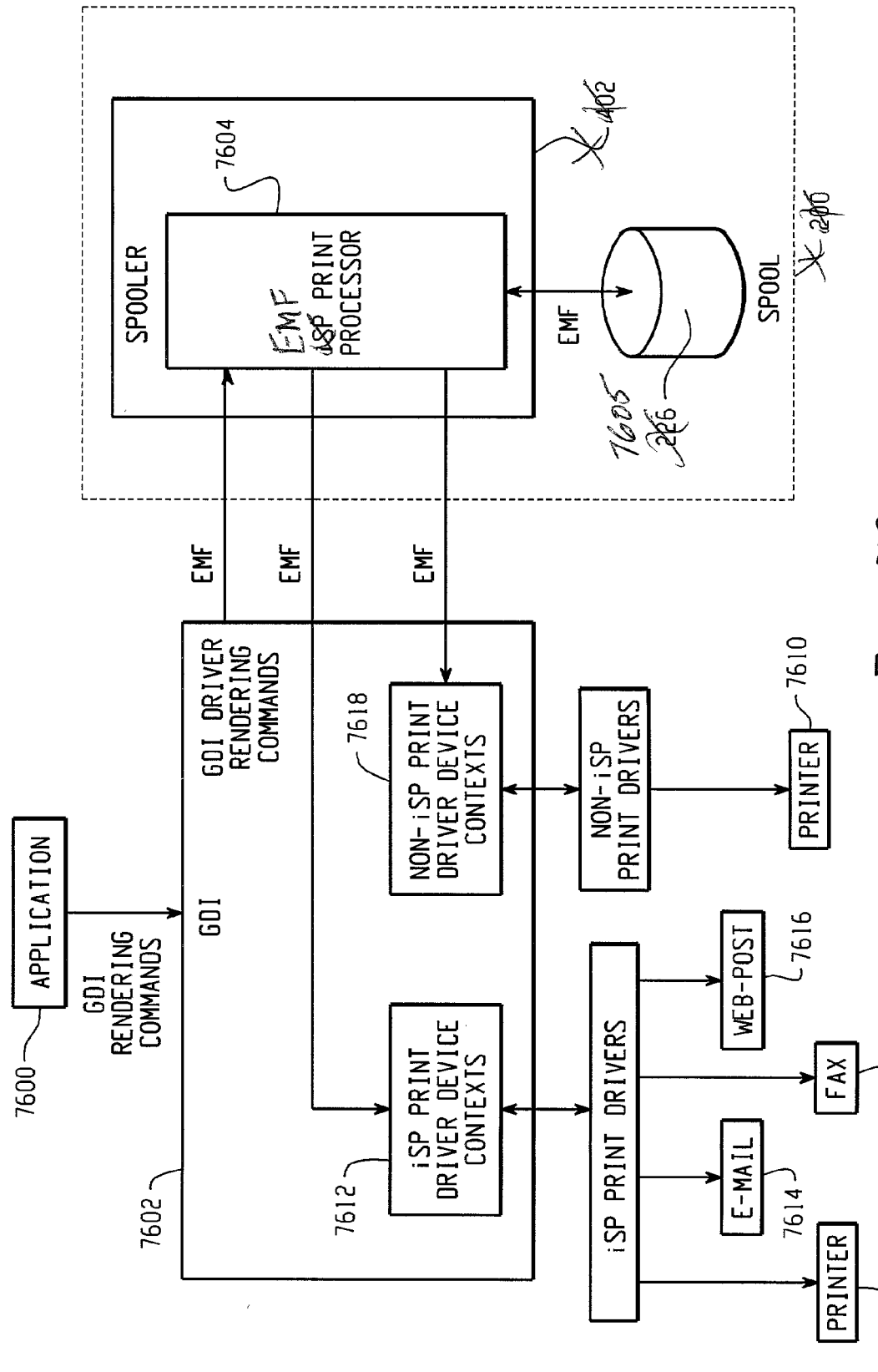
FIG. 76 illustrates a block diagram of a system for directing a single document to multiple output devices, in accordance with a disclosed embodiment.

Referring now to FIG. 76, there is illustrated a block diagram of a system for directing a single document to multiple output devices, in accordance with a disclosed embodiment. As a prelude to initiating multiple-output-device printing, the user generates a document within an application 7600 (e.g., a Windows® word processing application, in this particular embodiment). When the user desires to output the document to multiple destinations, he or she directs the output to the disclosed appliance system 200 via a File-Print menu. When the destination devices have been selected, and the user initiates the document transfer, the document is sent to a component of the client operating system for conversion. When using the Windows® operating system, the component is called the Graphic Device Interface (GDI) 7602. The GDI 7602 operates as a raster image processor and converts the document file to a dot pattern file before forwarding the converted document to the printer.

The Windows® 32-bit operating system uses an intermediary vector-based enhanced meta file (EMF) system that renders the image and passes the corresponding data stream to the printer as a background operation, so the user can continue working on applications in the foreground. In this particular embodiment, the GDI 7602 converts the document into an EMF file. The EMF file is then transmitted to a print processor 7604 of a spooler of the client machine. The spooler comprises the print processor 7604 that processes the received EMF file into multiple files according to the number of destination devices selected. For example, if the user selected as destination output devices an iSP fax 7606, an iSP printer 7608, and a non-iSP printer 7610, the print processor 7604 plays back an EMF file for each output device.

The processor 7604 spools one or more files in EMF format to a spool 7605, as processing is completed. The EMF files are then retrieved from the spool 7605 by the processor 7604 and forwarded to corresponding device contexts of the GDI 7602 corresponding to the selected destination output devices. Device Context (DC) includes the notion of a driver, thus allowing the DC to be used as an interface to standard, as well as non-standard output devices. This is possible because the DC can be used to store extra information concerning the internal capacity of the output device, for example, a printer or fax. For example, an illustrated iSP DC block 7612 comprises multiple DCs for the respective destination devices. More specifically, the iSP DC block 7612 comprises a first iSP DC associated with the iSP printer 7608, a second iSP DC associated with the iSP fax 7606, a third iSP DC associated with an iSP e-mail destination 7614, and a fourth iSP DC associated with an iSP web-post destination 7616. The iSP DC 7612 then passes the respective EMF files to the corresponding distribution agents of the selected destination devices to facilitate output of the document generated from the application 7600.

The GDI 7602 also includes a non-iSP DC block 7618 for driving non-iSP destination devices. In this example, the user has also selected the non-iSP printer 7610 as a destination output device. Thus the print processor 7604 generates an EMF driver file for the non-iSP printer 7610 and transmits the file to the non-iSP DC 7618. The non-iSP DC 7618 processes the EMF file to drive the corresponding selected non-iSP destination device 7610 to facilitate output of the document generated from the application 7600.

Figure 77:
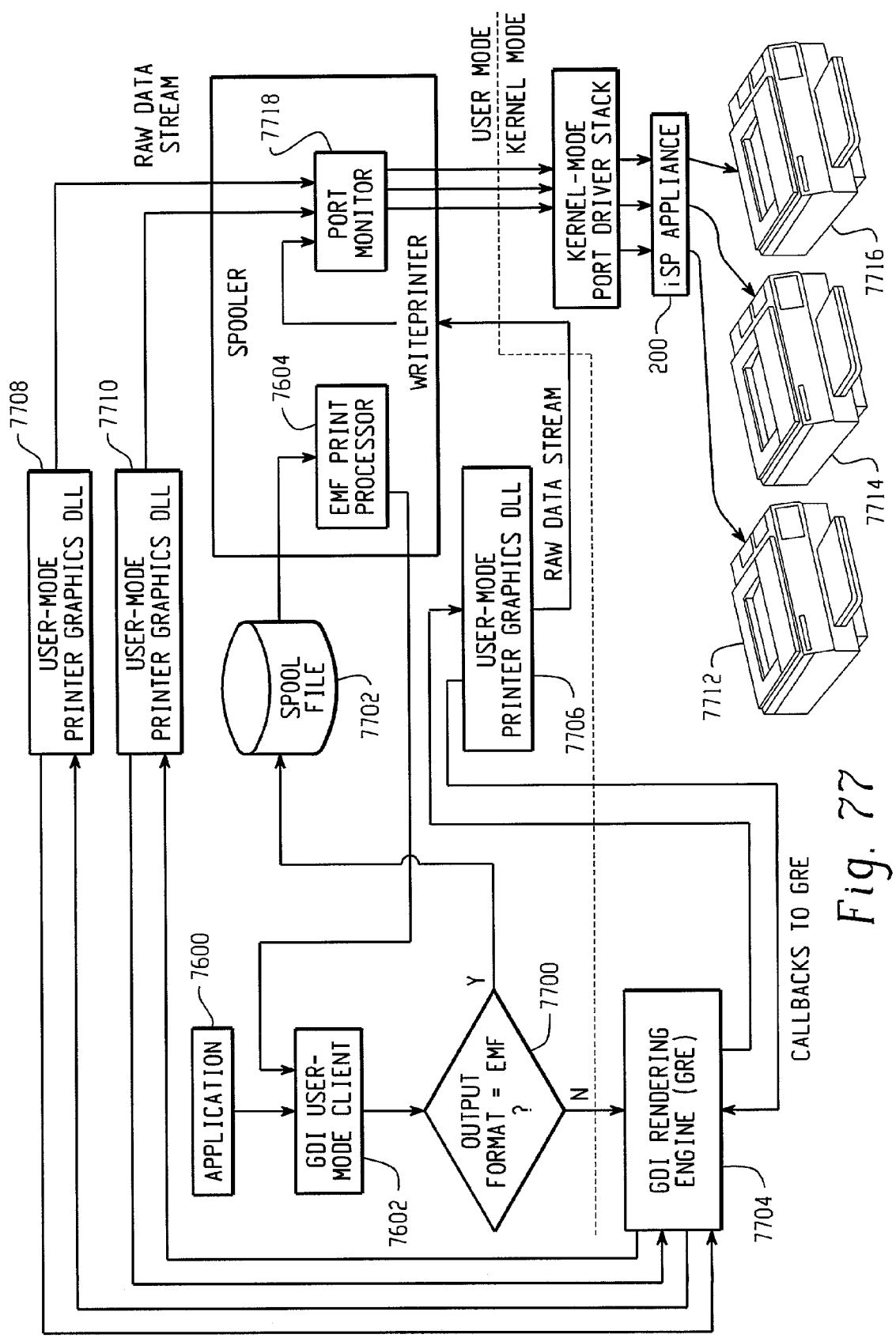
FIG. 77 illustrates a block flow diagram for processing EMF and non-EMF files for selected destination output devices.

Referring now to FIG. 77, there is illustrated a block flow diagram for processing EMF and non-EMF files for destination output devices. Flow begins at the application block 7600 where the user of the thick client 222 generates a document for output to one or more destination devices. When the user decides to output the document, the user initiates a File Print function by selecting the iSP driver, and the document data passes from the application 7600 to the GDI block 7602 of the client operating system. Flow is then to a decision bubble 7700 to determine the output format of the document based on the selected driver. If the iSP driver has been selected, the document is output from the "Y" path of decision bubble 7700 in EMF format to a file spool 7702. The print processor 7604 of the client machine plays the EMF file back and passes the resulting data to the GDI user module 7602 to then generate a printer graphics DLL file.

This process is performed each time for the corresponding number of destination devices. For example, if three destination devices are selected that correspond to the iSP system, three EMF files are generated to the EMF Print processor 7604, played back, and a corresponding printer graphics DLL created.

Thus a GDI rendering engine (GRE) 7704 receives each of the played back files from the GDI module 7602. The GRE 7704 generates a first print graphics DLL file 7706 for a first destination device 7712. The GRE 7704 receives the second played back EMF file of a respective second destination device 7714 and generates a second print graphics DLL file 7708. The GRE 7704 receives the third played back EMF file of a respective third destination device 7716 and generates a third print graphics DLL file 7710. Data output from the three printer graphics DLLs (7706, 7708, and 7710) is raw data to a port monitor 7718. The port monitor 7718 routes the raw data via the kernel-mode driver stack to the appliance 200. The appliance 200 then distributes the respective document files to the multiple destination devices (7712, 7714, and 7716).

In an alternative embodiment, all spooled files are GDI data (non-EMF). The spooled GDI data is then despooled and forwarded by the print processor 7604 to the GRE 7704 to process the iSP drivers for driving iSP selected destination devices. The non-iSP files received by the GRE 7704 are then passed through to the non-iSP DC 7618 of the GDI 7602 for driving any selected non-iSP destination devices.

Note that the disclosed architecture is not restricted to wired networks having a client, the appliance 200, and numerous destination devices disposed thereon. The client may be any wireless portable device, such as a portable computer, running an operating system suitably configured and operable to connect to a network access server to gain access to network services. The wireless device may also be hand-held device such as a Personal Data Assistant running an operating system suitably configured to communicate with the disclosed appliance system to receive the benefits thereof.

Referring now to FIG. 78, there is illustrated a flow chart of the process for creating a bookmarked document, in accordance with a disclosed embodiment. Flow begins at a function block 7800 where the client user opens a browser on the client computer. In a function block 7802 the user points the browser to the URL of the appliance web server 208. The appliance web server 208 then presents a login window 3300 (of FIG. 33) to the user, as indicated in a function block 7804. The user enters a username and password, and transmits the account information, as indicated in a function block 7806. If successfully logged in, the web server 208 of the appliance 200 responds with a web page of FIG. 31 that includes a browser sub-window interface having a Tabs area, Menu Bar area, and Tool Bar area, as indicated in a function block 7808. The web page of FIG. 31 provides the user interface to the functionality of the appliance 200.

To create a bookmarked document, the user selects the document (or object) for which the bookmark is to be created, as indicated in a function block 7810. Flow is to a function block 7812 where the user accesses either the sub-window Menu Bar or the Tool Bar to access a "Create Bookmark" option (or similar wording that is descriptive of the task to be performed). It can be suitably configured such that the user can access the "Create Bookmark" option in both the Menu Bar as a drop-down menu and Tool Bar as an icon. Once the user has initiated the bookmark-creation process in a function block 7814, the system creates an association between the selected document (or object) and the bookmark, as indicated in a function block 7816, and names this association such that when the user accesses the bookmarks, the user understands to what document or object the bookmark is linked. The newly created bookmark is then presented to the user in a bookmark menu located within the browser sub-window, as indicated in a function block 7818. Flow then reaches a Stop terminal.

Figure 79:
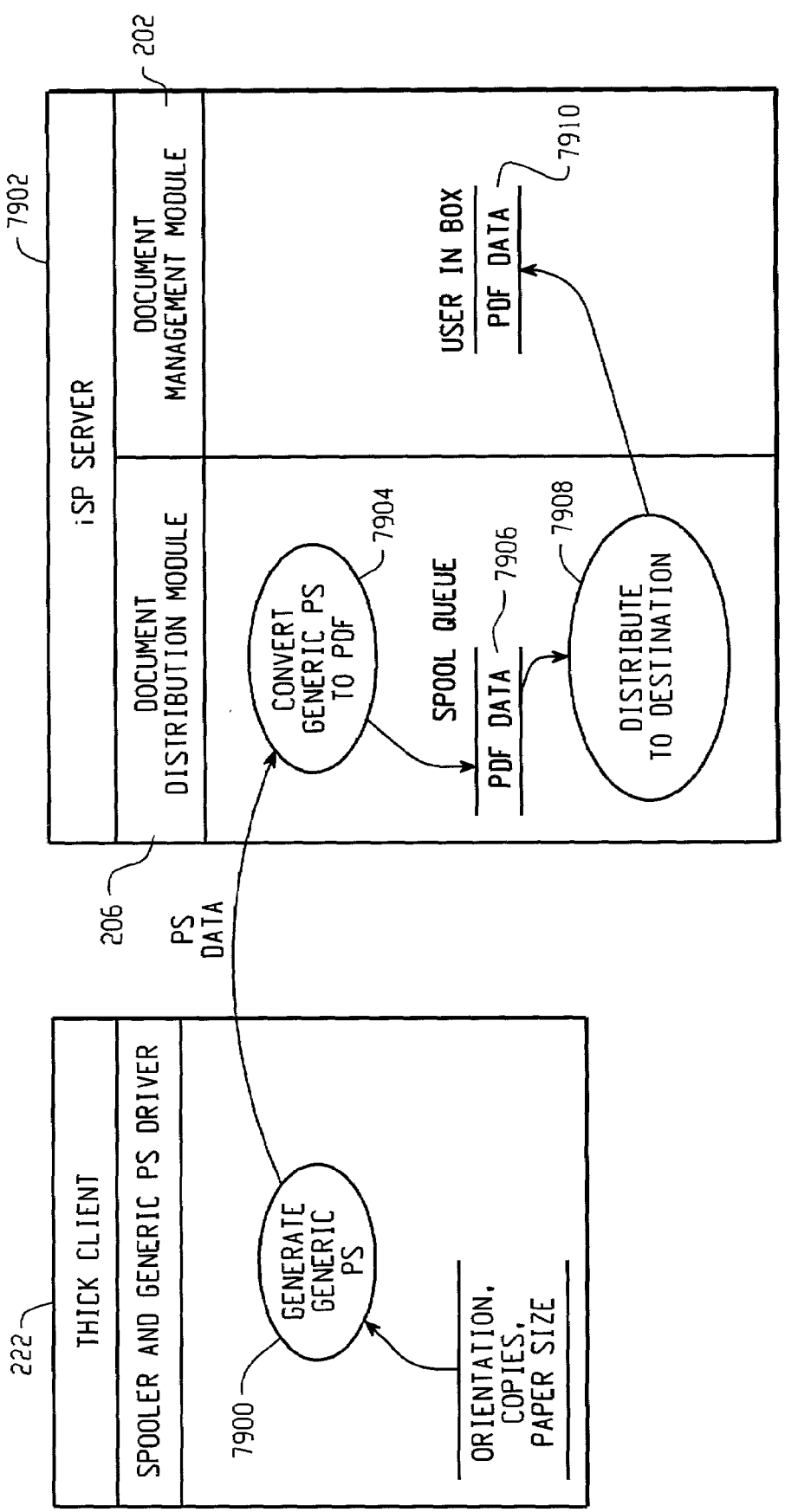
FIG. 79 illustrates a data flow block diagram for printing from a client to the DMM.

Referring now to FIG. 79, there is illustrated a data flow block diagram for printing from a thick client 222 to the DMM 202. The user invokes the thick client driver 222 and selects from the various properties presented a "Print to DMM" option. Once "Print to DMM" is selected, the file is converted to generic PS (PostScript) data in a process 7900. Inputs to the conversion process 7900 are some basic parameters such as page orientation, number of copies, and paper size. The PS data is then passed to the iSP server 7902 of the document service appliance 200. More specifically, the PS data is passed to the DDM 206. The DDM 206 converts the generic PS data to a PDF format, in a PDF conversion process 7904 and enqueues the PDF data in a spool queue 7906. The DDM 206 process monitors the queue 7906, and when data is present in the queue 7906, retrieves the data from the queue 7906, interrogates the data for destination information (job information) and passes it in a distribution process 7908 to the appropriate destination. In this particular embodiment, the data is directed to the DMM 202. Thus the DDM 206 passes it to the DMM 202. The DMM 202 reads data of the file, and forwards the PDF data to the appropriate Inbox 7910 so that the user can retrieve the data.

Although system as described runs on a network appliance, it is appreciated that it can also run on other operating systems, for example, Linux (and other Unix operating systems), and operating systems by Apple Computers.

Although the preferred embodiment has been described in detail, it should be understood that various changes, substitutions and alterations could be made therein without departing from the spirit and scope of the invention as defined by the appended claims.

What is claimed is:

1. A method of providing access to a network-based document management system from a client, comprising the steps of:

retrieving document management data from an associated document management module, which document management module is adapted to interface a networked document processing system;

defining access point data representative of an access point within a local file system of the client;

interfacing to said access point with a local file navigation interface such that document processing operations associated with the document management module are represented in a format native to the local file navigation interface;

receiving from an associated user, via the local file navigation interface, document management instructions; and communicating received document management instructions to the document management module such that the associated user accesses the network-based document management system from within the local file navigation interface via said access point defined within said local file system;

retrieving at least one electronic document file associated with the document management module, which electronic document file includes metadata corresponding thereto; and performing selected document management operations corresponding to retrieved document management data on the at least one electronic document file associated with the document management module such that metadata is retained for document management operations completed within the document management module and metadata is stripped for document management operations communicated outside of the document management module.

2. The method of claim 1, wherein a user of said local file navigation interface in the step of interfacing transfers document files between said local file system and the network-based document management system via said access point in accordance with pre-selected access rights associated with the associated user.

3. The method of claim 1, wherein said access point is presented as a user-selectable folder icon that conforms to a user interface of an operating system of said client.

4. The method of claim 1, wherein said local file navigation interface in the step of interfacing is integrated into an operating system of said client.

5. The method of claim 1, further comprising the step of validating a user of an operating system of the client prior to granting access to said user to the network-based document management system.

6. The method of claim 5, wherein the step of validating occurs when said user logs in to said operating system of said client.

7. The method of claim 5, wherein the step of validating occurs when said user logs in to a network from which the network-based document management system is served.

8. The method of claim 5, wherein the step of validating occurs when said user selects said access point via said local file navigation interface.

9. The method of claim 1, wherein said access point in the step of defining provides a link between said local file system and the network-based document management system.

10. The method of claim 1, wherein a user who accesses the network-based document management system via said access point in the step of accessing performs at least one of deleting, renaming, moving, and copying said document file, viewing said document file properties and, viewing said document file in read-only mode.

11. The method of claim 1, wherein a user who accesses the network-based document management system via said access point in the step of accessing performs at least one of transferring a folder between said local file system and the network-based document management system, deleting, renaming, moving, and copying said folder and, viewing said folder properties.

12. A method of providing access to a remote document repository from a client, comprising the steps of:

retrieving document management data from an associated document management module, which document management module is adapted to interface a networked document processing system;

defining access point data representative of an access point within a local file system of the client;

interfacing to said access point with a local file navigation interface such that document processing operations associated with the document management module are represented in a format native to the local file navigation interface;

receiving from an associated user, via the local file navigation interface, document management instructions;

communicating received document management instructions to the document management module such that the associated user accesses the remote document repository via said access point defined within said local file system;

retrieving at least one electronic document file associated with the document management module, which electronic document file includes metadata corresponding thereto; and performing selected document management operations corresponding to retrieved document management data on the at least one electronic document file associated with the document management module such that metadata is retained for document management operations completed within the document management module and metadata is stripped for document management operations communicated outside of the document management module.

13. The method of claim 12, wherein a user of said local file navigation interface in the step of interfacing transfers document files between said local file system and the remote document repository via said access point in accordance with pre-selected access rights associated with the associated user.

14. The method of claim 12, wherein said access point in the step of defining is presented as a user-selectable folder icon that conforms to a user interface of an operating system of said client.

15. The method of claim 12, further comprising the step of validating a user of the remote document repository when said user logs in to an operating system of the client.

16. The method of claim 12, further comprising the step of validating a user of the remote document repository when said user logs in to a network operating system that facilitates network access to the remote document repository.

17. The method of claim 12, further comprising the step of validating a user of the remote document repository when said user accesses said access point via said local file navigation interface.

18. A system of accessing a network-based document management system from a client, comprising:

means for retrieving document management data from an associated document management module, which document management module is adapted to interface a networked document processing system;

an access point defined within a local file system of the client, the access point having access point data associated therewith;

and
a local file navigation interface for interfacing to said access point such that document processing operations associated with the document management module are represented in a format native to the local file navigation interface;

means for receiving from an associated user, via the local file navigation interface, document management instructions;

means for communicating received document management instructions to the document management module such that the associated user, wherein a user accesses the network-based document management system from within the local file navigation interface via said access point defined within said local file system;

means for retrieving at least one electronic document file associated with the document management module, which electronic document file includes metadata corresponding thereto; and means for performing selected document management operations corresponding to retrieved document management data on the at least one electronic document file associated with the document management module such that metadata is retained for document management operations completed within the document management module and metadata is stripped for document management operations communicated outside of the document management module.

19. The system of claim 18, wherein a user of said local file navigation interface transfers document files between said local file system and the network-based document management system via said access point in accordance with pre-selected access rights associated with the associated user.

20. The system of claim 18, wherein said access point is presented as a user-selectable folder icon that conforms to a user interface of an operating system of said client.

21. The system of claim 18, wherein a user seeking access to the network-based document management system is validated when said user logs in to an operating system of the client.

22. The system of claim 18, wherein a user seeking access to the network-based document management system is validated when said user logs in to a network operating system that facilitates network access to the network-based document management system.

23. The system of claim 18, wherein a user seeking access to the network-based document management system is validated when said user accesses said access point via said local file navigation interface.

24. The system of claim 18, wherein said access point data provides a link between said local file system and the network-based document management system.

25. The system of claim 18, wherein a user who accesses the network-based document management system via said access point performs at least one of deleting, renaming, moving, and copying said document file, viewing said document file properties and, viewing said document file in read-only mode.

26. The system of claim 18, wherein a user who accesses the network-based document management system via said access point performs at least one of transferring a folder between said local file system and the network-based document management system, deleting, renaming, moving, and copying said folder and, viewing said folder properties.

27. A system of accessing a remote document repository from a client, comprising:
means for retrieving document management data from an associated document management module, which document management module is adapted to interface a networked document processing system;

an access point defined within a local file system of the client, the access point having access point data associated therewith;

a local file navigation interface for interfacing to said access point such that document processing operations associated with the document management module are represented in a format native to the local file navigation interface;

means for receiving from an associated user, via the local file navigation interface, document management instructions;

means adapted-for communicating received document management instructions to the document management module such that the associated user, wherein a user accesses the remote document repository from within the local file navigation interface via said access point defined within said local file system;

means for retrieving at least one electronic document file associated with the document management module, which electronic document file includes metadata corresponding thereto; and means for performing selected document management operations corresponding to retrieved document management data on the at least one electronic document file associated with the document management module such that metadata is retained for document management operations completed within the document management module and metadata is stripped for document management operations communicated outside of the document management module.

28. The system of claim 27, further comprising:
means for transferring, via said local file navigation interface, document files between said local file system and the remote document repository via said access point;

means for transferring, via said local file navigation interface, document files within the remote document repository; and means for selectively preserving metadata associated with at least one document file during a transfer within the remote document repository.

29. The system of claim 27, wherein said access point is presented as a user-selectable folder icon that conforms to a user interface of an operating system of said client.

30. The system of claim 27, wherein a user seeking access to the remote document repository is validated when said user logs in to an operating system of the client.

31. The system of claim 27, wherein a user seeking access to the remote document repository is validated when said user logs in to a network operating system that facilitates network access to the remote document repository.

32. The system of claim 27, wherein a user seeking access to the remote document repository is validated when said user accesses said access point via said local file navigation interface.

* * * * *